(12) United States Patent
Koreeda et al.

(10) Patent No.: US 8,189,448 B2
(45) Date of Patent: May 29, 2012

(54) OPTICAL INFORMATION RECORDING/REPRODUCING APPARATUS AND OBJECTIVE OPTICAL SYSTEM FOR THE SAME

(75) Inventors: Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 48 days.

(21) Appl. No.: 12/949,023

(22) Filed: Nov. 18, 2010

(65) Prior Publication Data
US 2011/0122758 A1 May 26, 2011

(30) Foreign Application Priority Data
Nov. 20, 2009 (JP) .................. 2009-265072

(51) Int. Cl.
*G11B 7/00* (2006.01)
(52) U.S. Cl. .......... 369/109.01; 369/112.03; 369/112.08
(58) Field of Classification Search ............. 369/112.08, 369/112.23, 109.01
See application file for complete search history.

(56) References Cited

U.S. PATENT DOCUMENTS

| | | | |
|---|---|---|---|
| 2007/0014211 A1* | 1/2007 | Koreeda et al. | 369/44.37 |
| 2007/0070860 A1* | 3/2007 | Koreeda et al. | 369/112.08 |
| 2008/0013412 A1 | 1/2008 | Nomura et al. | |
| 2008/0130465 A1* | 6/2008 | Koreeda et al. | 369/112.03 |
| 2009/0080319 A1* | 3/2009 | Koreeda et al. | 369/112.23 |
| 2009/0185472 A1 | 7/2009 | Koreeda et al. | |

FOREIGN PATENT DOCUMENTS

| | | |
|---|---|---|
| JP | 2006-164498 | 6/2006 |
| WO | 2008/007552 | 1/2008 |

* cited by examiner

*Primary Examiner* — Van Chow
(74) *Attorney, Agent, or Firm* — Greenblum & Bernstein P.L.C.

(57) ABSTRACT

An objective optical system for an optical information recording/reproducing apparatus for recording/reproducing for first, second and third optical discs by selectively using three types of substantially collimated light beams including first, second and third light beams respectively having first, second and third wavelengths, wherein at least one of optical surfaces of the objective optical system comprises a diffraction surface having a diffraction structure, the diffraction surface includes a first region defined by first and second optical path difference functions, a second region defined by at least one type of optical path difference function, and a third region defined by at least one type of optical path difference function, the first region satisfies a condition:

$$-0.15 < f1/fD_{11} < -0.03 \quad (1),$$

where $fD_{11} = -1/(2 \times P_{112} \times m_{11} \times \lambda)$, and
the diffraction surface satisfies a condition:

$$-0.05 < (\varphi_{13}(h3) - \varphi_{13}(h2))/(m_{13} \times f1) < -0.005 \quad (2).$$

24 Claims, 21 Drawing Sheets

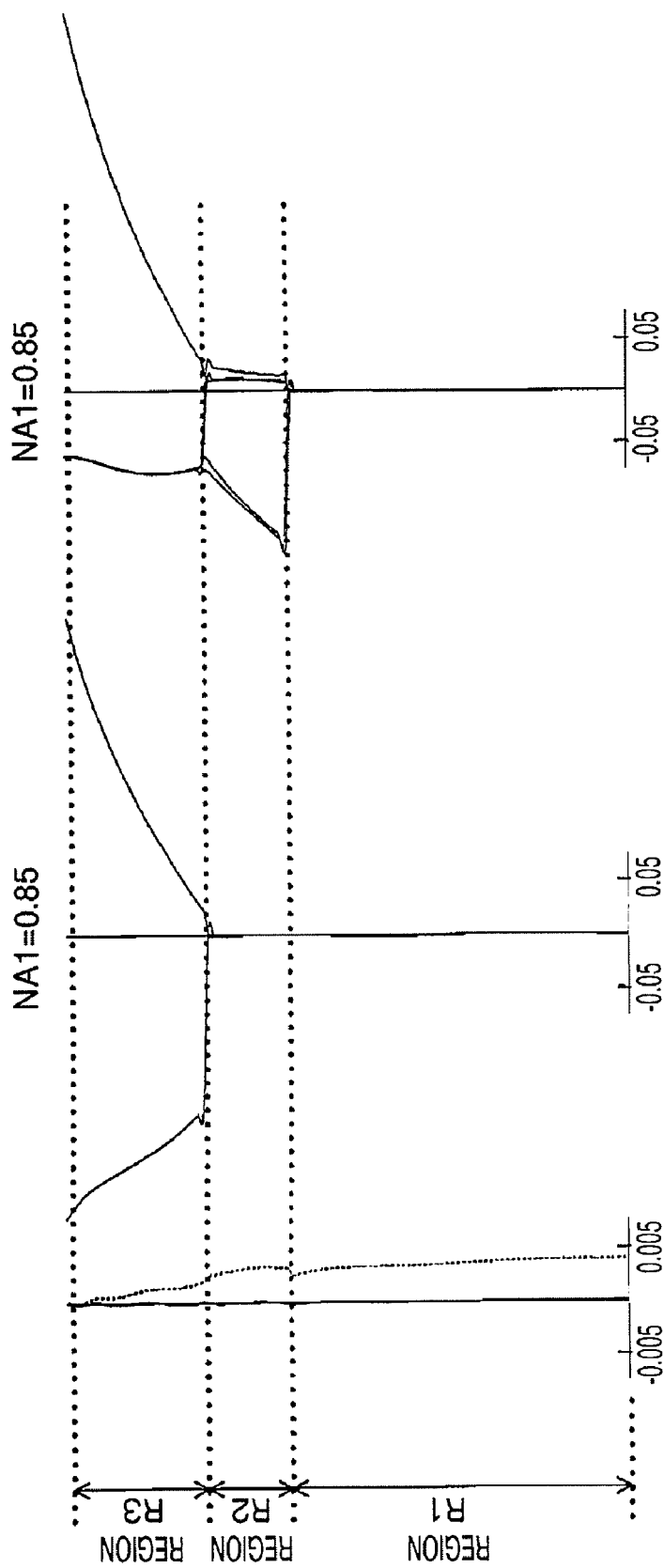

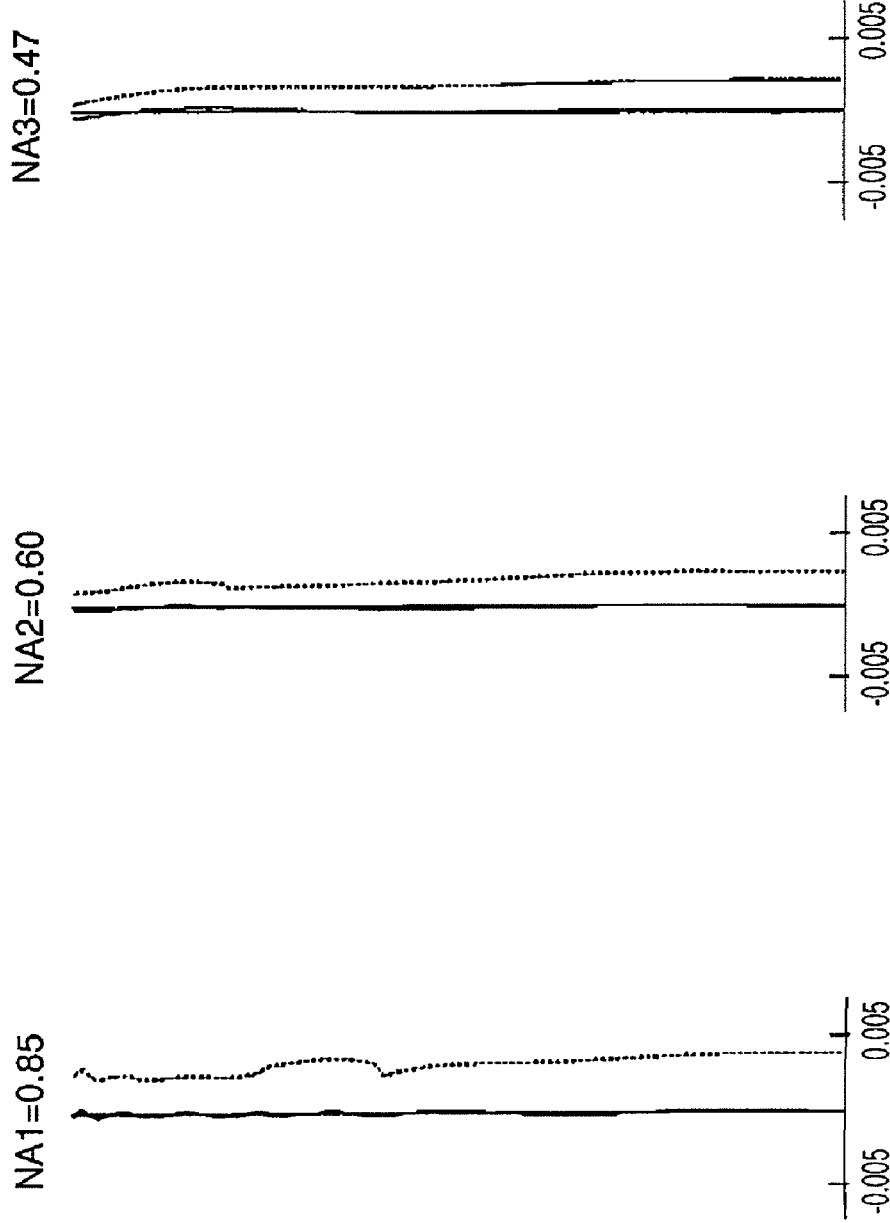

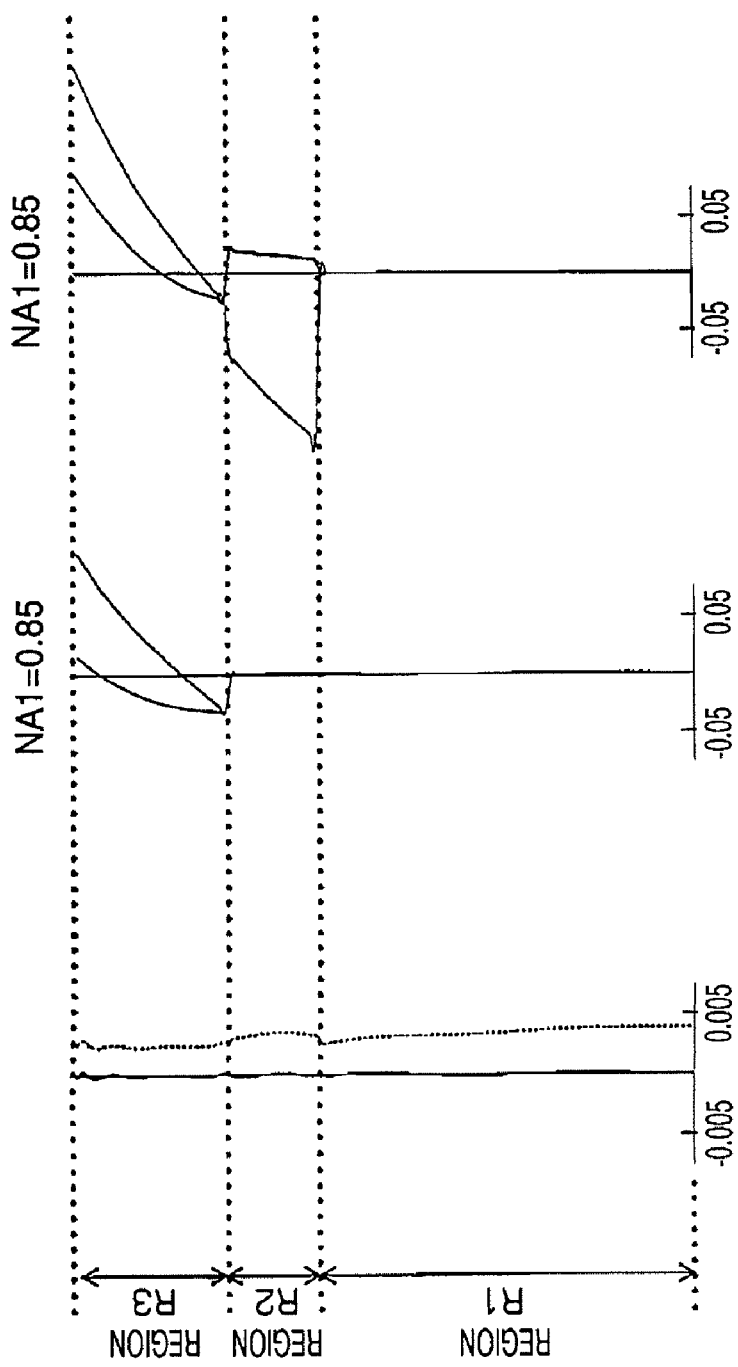

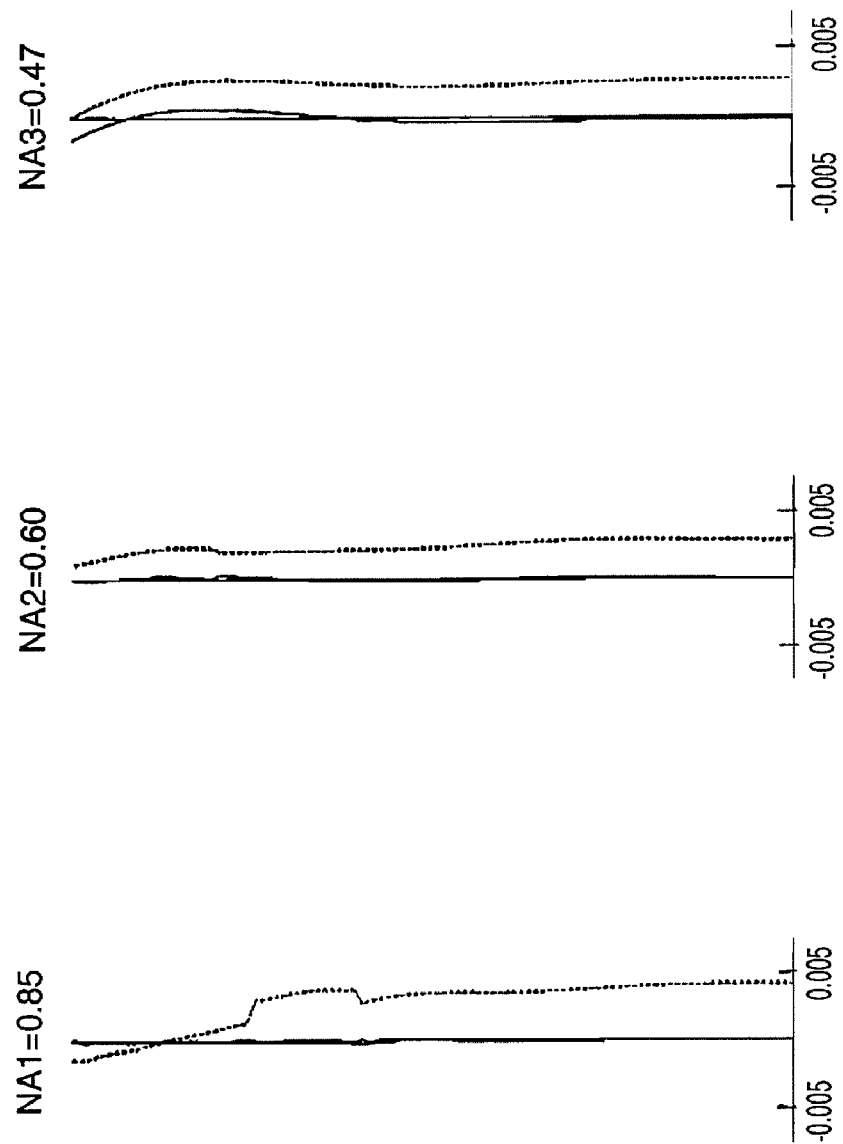

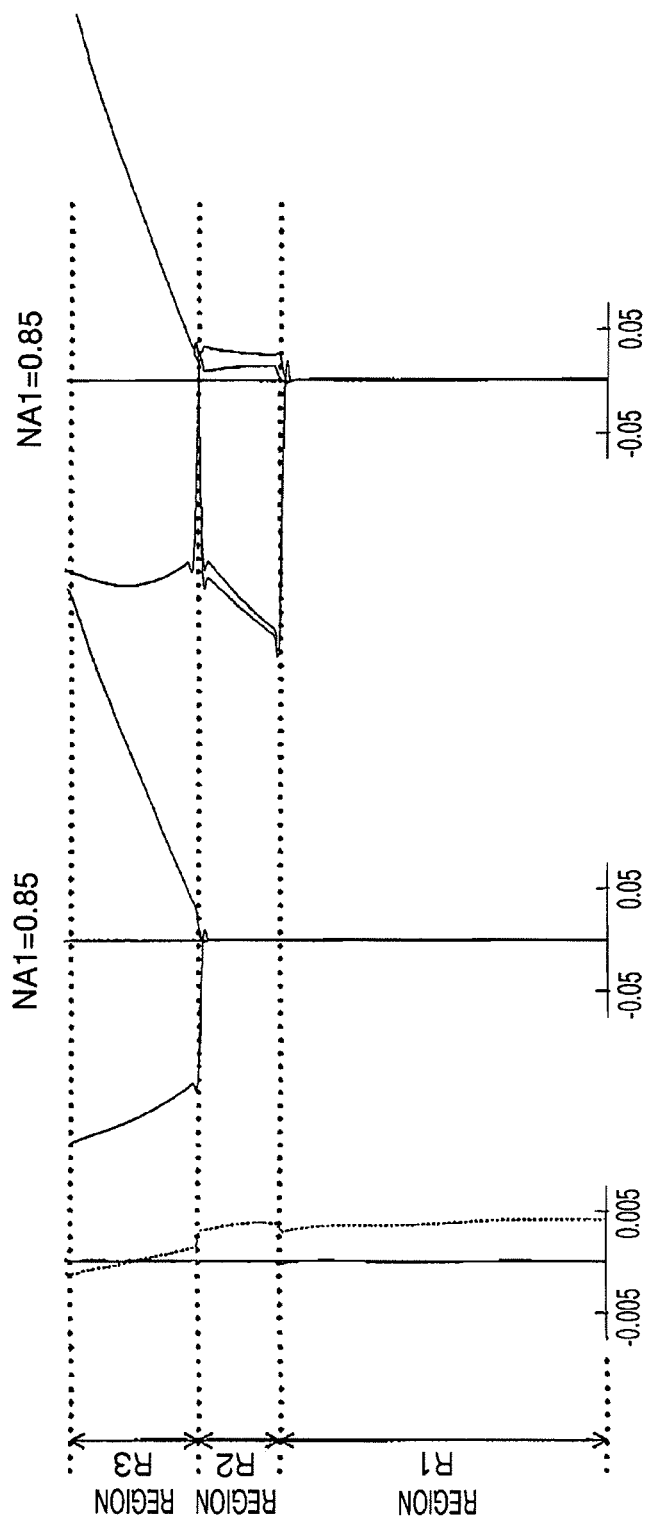

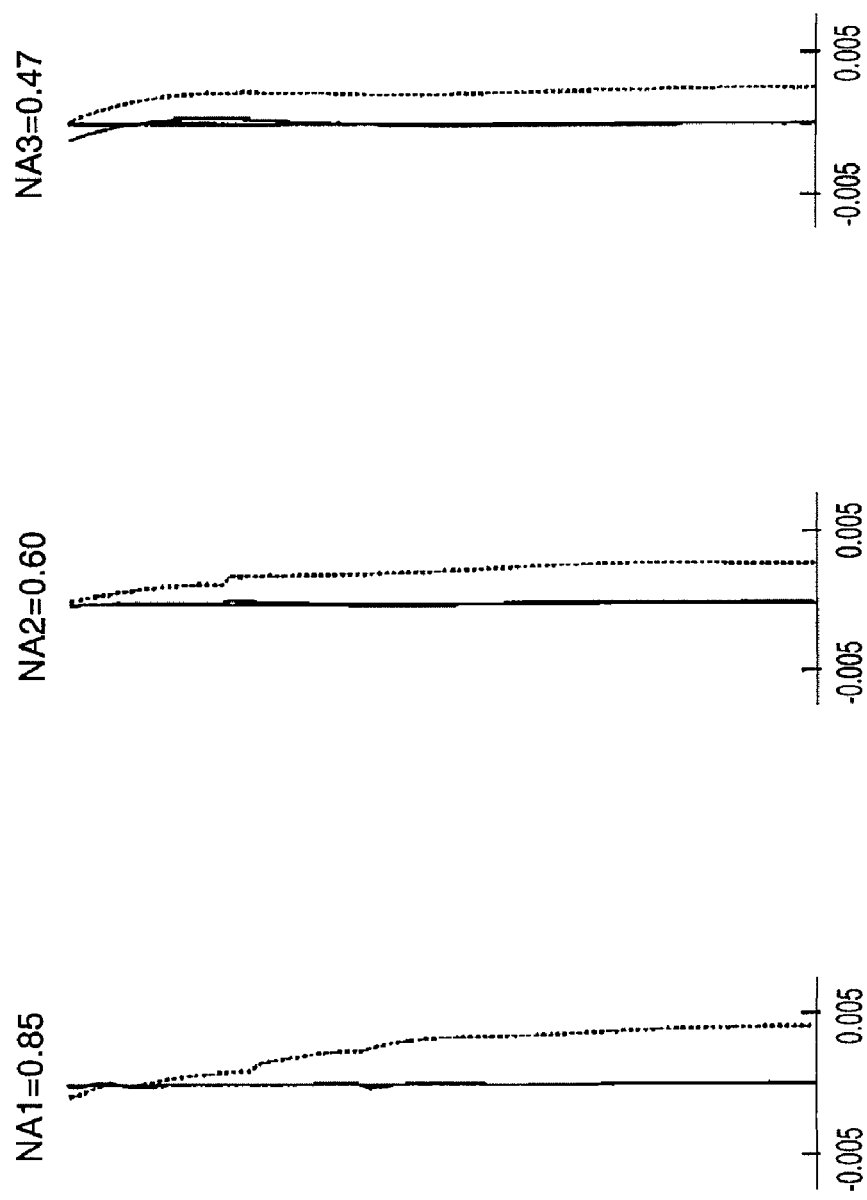

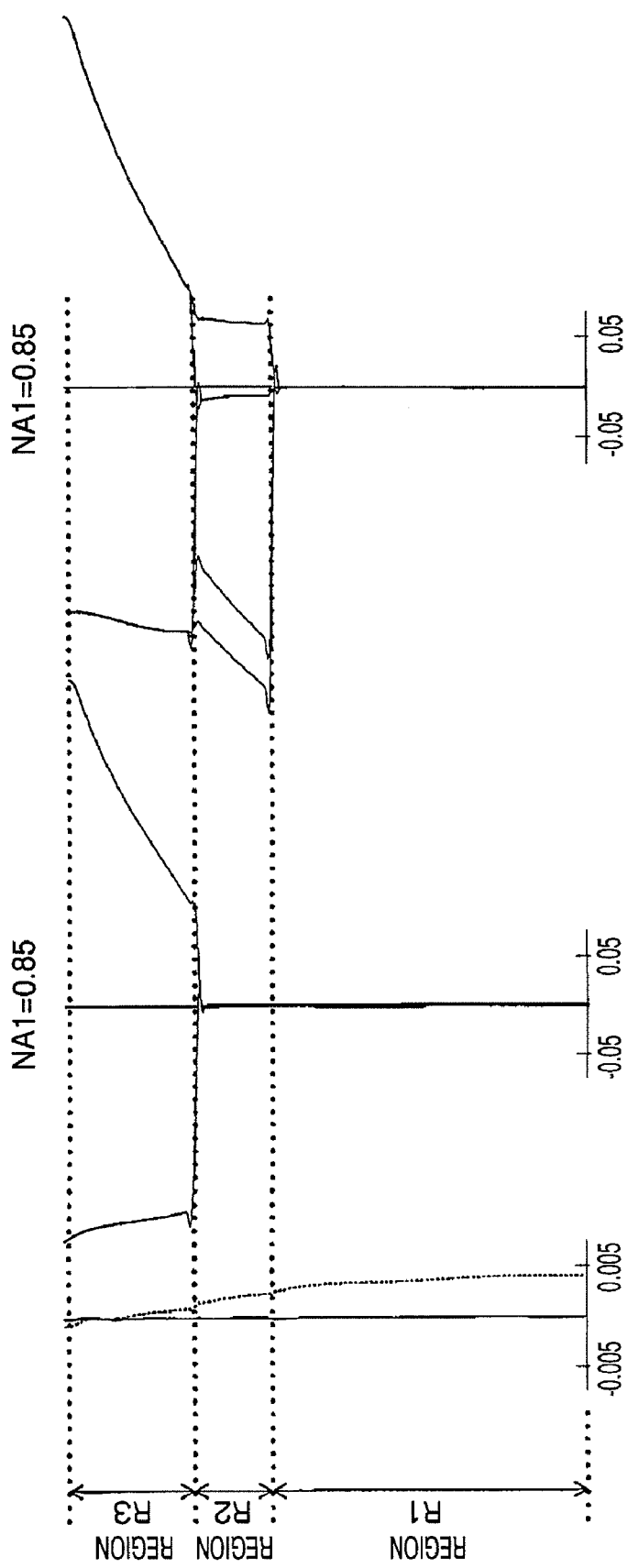

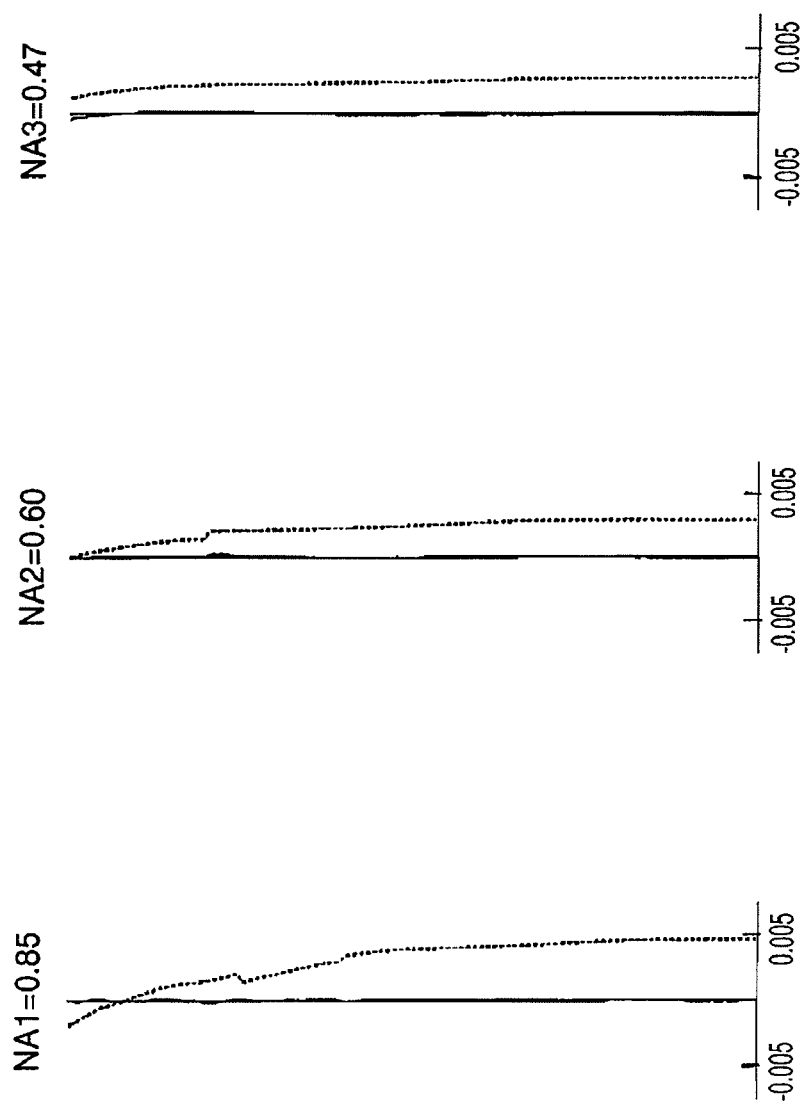

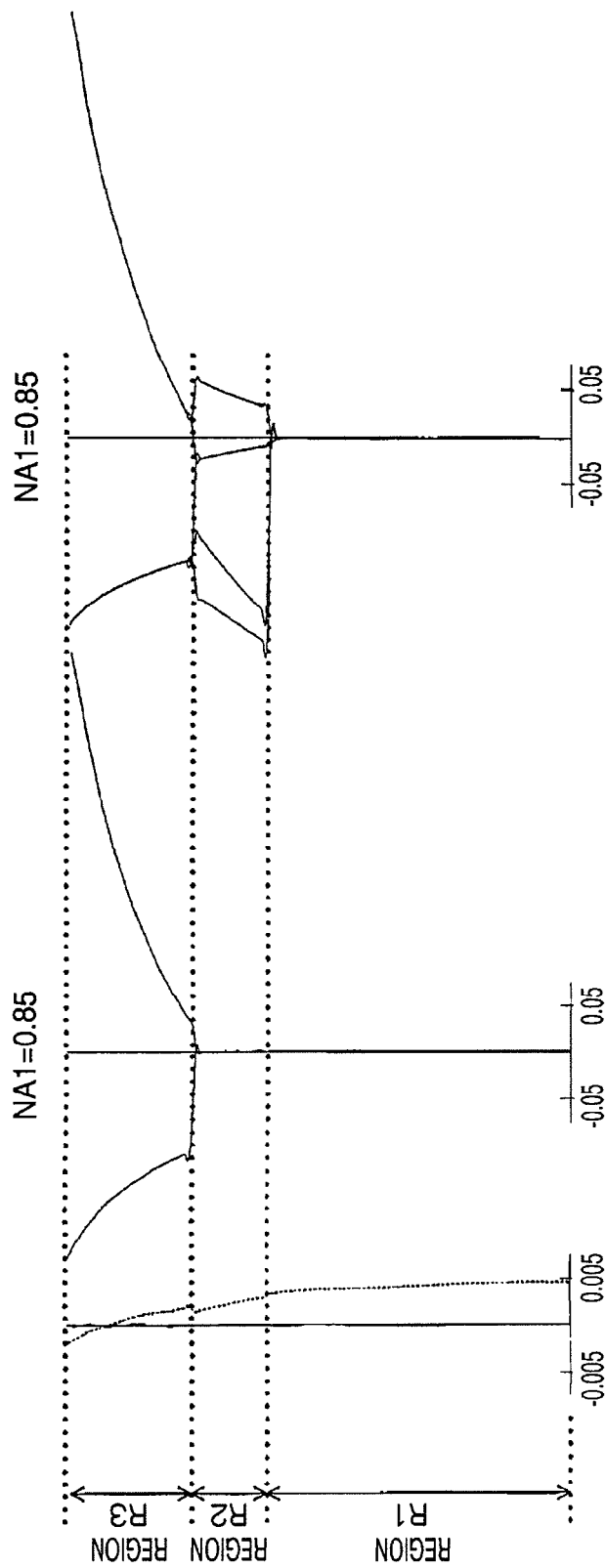

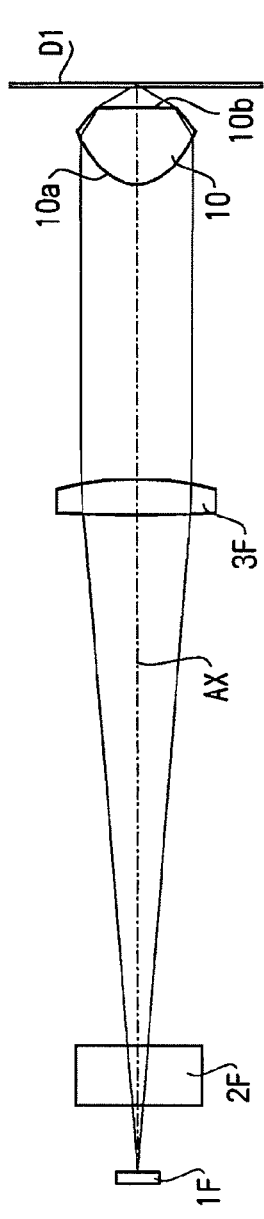
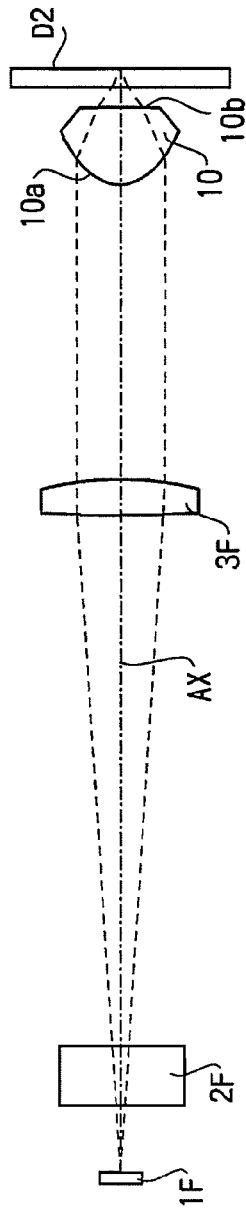
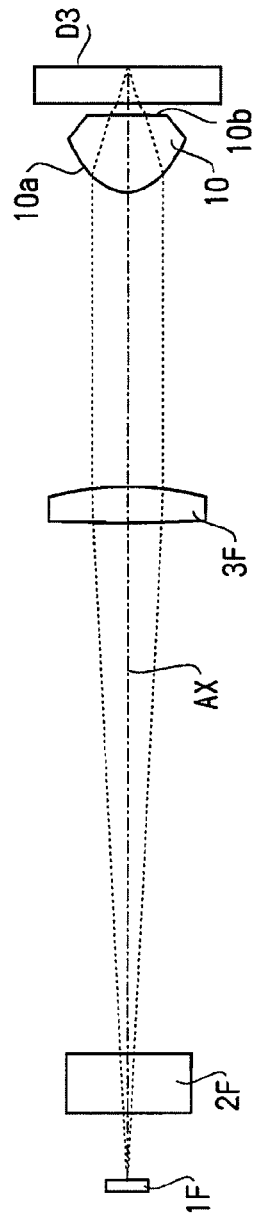

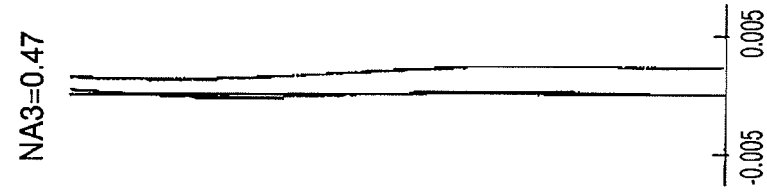
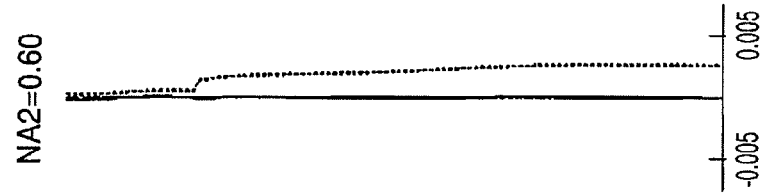
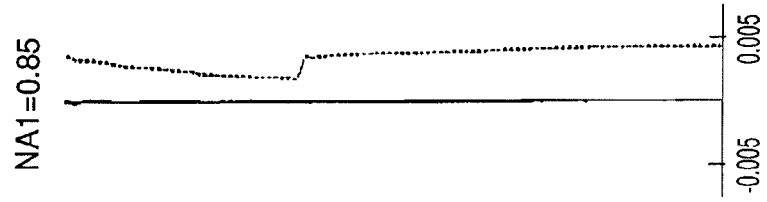

OPTICAL INFORMATION RECORDING/REPRODUCING APPARATUS AND OBJECTIVE OPTICAL SYSTEM FOR THE SAME

BACKGROUND OF THE INVENTION

The present invention relates to an objective optical system for an optical information recording/reproducing apparatus adapted to record information to and/or reproduce information from a plurality of types of optical discs based on different standards, and to an optical information recording/reproducing apparatus on which the objective optical system is mounted.

There exist various standards of optical discs, such as DVD (Digital Versatile Disc) and BD (Blu-ray Disc), differing in recording density, protective layer thickness, etc. Therefore, the objective optical system mounted on the optical information recording/reproducing apparatus is required to have a compatibility with the plurality of types of optical discs. The "compatibility" as used herein means to guarantee realizing information recording and information reproducing without the need for replacement of components even when the optical disc being used is changed.

In order to achieve the compatibility with the plurality of types of optical discs based on the different standards, it is necessary to correct the relative spherical aberration caused by the difference in protective layer thickness between the plurality of types of optical discs and to form a suitable beam spot for each of the plurality of types of optical discs in accordance with the difference in recording density between the plurality of types of optical discs, by changing the numerical aperture NA of the objective optical system used for information recording or information reproducing. The optical information recording/reproducing apparatus is configured to selectively use one of laser beams having different wavelengths respectively corresponding to recording densities of the plurality of types of optical discs. That is, the optical information recording/reproducing apparatus selectively uses one of the laser beams in accordance with the recording density of an optical disc being used. The optical information recording/reproducing apparatus uses, for example, light having the wavelength of approximately 790 nm (i.e., near infrared laser light) for information recording or reproducing for CD, light having the wavelength of approximately 660 nm (i.e., red laser light) for information recording or reproducing for DVD and light having the wavelength of approximately 405 nm (i.e., blue laser light) for information recording or reproducing for BD.

Each of Japanese Patent Provisional Publication No. 2006-164498A (hereafter, referred to as JP2006-164498A) and International Publication No. WO 2008/007552 discloses an optical information recording/reproducing apparatus having the compatibility with three types of optical discs.

The optical information recording/reproducing apparatus disclosed in JP2006-164498A has an objective optical system provided with a diffraction structure configured such that the diffraction order at which the diffraction efficiency is maximized for the blue laser light is an even order so that the diffraction efficiency can be enhanced for the near infrared laser light. In order to correct the spherical aberration when the near infrared laser light is used, it is necessary to cause the near infrared laser light to be incident on the objective optical system as a diverging beam. In this case, it is impossible to avoid occurrence of off-axis aberrations, such as a coma, when the objective optical system is shifted by a small amount in a direction orthogonal to an optical axis of the objective optical system for a tracking operation.

The optical information recording/reproducing apparatus disclosed in WO 2008/007552 is configured to cause each of the blue laser light and the red laser light to be incident on the objective optical system as a collimated beam, and to cause the near infrared laser light to be incident on the objective optical system as a collimated beam or a diverging beam. In WO 2008/007552, the objective optical system is designed to try to suppress deterioration of a signal due to flare light by appropriately setting converging points of two types of orders of diffracted light caused in a central region of an objective optical element. However, since the converging positions of the two types orders of diffracted light are close to each other, the configuration disclosed in WO 2008/007552 is not adequate for the measure against the flare light. Furthermore, since a peripheral region of the objective optical element provided as a dedicated region for the blue laser light is a refractive surface, it is impossible to control the spherical aberration caused, for example, by the wavelength variation of laser light or the temperature change.

SUMMARY OF THE INVENTION

The present invention is advantageous in that it provides at least one of an objective optical system of an optical information recording/reproducing apparatus adapted to execute information recording or information reproducing for a plurality of types of optical discs, such as BD, DVD and CD based on different standards, and an optical information recording/reproducing apparatus on which the objective optical system is mounted.

According to an aspect of the invention, there is provided an objective optical system for an optical information recording/reproducing apparatus for recording information to and/or reproducing information from three types of optical discs including first, second and third optical discs differing in recording density by selectively using three types of substantially collimated light beams including first, second and third light beams respectively having first, second and third wavelengths. When $\lambda 1$ (unit: nm) represents the first wavelength, $\lambda 2$ (unit: nm) represents the second wavelength and $\lambda 3$ (unit: nm) represents the third wavelength, the first, second and third wavelengths satisfies a condition: $\lambda 1 < \lambda 2 < \lambda 3$. When t1 (unit: mm) represents a protective layer thickness of the first optical disc for which information recording or information reproducing is performed by using the first light beam, t2 (unit: mm) represents a protective layer thickness of the second optical disc for which information recording or information reproducing is performed by using the second light beam, and t3 (unit: mm) represents a protective layer thickness of the third optical disc for which information recording or information reproducing is performed by using the third light beam, t1, t2 and t3 satisfying conditions: $t1 < t2 < t3$; and $t3 - t1 \geq 1.0$. When NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition: $NA1 > NA2 > NA3$.

In this configuration, at least one of optical surfaces of the objective optical system comprises a diffraction surface hav ing a diffraction structure defined by an optical path difference function:

$$\phi ik(h)=(P_{ik2}\times h^2+P_{ik4}\times h^4+P_{ik6}\times h^6+P_{ik8}\times h^8+P_{ik10}\times h^{10}+P_{ik12}\times h^{12})m_{ik}\lambda$$

where h represents a height from an optical axis, $P_{ik2}$, $P_{ik4}$, $P_{ik6}$ ... (i, k: natural numbers) represent optical path difference coefficients of $2^{nd}$ order, $4^{th}$ order, $6^{th}$ order, ... of an i-th optical path difference function in a k-th region, $m_{ik}$ represents a diffraction order at which diffraction efficiency is maximized for an incident light beam in regard to the i-th optical path difference function of the k-th region, and $\lambda$ represents a use wavelength of the incident light beam. The diffraction surface includes a first region contributing to converging the first, second and third light beams onto recording surfaces of the first, second and third optical discs, respectively. The first region comprises a diffraction structure defined by a first optical path difference function and a diffraction structure defined by a second optical path difference function. The diffraction structure defined by the first optical path difference function in the first region is configured such that diffraction orders at which diffraction efficiencies are maximized respectively for the first, second and third light beams are 1st-orders. When f1 (unit: mm) represents a focal length of the objective optical system with respect to the first light beam, and $fD_{11}$ represents a focal length (unit: mm) of the diffraction structure defined by the first optical path difference function in the first region, the first region satisfies a condition:

$$-0.15<f1/fD_{11}<-0.03 \tag{1}$$

where $fD_{11}=-1/(2\times P_{112}\times m_{11}\times\lambda)$.

Furthermore, the diffraction structure defined by the second optical path difference function in the first region is configured such that diffraction orders at which diffraction efficiencies are maximized respectively for the first, second and third light beams are 2nd-order, 1st-order and 1st-order, respectively. The diffraction surface includes a second region located outside the first region, the second region contributing to converging the first and second light beams onto the recording surfaces of the first and second optical discs, respectively, and not contributing to converging of the third light beam. The second region has a diffraction structure defined by at least one type of optical path difference function. The diffraction structure in the second region is configured such that diffraction orders at which diffraction efficiencies are maximized respectively for the first and second light beams are 1st-orders. The diffraction surface includes a third region located outside the second region, the third region contributing to converging the first light beam onto the recording surface of the first optical disc, and not contributing to converging each of the second and third light beams. The third region has a diffraction structure defined by at least one type of optical path difference function. The diffraction structure in the third region is configured such that a diffraction order at which a diffraction efficiency is maximized for the first light beam is an odd-order. When h2 (unit: mm) represents a maximum effective radius of the second region and h3 (unit: mm) represents a maximum effective radius of the third region, the diffraction surface satisfying a condition:

$$-0.05<(\phi_{13}(h3)-\phi_{13}(h2))/(m_{13}\times f1)<-0.005 \tag{2}$$

By satisfying the condition (1), it becomes possible to suitably correct the spherical aberration during use of the first optical disc while securing an adequate working distance during use of the third optical disc. When the intermediate term of the condition (1) gets larger than the upper limit of the condition (1), the chromatic aberration caused when the first optical disc is used becomes excessive as compensation for securing an adequate working distance for the third optical disc. When the intermediate term of the condition (1) gets smaller than the lower limit of the condition (1), the amount of chromatic aberration caused when the first optical disc is used can be suppressed. However, in this case, as compensation for suppressing the amount of chromatic aberration caused when the first optical disc is used, it becomes difficult to secure an adequate working distance when the third optical disc is used, and there is a possibility that undesired diffraction order light of the third laser beam caused after passing through the first region converges in the vicinity of the recording surface of the third optical disc and thereby deteriorates the property of the beam spot.

By satisfying the condition (2), it becomes possible to avoid the undesired diffraction order light of each of the second and third light beams, which have passed through the third region, from converging in the vicinity of corresponding one of the imaging points of the second and third light beams which have passed through the first region, while suitably correcting the spherical aberration due to change of environmental conditions when the first optical disc is used. As a result, it becomes possible to prevent occurrence of deterioration of the spot property. When the intermediate term of the condition (2) gets smaller than the lower limit of the condition (2), the spherical aberration caused by the temperature change becomes an overcorrected condition, and in this case manufacturing of the diffraction surface becomes difficult because of increase of the number of steps. When the intermediate term of the condition (2) gets larger than the upper limit of the condition (2), the undesired diffraction order light of each of the second and the third laser beams which have passed through the third region converges in the vicinity of corresponding one of the imaging points of the second and third light for the second and third optical discs. As a result, the spot property deteriorates largely.

In at least one aspect, when $fD_{21}$ (unit: mm) represents the focal length of the diffraction structure defined by the second optical path difference function in the first region, the diffraction surface may satisfy a condition:

$$0\leq f1/fD_{21}<0.15 \tag{3}$$

where $fD_{21}=-1/(2\times P_{212}\times m_{21}\times\lambda)$.

When the intermediate term of the condition (3) gets larger than the upper limit of the condition (3), the chromatic aberration becomes an undercorrected condition for all of the first to third optical discs. When the intermediate term of the condition (3) gets smaller than the lower limit of the condition (3), the chromatic aberration becomes an overcorrected condition for all of the first to third optical discs.

In at least one aspect, the diffraction surface may satisfy a condition:

$$-0.10<f1/fD_{11}<-0.05 \tag{4}$$

By satisfying the condition (4), it becomes possible to more suitably correct the chromatic aberration particularly when the first optical disc is used, while securing an adequate working distance for the third optical disc.

In at least one aspect, the diffraction surface may satisfy a condition:

$$0\leq f1/fD_{21}<0.01 \tag{5}$$

By satisfying the condition (5), it becomes possible to more suitably correct the chromatic aberration for all of the first to third optical discs.

In at least one aspect, when $fD_{13}$ (unit: mm) represents a focal length of the diffraction structure defined by a first optical path difference function in the third region, the diffraction surface may satisfy a condition:

$$-0.150 < f1/fD_{13} < -0.015 \qquad (6)$$

where $fD_{21} = -1/(2 \times P_{132} \times m_{13} \times \lambda)$.

By satisfying the condition (6), it becomes possible to prevent each of the second and third light beams, which have passed through the third region, from converging in the vicinity of corresponding one of the recording surfaces of the second and third optical discs. When the condition (6) is not satisfied, the undesired diffraction order light (having a relatively high diffraction efficiency) of each of the second and third light beams which have passed through the third region converges in the vicinity of corresponding one of the imaging points of the second and third light beams which have passed through the first region, and thereby deteriorates the spot property on each of the second and third optical discs.

In at least one aspect, the diffraction surface may satisfy a condition:

$$-0.03 < (\phi_{13}(h3) - \phi_{13}(h2))/(m_{13} \times f1) < -0.01 \qquad (7).$$

By satisfying the condition (7), it becomes possible to more appropriately control variation of the spherical aberration due to the temperature changes, and to prevent deterioration of the spot property due to the undesired diffraction order light of each of the second and third light beams.

In at least one aspect, the diffraction surface may be configured such that in the third region, a diffraction order at which a diffraction efficiency is maximized for the first light beam is a 1st-order.

In at least one aspect, the diffraction surface is configured such that in the second region the diffraction surface has a diffraction structure defined by a first optical path difference function for the second region and a diffraction structure defined by a second optical path difference function for the second region. In this case, when h1 (unit: mm) represents a maximum effective radius of the first region, the diffraction surface satisfies a condition:

$$-0.05 < (\phi_{22}(h2) - \phi_{22}(h1))/f1 < -0.03 \qquad (8).$$

In at least one aspect, the diffraction surface may be configured such that in the second region the diffraction surface has a diffraction structure defined by a first optical path difference function for the second region and a diffraction structure defined by a second optical path difference function for the second region. In this case, when h1 (unit: mm) represents a maximum effective radius of the first region and $fD_{22}$ (unit: mm) represents a focal length of the diffraction structure defined by the second optical path difference function in the second region, the diffraction surface satisfies conditions:

$$-0.03 < (\phi_{22}(h2) - \phi_{22}(h1))/f1 < 0 \qquad (9); \text{ and}$$

$$0 \leq f1/fD_{22} < 0.08 \qquad (10),$$

where $fD_{22} = -1/(2 \times P_{222} \times m_{22} \times \lambda)$.

When the intermediate term of the condition (8) gets larger than the upper limit of the condition (8), the strong undesired diffraction order light of the third light beam which has passed through the second region converges in the vicinity of the imaging point of the third light beam which has passed through the first region, and thereby deteriorates the spot property on the recording surface of the third optical disc. When the intermediate term of the condition (8) gets smaller than the lower limit of the condition (8), the spherical aberration due to the temperature change becomes an overcorrected condition particularly during use of the second optical disc. By satisfying the condition (8), it becomes possible to avoid deterioration of the spot property by such undesired diffraction order light, and it becomes possible to suitably correct the spherical aberration with respect to the temperature change during use of the second optical disc.

When the intermediate term of the condition (9) gets larger than the upper limit of the condition (9), the spherical aberration due to the temperature change becomes an undercorrected condition particularly during use of the second optical disc. When the intermediate term of the condition (9) gets smaller than the lower limit of the condition (9), the strong undesired diffraction order light of the third light beam which has passed through the second region converges in the vicinity of the imaging point of the third light beam which has passed through the first region, and thereby deteriorates the spot property on the recording surface of the third optical disc.

When the condition (10) is not satisfied, the strong undesired diffraction order light of the third light beam which has passed through the second region converges in the vicinity of the imaging point of the third light beam which has passed through the first region, and thereby deteriorates the spot property on the recording surface of the third optical disc. When the conditions (9) and (10) are satisfied simultaneously, the strong diffraction order light of the third light beam which has passed through the second region converges at a position away from the imaging point of the third light beam which has passed through the first region. As a result, it becomes possible to avoid deterioration of the spot property.

In at least one aspect, the objective optical system may comprise an objective lens; and an optical element having at least one surface formed as the diffraction surface.

In at least one aspect, the objective optical system may comprise an objective lens having at least one surface formed as the diffraction surface.

According to another aspect of the invention, there is provided an objective optical system for an optical information recording/reproducing apparatus for recording information to and/or reproducing information from three types of optical discs including first, second and third optical discs differing in recording density by selectively using three types of substantially collimated light beams including first, second and third light beams respectively having first, second and third wavelength. When $\lambda 1$ (unit: nm) represents the first wavelength, $\lambda 2$ (unit: nm) represents the second wavelength and $\lambda 3$ (unit: nm) represents the third wavelength, the first, second and third wavelengths satisfy a condition: $\lambda 1 < \lambda 2 < \lambda 3$. When t1 (unit: mm) represents a protective layer thickness of the first optical disc for which information recording or information reproducing is performed by using the first light beam, t2 (unit: mm) represents a protective layer thickness of the second optical disc for which information recording or information reproducing is performed by using the second light beam, and t3 (unit: mm) represents a protective layer thickness of the third optical disc for which information recording or information reproducing is performed by using the third light beam, t1, t2 and t3 satisfying conditions: t1<t2<t3; and t3−t1≧1.0. When NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfy a condition: NA1>NA2>NA3.

In this configuration, at least one optical surface of optical surfaces of the objective optical system includes a phase shift surface having a phase shift structure formed of a plurality of concentrically divided refractive surface zones. The phase shift surface includes a first region which contributes to converging the first, second and third light beams onto recording surfaces of the first, second and third optical discs, respectively, The first region includes a phase shift structure having a first step giving an optical path length difference to an incident light beam at a boundary between adjacent ones of the plurality of refractive surface zones, and a phase shift structure having a second step giving an optical path length difference to an incident light beam at a boundary between adjacent ones of the plurality of refractive surfaces zones, the optical path length differences given by the first and second steps being different from each other. When $\Delta OPD_{ik}$ (unit: nm) represents an optical path length difference given by an i-th step in a k-th region, and $N_{ik}$ represents a number of steps of the i-th step in the k-th region, and f1 (unit: mm) represents a focal length of the objective optical system with respect to the first light beam, the first step in the first region satisfies conditions:

$$INT|(\Delta OPD_{11}/\lambda 1)+0.5|=1 \qquad (11); \text{ and}$$

$$0.60\times 10^2 < N_{11} \times f1 < 2.50\times 10^2 \qquad (12),$$

and the second step in the first region satisfies a condition:

$$INT|(\Delta OPD_{21}/\lambda 1)+0.5|=2 \qquad (13).$$

Furthermore, the phase shift surface includes a second region outside the first region, the second region being configured to contribute to converging the first and second light beams onto the recording surfaces of the first and second optical discs, respectively, and not to contribute to converging the third light beam. The second region includes a phase shift structure having a step giving at least one type of optical path length difference to an incident light beam at a boundary between adjacent ones of the plurality of refractive surface zones. The second region satisfies a condition:

$$INT|(\Delta OPD_{12}/\lambda 1)+0.5|=1 \qquad (14)$$

Furthermore, the phase shift surface includes a third region outside the second region, the third region being configured to contribute to converging the first light beam onto the recording surface of the first optical disc, and not to contribute to converging each of the second and third light beams. The third region includes a phase shift structure having a step giving at least one type of optical path length difference to an incident beam at a boundary between adjacent ones of the refractive surface zones. The third region satisfies conditions:

$$INT|(\Delta OPD_{13}/\lambda 1)+0.5|=2L+1 \qquad (15); \text{ and}$$

$$0.80\times 10^2 < N_{13} \times f1 < 3.50\times 10^2 \qquad (16)$$

where L is an integer.

By configuring the first step in the first region to satisfy the condition (12) in the first region which satisfies the conditions (11) and (13), it becomes possible to achieve a high diffraction efficiency for all of the use wavelengths, and to suitably correct the chromatic aberration during use of the first optical disc while securing an adequate working distance during use of the third optical disc. When the intermediate term of the condition (12) gets larger than the upper limit of the condition (12), the chromatic aberration becomes large particularly when the first optical disc is used, as compensation for securing an adequate working distance for the third optical disc. When the intermediate term of the condition (12) gets smaller than the lower limit of the condition (12), it becomes difficult to secure an adequate working distance for the third optical disc and the undesired diffraction order light of the third light beam which has passed the first region converges in the vicinity of the recording surface of the third optical disc and thereby deteriorates the spot property, although in this case the amount of chromatic aberration can be suppressed particularly when the first optical disc is used.

When the intermediate term of the condition (16) gets larger than the upper limit of the condition (16), the spherical aberration caused by change of the environmental condition during use of the first optical disc becomes an overcorrected condition. When the intermediate term of the condition (16) gets smaller than the lower limit of the condition (16), the spherical aberration caused by change of the environmental conditions during use of the first optical disc becomes an undercorrected condition, and each of the second and third light beams which have passed through the third region converges in the vicinity of the imaging point of the corresponding one of the second and third light beams which have passed through the first region, and thereby adversely affects the spot shape on the recording surface of the corresponding one of the second and third optical discs.

In at least one aspect, the phase shift surface may satisfy a condition:

$$0.04\times 10^2 \leq N_{21} \times f1 < 1.50\times 10^2 \qquad (17).$$

When the intermediate term of the condition (17) gets larger than the upper limit of the condition (17), the chromatic aberration becomes an overcorrected condition for all of the first to third optical discs. When the intermediate term of the condition (17) gets smaller than the lower limit of the condition (17), the chromatic aberration for the first and third optical discs becomes an undercorrected condition.

In at least one aspect, the phase shift surface may satisfies a condition:

$$1.20\times 10^2 < N_{11} \times f1 < 2.20\times 10^2 \qquad (18).$$

By satisfying the condition (18), it becomes possible to more suitable correct the chromatic aberration during use of the first optical disc while securing an adequate working distance for the third optical disc.

In at least one aspect, the phase shift surface may satisfy a condition:

$$0.04\times 10^2 \leq N_{21} \times f1 < 1.00\times 10^2 \qquad (19).$$

By satisfying the condition (19), it becomes possible to more suitably correct the chromatic aberration for all of the first to third optical discs.

In at least one aspect, the phase shift surface may satisfy a condition:

$$1.50\times 10^2 < N_{13} \times f1 < 3.00\times 10^2 \qquad (20).$$

By satisfying the condition (20), it becomes possible to appropriately control variation of the spherical aberration due to the temperature change in the third region, and to avoid deterioration of the spot property due to the undesired diffraction order light of each of the second and third light beams.

In at least one aspect, the phase shift surface may satisfy a condition:

$$INT|(\Delta OPD_{13}/\lambda 1)+0.5|=1 \qquad (21).$$

By satisfying the condition (21), in the third region, it becomes possible to suppress change of the diffraction efficiency caused by variation of the wavelength to a small level.

In at least one aspect, the phase shift surface in the second region may include a phase shift structure having a first step giving an optical path length difference to an incident light beam at a boundary between adjacent ones of the plurality of refractive surface zones and a phase shift structure having a second step giving an optical path length difference to an incident beam at a boundary between adjacent ones of the plurality of refractive surface zones, the optical path length differences given by the first and second steps being different from each other. In this case, the phase shift surface in the second region satisfies a condition:

$$0.25 \times 10^2 < N_{22} \times INT|(\Delta OPD_{22}/\lambda 1) + 0.5| \times f1 < 1.00 \times 10^2 \quad (22).$$

When the condition (22) is not satisfied, the strong undesired diffraction order light of the third light beam which has passed through the second region converges in the vicinity of the imaging point of the third light beam which has passed through the first region, and thereby deteriorates the spot property on the recording surface of the third optical disc.

In at least one aspect, the objective optical system may include an objective lens and an optical element configured such that the phase shift surface is formed on at least one of surfaces of the optical element.

In at least one aspect, the objective optical system may include an objective lens configured such that the phase shift structure is formed on at least one of surfaces of the objective lens.

In at least one aspect, the objective optical system may comprise an objective lens. In this case, when vd represents Abbe number of the objective lens at d-line, vd satisfies a condition:

$$35 \leq vd \leq 80 \quad (23).$$

According to another aspect of the invention, there is provided an optical information recording/reproducing apparatus for recording information to and/or reproducing information from three types of optical discs including first, second and third optical discs differing in recording density. The optical information recording/reproducing apparatus includes light sources which emit a first light beam having a first wavelength, a second light beam having a second wavelength and a third light beam having a third wavelength, respectively; coupling lenses that respectively convert the first, second and third light beams emitted by the light sources into substantially collimated beams, respectively; and one of the above described objective optical system. In this configuration, t1, t2 and t3 satisfy the conditions 0.05<t1<0.12; t2≈0.6; and t3≈1.2. When f1 (unit: mm) and M1 respectively represent a focal length and magnification of the objective optical system with respect to the first light beam, f2 (unit: mm) and M2 respectively represent a focal length and magnification of the objective optical system with respect to the second light beam, and f3 (unit: mm) and M3 respectively represent a focal length and magnification of the objective optical system with respect to the third light beam, the objective optical system satisfies conditions:

$$-0.02 < f1 \times M1 < 0.02 \quad (24);$$

$$-0.02 < f2 \times M2 < 0.02 \quad (25); \text{ and}$$

$$-0.02 < f3 \times M3 < 0.02 \quad (26).$$

The objective optical system includes an objective lens. When n1 represents a refractive index of the objective lens with respect the first light beam and n3 represents a refractive index of the objective lens with respect the third light beam, the objective lens satisfies a condition:

$$0.4 < (\lambda 1/(n3-1))/(\lambda 3/(n1-1)) < 0.6 \quad (27).$$

With this configuration, it is possible to suitably correct the spherical aberration for all of the first to third optical discs and to avoid deterioration of the spot property due to the undesired diffraction order light while securing an adequate working distance.

BRIEF DESCRIPTION OF THE ACCOMPANYING DRAWINGS

Figure 3A:
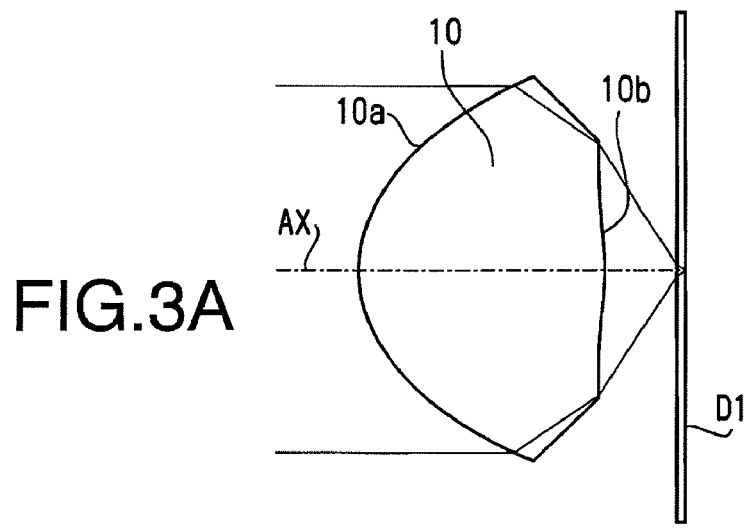
Figure 3B:
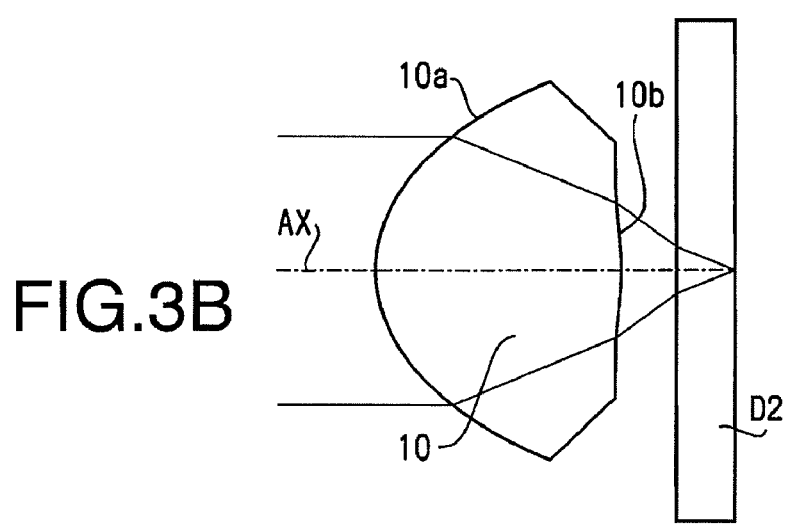
Figure 3C:
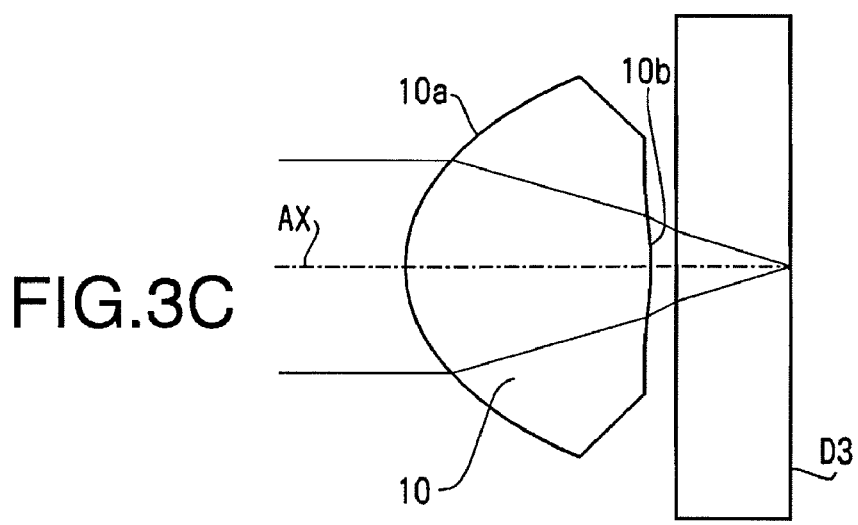

FIGS. 3A, 3B and 3C respectively illustrate side cross sections of the objective lens when optical discs D1, D2 and D3 are used.

Figure 4C:
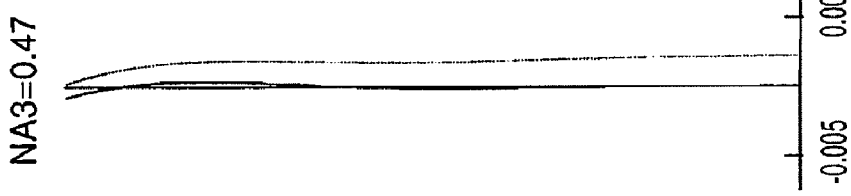
Figure 4B:
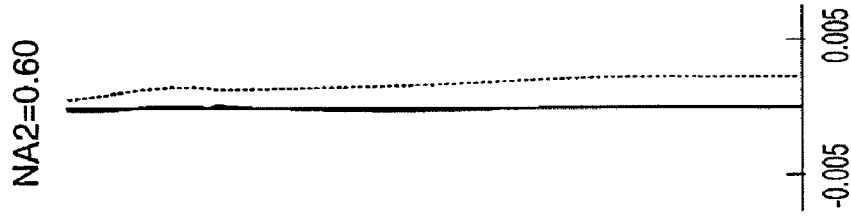
Figure 4A:
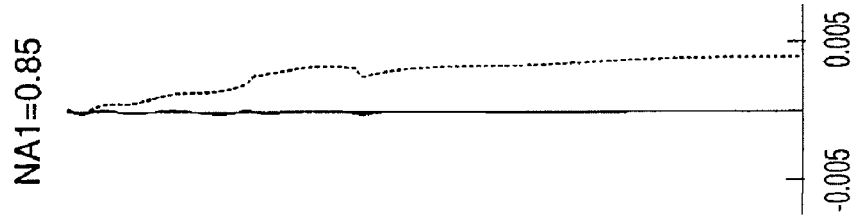

FIGS. 4A, 4B and 4C respectively illustrate the spherical aberrations on the recording surfaces of the optical discs D1 to D3 with respect to the respective NAs in a first example.

FIGS. 5A, 5B and 5C respectively illustrate the spherical aberrations on the recording surfaces of the optical disc D1 to D3 with respect to NA1 in the first example.

FIGS. 6A, 6B and 6C respectively illustrate the spherical aberrations on the recording surfaces of the optical discs D1 to D3 with respect to the respective NAs in a comparative example.

FIGS. 7A, 7B and 7C respectively illustrate the spherical aberrations on the recording surfaces of the optical disc D1 to D3 with respect to NA1 in the comparative example.

Figure 8A:
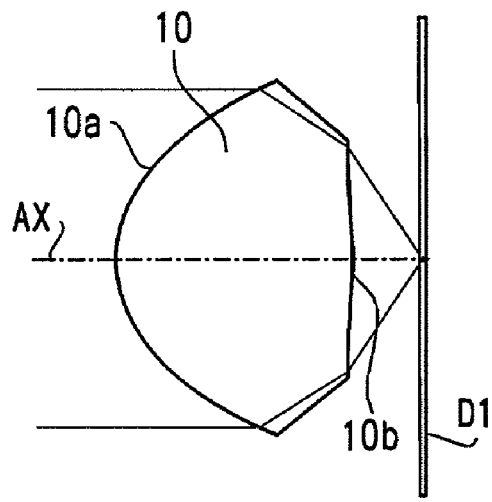
Figure 8B:
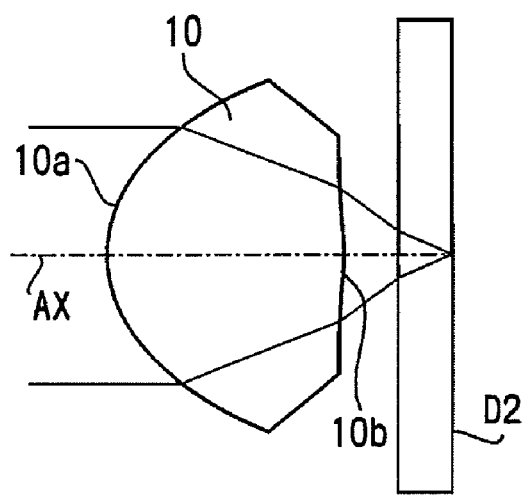
Figure 8C:
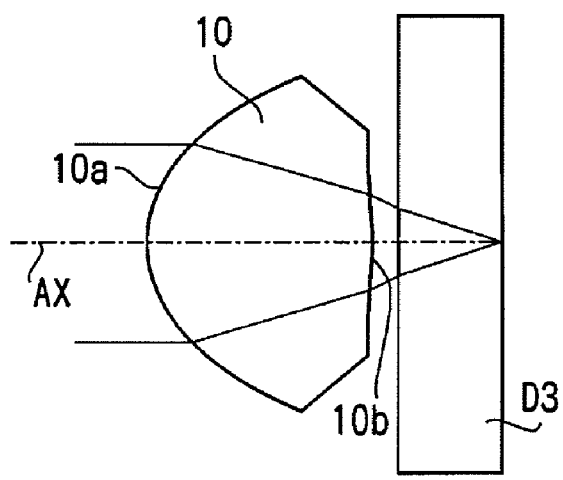

FIGS. 8A, 8B and 8C respectively illustrate side cross sections of the objective lens when optical discs D1, D2 and D3 are used in a second example.

FIGS. 9A, 9B and 9C respectively illustrate the spherical aberrations on the recording surfaces of the optical discs D1 to D3 with respect to the respective NAs in the second example.

FIGS. 10A, 10B and 10C respectively illustrate the spherical aberrations on the recording surfaces of the optical disc D1 to D3 with respect to NA1 in the second example.

Figure 11A:
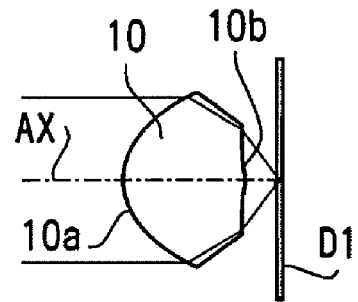
Figure 11B:
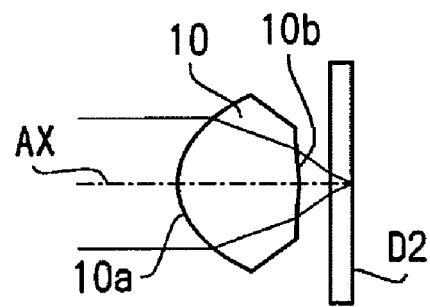
Figure 11C:
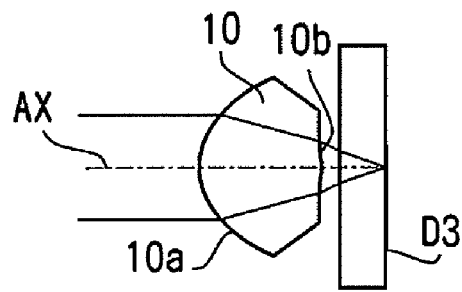

FIGS. 11A, 11B and 11C respectively illustrate side cross sections of the objective lens when optical discs D1, D2 and D3 are used in a third example.

FIGS. 12A, 12B and 12C respectively illustrate the spherical aberrations on the recording surfaces of the optical discs D1 to D3 with respect to the respective NAs in the third example.

FIGS. 13A, 13B and 13C respectively illustrate the spherical aberrations on the recording surfaces of the optical disc D1 to D3 with respect to NA1 in the third example.

Figure 14:
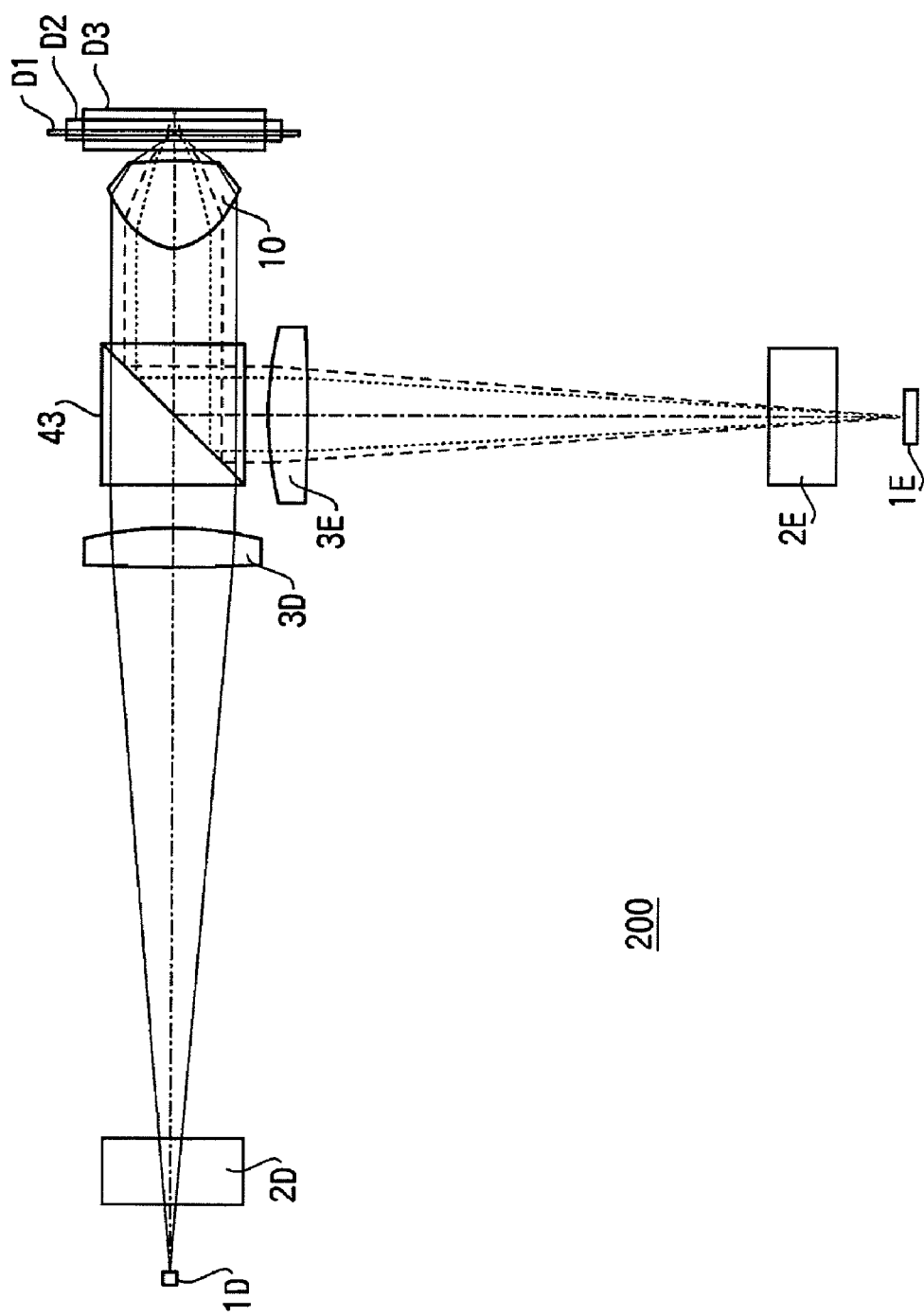

FIG. 14 is a block diagram illustrating a general configuration of an optical information recording/reproducing apparatus according to a fourth example.

Figure 15A:
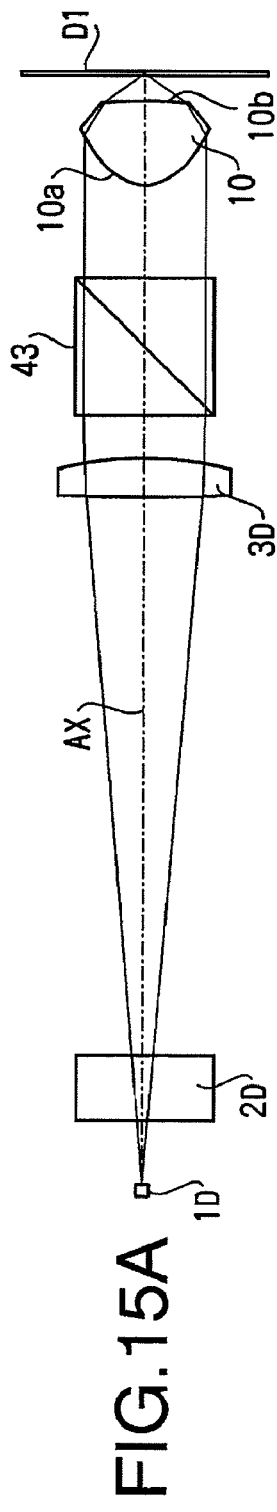
Figure 15B:
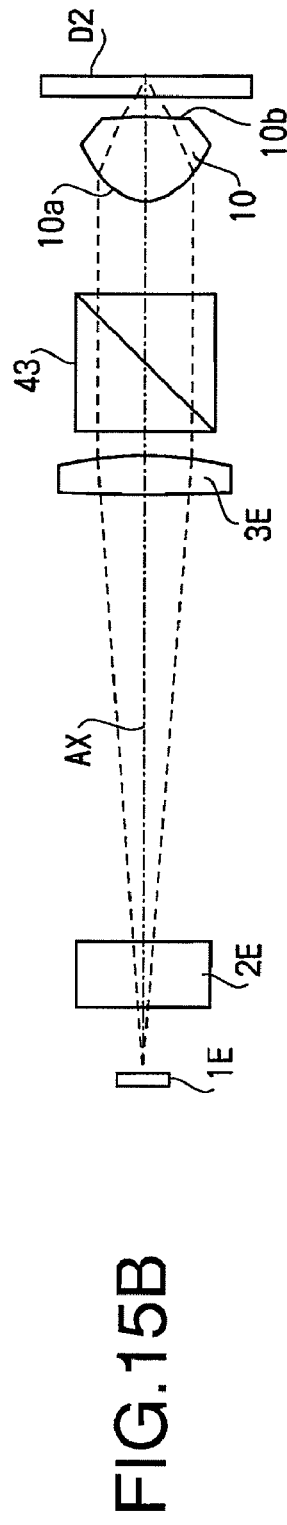
Figure 15C:
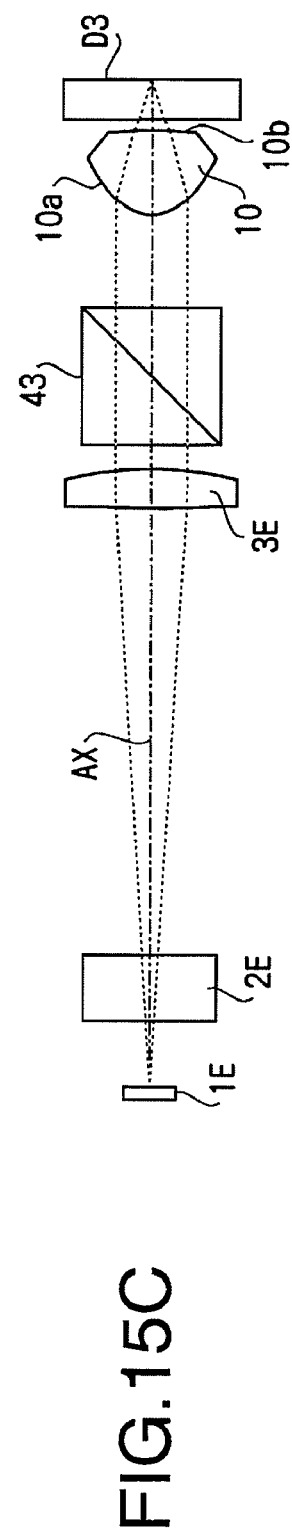

FIGS. 15A, 15B and 15C respectively illustrate developed optical paths when the optical discs D1, D2 and D3 are used in the optical information recording/reproducing apparatus according to the fourth example.

FIGS. 16A, 16B and 16C respectively illustrate the spherical aberrations on the recording surfaces of the optical discs D1 to D3 with respect to the respective NAs in the fourth example.

FIGS. 17A, 17B and 17C respectively illustrate the spherical aberrations on the recording surfaces of the optical disc D1 to D3 with respect to NA1 in the fourth example.

Figure 18:
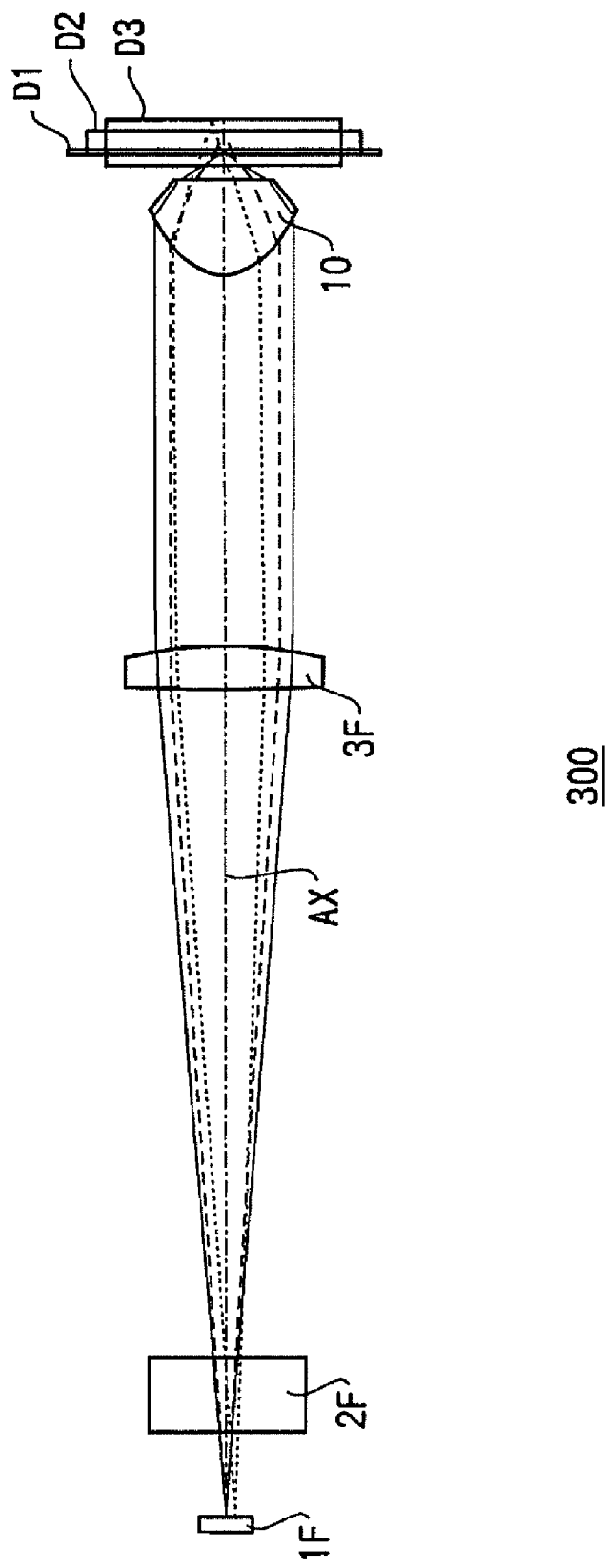

FIG. 18 is a block diagram illustrating a general configuration of an optical information recording/reproducing apparatus according to a fifth example.

FIGS. 19A, 19B and 19C respectively illustrate developed optical paths when the optical discs D1, D2 and D3 are used in the optical information recording/reproducing apparatus according to the fifth example.

FIGS. 20A, 20B and 20C respectively illustrate the spherical aberrations on the recording surfaces of the optical discs D1 to D3 with respect to the respective NAs in the fifth example.

Figures 21A, 21B, 21C:
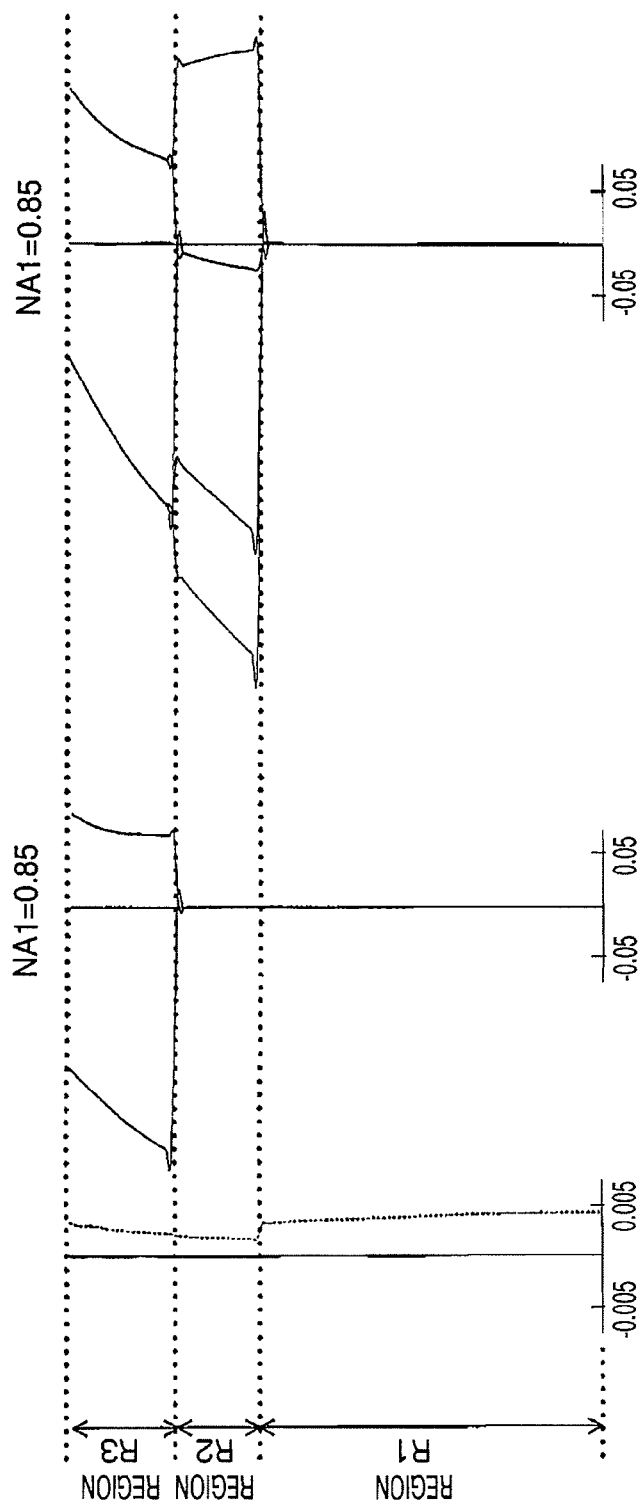

FIGS. 21A, 21B and 21C respectively illustrate the spherical aberrations on the recording surfaces of the optical disc D1 to D3 with respect to NA1 in the fifth example.

DETAILED DESCRIPTION OF THE EMBODIMENTS

Hereafter, an optical information recording/reproducing apparatus according to an embodiment of the present invention is described. The optical information recording/reproducing apparatus according to the embodiment is configured to recording information to and/or reproducing information from three types of optical discs based on different standards, such as, protective layer thickness and recording density. That is, the optical information recording/reproducing apparatus according to the embodiment has the compatibility with the three types of optical discs. In the following, of the three types of optical discs, a high-recording density optical disc (e.g., BD) is referred to as an optical disc D1, an optical disc (e.g., DVD) having a recording density lower than that of BD is referred to as an optical disc D2, and an optical disc (e.g., CD) having a recording density lower than that of DVD is referred to as an optical disc D3. Incidentally, in this specification, the "optical information recording/reproducing apparatuses" include apparatuses for both information reproducing and information recording, apparatuses exclusively for information reproducing, and apparatuses exclusively for information recording.

When the protective layer thicknesses of the optical discs D1 to D3 are respectively defined as t1 (unit: mm), t2 (unit: mm) and t3 (unit: mm), the following relationships hold.

$$t1 < t2 < t3$$

$$t3 - t1 \geq 1.0$$

$$0.05 < t1 < 0.12$$

$$t2 \approx 0.6$$

$$t3 \approx 1.2$$

In order to execute information recording or information reproducing for each of the optical discs D1 to D3, it is necessary to change the required numerical aperture (NA) so that a suitable beam spot can be obtained depending on the difference in recording density between the optical discs D1 to D3. When optimal design numerical apertures required for information recording or information reproducing for the optical discs D1 to D3 are defined as NA1, NA2 and NA3, respectively, the following relationship holds.

$$NA1 > NA2 > NA3$$

That is, when the optical disc D1 having the highest recording density is used, the required NA becomes highest since in this case a beam spot smaller than those for the optical discs D2 and D3 is required. On the other hand, when the optical disc D3 is used, the required NA becomes lowest since in this case a beam spot which is larger than those for the optical discs D1 and D2 is required.

In the optical information recording/reproducing apparatus, one of laser beams having different wavelengths is selectively used so that a suitable beam spot can be obtained depending on the recording density of the optical disc being used. Specifically, when the optical disc D1 is used, a laser beam having a wavelength $\lambda 1$ (unit: nm) is emitted from a light source to form a beam spot having the smallest diameter on a recording surface of the optical disc D1. When the optical disc D2 is used, a laser beam having a wavelength $\lambda 2$ (unit: nm) which is longer than the wavelength $\lambda 1$ is emitted from a light source to form the beam spot having a diameter larger than that of the beam spot for the optical disc D1 on a recording surface of the optical disc D2. When the optical disc D3 is used, a laser beam having a wavelength $\lambda 3$ (unit: nm) which is longer than the wavelength $\lambda 2$ is emitted from a light source to form a beam spot having a diameter larger than that of the beam spot for the optical disc D2 on a recording surface of the optical disc D3. That is, the wavelengths $\lambda 1$, $\lambda 2$ and $\lambda 3$ have the following relationship.

$$\lambda 1 < \lambda 2 < \lambda 3$$

Figure 1:
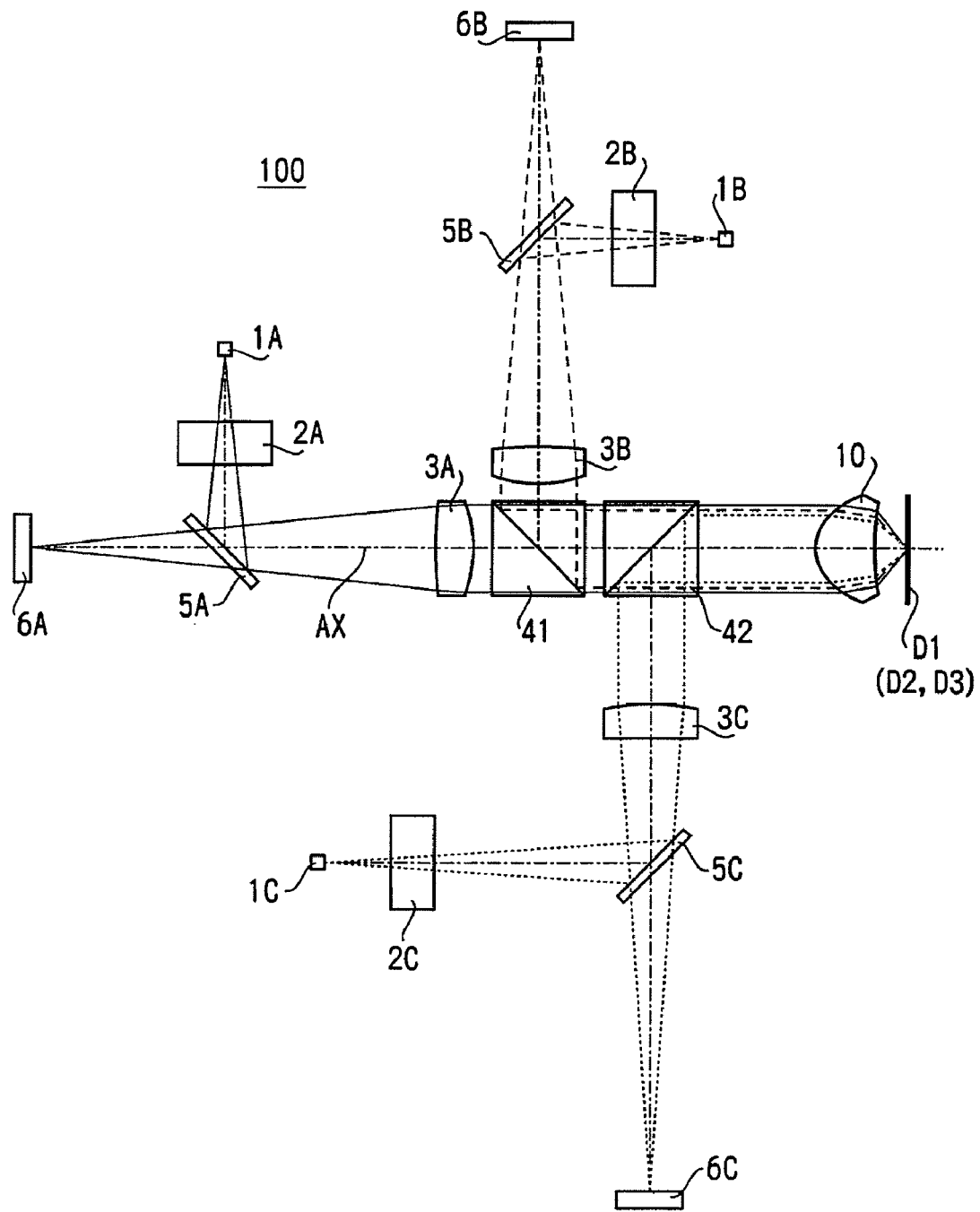
FIG. 1 is a block diagram generally illustrating a configuration of an optical information recording/reproducing apparatus according to an embodiment of the invention.

FIG. 1 is a block diagram illustrating a general configuration of an optical information recording/reproducing apparatus 100 according to the embodiment of the invention. As shown in FIG. 1, the optical information recording/reproducing apparatus 100 includes a light source 1A which emits the laser beam having the wavelength $\lambda 1$, a light source 1B which emits the laser beam having the wavelength $\lambda 2$, a light source 1C which emits the laser beam having the wavelength $\lambda 3$, diffraction gratings 2A, 2B and 2C, coupling lenses 3A, 3B and 3C, beam splitters 41 and 42, half mirrors 5A, 5B and 5C, photoreceptors 6A, 6B and 6C, and an objective lens 10. In FIG. 1, a chain line represents a reference axis AX of the optical information recording/reproducing apparatus 100. In FIG. 1, the laser beam having the wavelength $\lambda 1$ is indicated by a solid line, the lease beam having the wavelength $\lambda 2$ is indicated by a dashed line, and the laser beam having the wavelength $\lambda 3$ is indicated by a dotted line. In a normal state, an optical axis of the objective lens 10 coincides with the reference axis AX. However, there is a case where the optical axis of the objective lens 10 shifts from the reference axis AX in a radial direction of the optical disc by a tacking mechanism (not shown).

As described above, the different NAs are required respectively for the optical discs D1 to D3 in the optical information recording/reproducing apparatus 100. In this regard, the optical information recording/reproducing apparatus 100 may be provided with aperture stops (not shown) for respectively restricting the beam diameters of the laser beams having the wavelengths $\lambda 1$, $\lambda 2$ and $\lambda 3$.

The laser beams having the wavelengths of $\lambda 1$, $\lambda 2$ and $\lambda 3$ are emitted from the light sources 1A, 1B and 1C when the optical discs D1, D2 and D3 are used, respectively. The laser beams having the wavelengths $\lambda 1$, $\lambda 2$ and $\lambda 3$ pass the diffraction gratings 2A, 2B and 2C, respectively, and then optical paths for the laser beams having the wavelengths $\lambda 1$, $\lambda 2$ and $\lambda 3$ are folded by the half mirrors 5A, 5B and 5C so that the laser beams are incident on the coupling lenses 3A, 3B and 3C, respectively. Each of the coupling lenses 3A, 3B and 3C converts an incident laser beam into a collimated beam. The laser beams having the wavelengths $\lambda 1$ and $\lambda 2$ are incident on the objective lens 10 through the beam splitters 41 and 42, and the laser beam having the wavelength $\lambda 3$ is incident on the objective lens 10 through the beam splitter 42. The objective lens 10 converges each of the incident laser beams having the wavelengths $\lambda 1$, $\lambda 2$ and $\lambda 3$ in the vicinity of the recording surface of corresponding one of the optical discs D1, D2 and D3. Each of the laser beams converged by the objective lens 10 forms a beam spot on the recording surface of corresponding one of the optical discs D1, D2 and D3. Each of the laser beams reflected by the recording surface of corresponding one of the optical discs D1, D2 and D3 returns along the same optical path along which the laser beam proceeds toward the optical disc, so as to be detected by corresponding one of the photoreceptors 6A to 6C through corresponding one of the half mirrors 5A-5C. Each of the photoreceptors 6A to 6C outputs a detection signal to a signal processing circuit (not shown). The signal processing circuit detects a focusing error signal, a tracking error signal and a reproduction signal which corresponds to information recorded on the optical disc, based on outputs from the photoreceptors 6A to 6C.

As described above, each of the laser beams emerging from the coupling lenses 3A to 3C is a collimated beam. Specifically, when M1 represents the magnification of an optical system formed by the objective lens 10 and the coupling lens 3A with respect to the wavelength λ1, M2 represents the magnification of an optical system formed by the objective lens 10 and the coupling lens 3B with respect to the wavelength 21, M3 represents the magnification of an optical system formed by the objective lens 10 and the coupling lens 3C with respect to the wavelength λ3, and f1 (unit: mm), f2 (unit: mm) and f3 (unit: mm) represent focal lengths of the objective lens 10 respectively defined with respect to the wavelengths λ1, λ2 and λ3, the following conditions (24) to (26) are satisfied.

$$-0.02 < f1 \times M1 < 0.02 \quad (24)$$

$$-0.02 < f2 \times M2 < 0.02 \quad (25)$$

$$-0.02 < f3 \times M3 < 0.02 \quad (26)$$

In other words, in this embodiment each of the coupling lenses 3A to 3C serves as a collimator lens. As described above, by employing the configuration where the collimated beam is incident on the objective lens 10, occurrence of off-axis aberrations, such as a coma, can be prevented even when the objective lens 10 shifts in a direction perpendicular to the optical axis for a tracking operation.

Incidentally, when laser beams having different wavelengths are respectively used for the optical discs D1 to D3, the relative spherical aberration is caused between the optical discs D1 to D3 depending on the difference in refractive index of the objective lens 10 or the difference in protective layer thickness. To enable the optical information recording/reproducing apparatus 100 to have compatibility with the three types of optical discs D1 to D3, it is necessary to correct the above described relative spherical aberration while preventing flare light (caused principally by undesired diffraction order light) from adversely affecting the beam spot. In addition, it is necessary to secure an adequate working distance when the optical disc D3 having a relatively thick protective layer is used. In view of such circumstances, in this embodiment, the objective lens 10 is configured as follows.

Figure 2A:
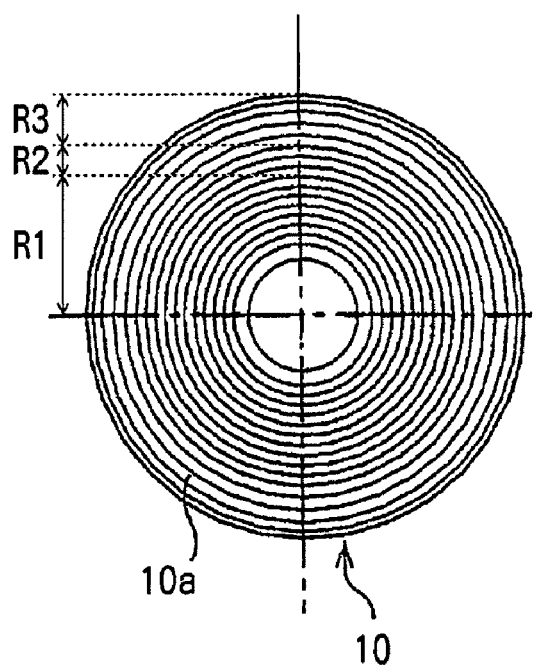
FIG. 2A is a front view of an objective lens according to the embodiment.
Figure 2B:
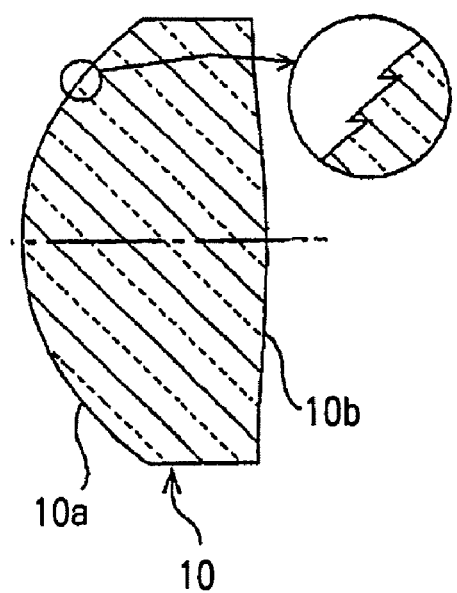
FIG. 2B is a side cross section of the objective lens.

FIG. 2A is a front view of the objective lens 10, and FIG. 2B illustrates a side cross section of the objective lens 10. FIGS. 3A, 3B and 3C respectively illustrate side cross sections of the objective lens 10 when the optical discs D1, D2 and D3 are used. As described above, the objective lens 10 is employed in an optical head of the optical information recording/reproducing apparatus 100 having the compatibility with the plurality of types of optical discs D1, D2 and D3, and has the function of converging the laser beam emitted from each of the light sources (i.e., semiconductor lasers) 1A to 1C onto the recording surface of the corresponding one of the optical discs D1, D2 and D3.

The objective lens 10 is a biconvex single element lens made of resin and has a first surface 10a facing the beam splitter 42 and a second surface 10b facing the optical disc. Each of the first and second surfaces 10a and 10b of the objective lens 10 is an aspherical surface. A shape of an aspherical surface is expressed by a following equation:

$$SAG = \frac{\frac{h^2}{r}}{1 + \sqrt{1 - (1+\kappa)\left(\frac{h}{r}\right)^2}} + A_4 h^4 + A_6 h^6 + A_8 h^8 + \ldots$$

where, SAG (a sag amount) is a distance between a point on the aspherical surface at a height of h (unit: mm) from the optical axis and a plane tangential to the aspherical surface at the optical axis, r is a curvature radius (unit: mm) of the aspherical surface on the optical axis (i.e., 1/r represents a curvature of the aspherical surface on the optical axis), κ is a conical coefficient, and $A_4, A_6, \ldots$ represent aspherical coefficients larger than or equal to the fourth order.

As shown in FIG. 2A, the first surface 10a of the objective lens 10 has a first region R1 which has a circular shape and has the center at the position of the optical axis, a second region R2 which is located outside the first region R1 and has an annular shape, and a third region R3 which is located outside the second region R2 and has an annular shape. On the first surface 10a, an annular zone structure is formed in the entire region including the first, second and third regions R1 to R3. As shown in FIG. 2A and in an enlarged view (a circled illustration) in FIG. 2B, the annular zone structure has a plurality of annular zones (refractive surface zones) concentrically formed about the optical axis of the objective lens 10. Minute steps are formed between adjacent ones of the plurality of annular zones, and each of the minute steps is formed to extend in parallel with the optical axis. Although in the embodiment the annular zone structure is formed on the first surface 10a of the objective lens 10, the annular zone structure may be formed only on the second surface 10b of the objective lens 10, or may be formed on both of the first and second surfaces 10a and 10b of the objective lens 10. It should be noted that, by forming the annular zone structure on the first surface 10a having a relatively large effective diameter, it becomes possible to design the annular zone structure to have a large minimum annular width, and thereby to achieve advantages that loss of light amount at a portion of each step of the annular zone structure can be suppressed. Furthermore, there are advantages that the annular zone structure is not worn when the objective lens 10 is brushed with a lens cleaner.

Each step of the annular zone structure is designed such that a predetermined optical path length difference is caused between a light beam passing inside a boundary formed between adjacent ones of the annular zones and a light beam passing outside the boundary. In general, such a structure can be expressed as a diffraction structure. The annular zone structure designed such that the predetermined optical path length difference is equal to an n-fold value (n: integer) of a particular wavelength α can be expressed as an n-th order diffraction structure having a blazed wavelength α. A diffraction order of diffracted light at which the diffraction efficiency is maximized when a light beam having a particular wavelength β passes through the diffraction structure can be obtained as an integer m which is closest to a value defined by dividing an optical path length difference given to the light beam having the wavelength β by the wavelength β.

In addition, the fact that the optical path length difference is generated between a light beam passing through the inside of a boundary between adjacent ones of the annular zones (refractive surface zones) and a light beam passing through the outside of the boundary can be considered as a phenomenon where phases of the light beams are shifted with respect to each other by the effect of each step of the annular zone structure. Therefore, the annular zone structure can be expressed as a structure for shifting phases of incident light beams (i.e., a phase shift structure).

The annular zone structure can be expressed by an i-th optical path difference function $\phi ik(h)$ in a k-th region. In this case, each of k and i is a natural number. The optical path difference function $\phi ik(h)$ is a function representing the functional capability of the objective lens 10 (a diffraction lens) in a form of an additional optical path length at the height h from the optical axis of the objective lens 10, and defines the position of each step of the annular zone structure. The optical path difference function $\phi ik(h)$ can be expressed by a following equation:

$$\phi ik(h) = P_{ik2} \times h^2 + P_{ik4} \times h^4 + P_{ik6} \times h^6 + P_{ik8} \times h^8 + P_{ik10} \times h^{10} + P_{ik12} \times h^{12})m_{ik}\lambda$$

where $P_{ik2}$, $P_{ik4}$, $P_{ik6}$ . . . (i: natural number) represent coefficients of the $2^{nd}$ order, $4^{th}$ order, $6^{th}$ order, . . . of the i-th optical path difference function in the k-th region, h (unit: mm) represents a height from the optical axis, $m_{ik}$ represents a diffraction order at which the diffraction efficiency is maximized for an incident light beam in regard to the i-th optical path difference function of the k-th region, and λ (unit: nm) represents a design wavelength of a laser beam being used.

In addition to defining the shape of the annular zone structure by a single type of optical path difference function, the shape of the annular zone structure may be defined by combining a plurality of types of optical path difference functions. In this embodiment, the annular zone structure in each of the regions R1 and R2 is defined by combining two types of optical path difference functions (a first optical path difference function and a second optical path difference function) so that the annular zone structure in each of the regions R1 and R2 has two types of steps giving, to the incident light beam, optical path length differences which are different from each other. With this configuration, two types of optical effects are given to the incident light beam. Hereafter, for each of the first and second regions R1 and R2, a step defined by a first optical path difference function of the two types optical path difference functions is referred to as a "first step", and a step defined by a second optical path difference function of the two types of optical disc functions is referred to as a "second step". It should be noted that the annular zone structure may be configured by combining three or more types of optical path difference functions. In this case, more complicated optical functions can be given to the annular zone structure.

The annular zone structure in the region R1 contributes to convergence of each of the laser beams having the wavelengths λ1, λ2 and λ3. That is, the annular zone structure in the region R1 is configured to converge the laser beam having the wavelength λ1 onto the recording surface of the optical disc D1, to converge the laser beam having the wavelength λ2 onto the recording surface of the optical disc D2, and to converge the laser beam having the wavelength λ3 onto the recording surface of the optical disc D3. Since each of the laser beams having the wavelengths λ1, λ2 and λ3 is incident on the objective lens 10 as a substantially collimated beam, the annular zone structure in the region R1 is formed to be the diffraction structure having steps defined by two types of optical path difference functions having different types of combinations of diffraction orders so that the spherical aberration caused by the difference in protective layer thickness between the optical discs D1 to D3 can be corrected. In the following, the diffraction orders at which the diffraction efficiencies are maximized for the laser beams having the wavelengths λ1, λ2 and λ3, respectively, are referred to as a "BD use diffraction order", a "DVD use diffraction order" and a "CD use diffraction order".

When the BD use diffraction order is set to an even order (e.g., the second order), the CD user diffraction order becomes an odd order (e.g., the first order). In this case, power of the annular zone structure with respect to the laser beam having the wavelength λ1 becomes equal to power of the annular zone structure with respect to the laser beam having the wavelength λ3 which is approximately twice as large as the wavelength λ1. Therefore, in this case, it becomes difficult to correct the relative spherical aberration caused between the optical discs D1 and D3. This is because power of an annular zone structure is proportional to a wavelength and a diffraction order. Therefore, in the region R1, it is necessary to set the BD use diffraction order to an odd order for at least one of the first and second steps. Regarding the other of the first and second steps, it is preferable that the BD use diffraction order is set to an even order so that a high diffraction efficiency can be obtained for each of the laser beams having the wavelengths λ1, λ2 and λ3. That is, the annular zone structure in the region R1 is designed by combining first and second optical path difference functions such that high diffraction efficiencies can be obtained for all of the BD use diffraction order, the DVD use diffraction order and the CD use diffraction order. It should be noted that as the diffraction order decreases, change of diffraction efficiency with respect to change of wavelength becomes smaller. Therefore, in the first region R1, the first step is designed such that all the BD use diffraction order, the DVD use diffraction order and the CD use diffraction order are the first orders, and the second step is designed such that the BD use diffraction order, the DVD use diffraction order and the CD use diffraction order are the second order, the first order and the first order, respectively.

In order to suitably correct the chromatic aberration during use of the optical disc D1 while securing an adequate working distance during use of the optical disc D3, when $fD_{11}$ represents the focal length (unit: mm) of the diffraction structure having the first step in the region R1, the diffraction structure having the first step in the region R1 satisfies the following condition (1):

$$-0.15 < f1/fD_{11} < -0.03 \quad (1)$$

where $fD_{11} = -1/(2 \times P_{112} \times m_{11} \times \lambda)$.

It should be noted that, by securing an adequate working distance when the optical disc D3 having a relatively large protective layer thickness is used, adequate working distances can also be secured for the optical discs D1 and D2 having the protective layer thicknesses smaller than that of the optical disc D3. Furthermore, by suitably correcting the chromatic aberration during use of the optical disc D1 which causes the largest change of chromatic aberration of all the optical discs D1 to D3, the chromatic aberration caused when the each of the optical discs D2 and D3 is used can also be suitably corrected.

When the intermediate term of the condition (1) gets larger than the upper limit of the condition (1), the chromatic aberration caused during use of the optical disc D1 becomes excessive as compensation for securing an adequate working distance during use of the optical disc D3 is used. When the intermediate term of the condition (1) gets smaller than the lower limit of the condition (1), it becomes difficult to secure an adequate working distance during use of the optical disc D3 as compensation for suppressing the amount of chromatic aberration caused during use of the optical disc D1. Furthermore, in this case, there is a possibility that undesired diffraction order light of the laser beam having the wavelength λ3 caused after passing through the region R1 converges in the vicinity of the recording surface of the optical disc D3 and thereby the property of the beam spot deteriorates.

The annular zone structure in the region R2 has a diffraction structure having steps defined by two types of optical path difference functions, and contributes only to convergence of each of the laser beams having the wavelengths λ1 and λ2. That is, the annular zone structure in the region R2 is configured such that the laser beam having the wavelength λ1 is converged on the recording surface of the optical disc D1, the laser beam having the wavelength λ2 is converged on the recording surface of the optical disc D2, and the laser beam having the wavelength λ3 is not converged on any of the recording surfaces of the optical discs D1 to D3. It should be noted, by configuring the annular zone structure in the second region R2 to have steps defined by at least one type of optical path difference function, sufficient optical performance can be achieved. That is, the second region R2 is not necessarily required to have steps defined by two types of optical path difference functions.

When the BD use diffraction order is set to an even order in the region R2, the diffraction efficiency at the CD use diffraction order becomes high. In this case, a problem arises that, when the laser beam having the wavelength λ3 which has passed through the region R2 converges in the vicinity of the recording surface of the optical disc D3, a desired beam spot can not be formed. Therefore, it is preferable that the first step of the annular zone structure in the region R2 is configured such that the BD use diffraction order is set to an odd order so that each of the diffraction efficiencies for the BD user diffraction order and the DVD use diffraction order can be set to be high while decreasing the diffraction efficiency for the CD use diffraction order. When the BD use diffraction order is an odd order as described above, two types of diffraction order light each of which has the diffraction efficiency of approximately 40% are caused for the laser beam having the wavelength λ3, and the two types of undesired diffraction order light respectively converge at positions shifted from the recording surface of the optical disc D3. As a result, it becomes possible to prevent occurrence of the problem that each of the two types of undesired diffraction order light deteriorates the beam spot shape formed on the recording surface of the optical disc D3. Since change of the diffraction efficiency caused by the wavelength variation becomes smaller as the diffraction order decreases, in this embodiment, the annular zone structure in the second region R2 is designed such that both of the BD use diffraction order and the DVD use diffraction order are 1st-orders.

The annular zone structure in the region R3 is configured to have a diffraction structure including steps defined by one type of optical path difference function, and to contribute only to convergence of the laser beam having the wavelength λ1. That is, the annular zone structure in the region R3 is configured to converge the laser beam having the wavelength λ1 onto the recording surface of the optical disc D1 and not to converge each of the laser beams having the wavelengths λ2 and λ3 onto any of the recording surfaces of the optical discs D1 to D3.

In order to appropriately control variation of the spherical aberration due to, for example, temperature changes, and to prevent the undesired diffraction order light of each of the laser beams having the wavelengths λ2 and λ3 which have passed through the region R3 from deteriorating the spot property by converging in the vicinity of the position at which each of the laser beams having the wavelengths λ2 and λ3 which have passed the region R1 converges, the annular zone structure in the region R3 is configured as follows. The annular zone structure in the region R3 is configured such that the BD use diffraction order is an odd order, and the annular zone structure in the region R3 is configured to satisfy a condition:

$$-0.05 < (\phi_{13}(h3) - \phi_{13}(h2))/(m_{13} \times f1) < -0.005 \quad (2)$$

where h2 (unit: mm) represents the maximum effective radius of the region R2, h3 (unit: mm) represents the maximum effective radius of the region R3. Change of diffraction efficiency with respect to change of wavelength becomes smaller as the diffraction order decreases. Therefore, it is preferable that in the region R3 the BD use diffraction order is set to the first order.

When the intermediate term of the condition (2) gets larger than the upper limit of the condition (2), the spherical aberration caused by the wavelength variation becomes an undercorrected condition, and in this case the spherical aberration in an over condition remains. When the intermediate term of the condition (2) gets smaller than the lower limit of the condition (2), the spherical aberration caused by the wavelength variation becomes an overcorrected condition, and in this case the spherical aberration in an under condition occurs. Therefore, when the condition (2) is not satisfied, it becomes impossible to suitably execute the information recording or the information reproducing for the optical disc.

The condition (2) is further explained in a different viewpoint. Regarding the strong diffraction order light of the laser beams having the wavelengths λ2 and λ3 which have passed through the region R3, the spherical aberration on the recording surface of the optical disc D3 becomes larger as the intermediate term of the condition (2) decreases. Therefore, it is possible to prevent occurrence of a phenomenon that the diffraction order light of each of the laser beams having the wavelengths λ2 and λ3 appears as undesired flare light and thereby deteriorates the spot property. Therefore, it is considered that it is preferable to set the intermediate term of the condition (2) to a smaller value. However, as the value of the intermediate term of the condition (2) decreases, the number of steps to be provided in the region R3 becomes larger. That is, when the intermediate term of the condition (2) gets smaller than the lower limit of the condition (2), manufacturing of the objective lens becomes difficult because in this case the number of steps increases. That is, the objective lens 10 becomes unsuitable for mass production.

On the other hand, regarding the laser beams having the wavelengths λ2 and λ3 which have passed through the region R3, the spherical aberration on the recording surface of the optical disc D3 becomes smaller as the value of the intermediate term of the condition (2) increases. That is, the strong undesired diffraction order light of the laser beams having the wavelengths λ2 and λ3 which have passed through the region R3 respectively converge at positions close to the imaging points of the laser beams having the wavelengths λ2 and λ3 which have passed through the region R1, and thereby deteriorate the spot properties on the recording surfaces of the optical discs D2 and D3. When the intermediate term of the condition (2) gets larger than the upper limit of the condition (2), the degree of deterioration of the spot property by the undesired diffraction order light becomes large, and therefore it becomes impossible to suitably execute the information recording or information reproducing for the optical discs D2 and D3.

In order to suitably correct the chromatic aberration when each of the optical discs D1 to D3 is used, when $fD_{21}$ (unit: mm) represents the focal length of the diffraction structure having the second step in the region R1, the diffraction structure having the second step in the region R1 may be configured to satisfy a condition:

$$0 \leq f1/fD_{21} < 0.15 \quad (3)$$

where $fD_{21} = -1/(2 \times P_{212} \times m_{21} \times \lambda)$.

When the intermediate term of the condition (3) gets larger than the upper limit of the condition (3), the chromatic aberration caused when each of the optical discs D1 to D3 is used becomes an undercorrected condition, and therefore it becomes impossible to suitably execute the information recording or information reproducing for each of the optical discs D1 to D3. When the intermediate term of the condition (3) gets smaller than the lower limit of the condition (3), the chromatic aberration caused when each of the optical discs D1 to D3 is used becomes an overcorrected condition, and therefore it becomes impossible to suitably execute the information recording or information reproducing for each of the optical discs D1 to D3.

In order to further suitably correct the chromatic aberration caused when the optical disc D1 is used while securing an adequate working distance during use of the optical disc D3, the annular zone structure in the region R1 may be configured to satisfy a condition:

$$-0.10 < f1/fD_{11} < -0.05 \quad (4).$$

In order to more suitably correct the chromatic aberration caused when each of the optical discs D1 to D3 is used, the annular zone structure in the region R1 may be configured to satisfy a condition:

$$0 \leq f1/fD_{21} < 0.01 \quad (5).$$

In order to prevent the undesired diffraction order light of each of the laser beams having the wavelengths $\lambda 2$ and $\lambda 3$ which have passed through the region R3 from converging in the vicinity of the corresponding one of imaging points of the laser beams having the wavelengths $\lambda 2$ and $\lambda 3$ which have passed through the region R1, when $fD_{13}$ (unit: mm) represents the focal length of the diffraction structure having the first step in the region R3, the diffraction structure having the first step in the region R3 may be configured to satisfy a condition:

$$-0.150 < f1/fD_{13} < -0.015 \quad (6)$$

where $fD_{21} = -1/(2 \times P_{132} \times m_{13} \times \lambda)$.

Let us consider the annular zone structure which causes the first order diffracted light at the wavelength $\lambda 1$. When the intermediate term of the condition (6) gets larger than the upper limit of the condition (6), the 0-th order diffracted light of each of the laser beams having the wavelengths $\lambda 2$ and $\lambda 3$ which have passed through the region R3 converges in the vicinity of the corresponding one of imaging points of the laser beams having the wavelengths $\lambda 2$ and $\lambda 3$ which have passed the region R1. In this case, the spot property on each of the recoding surfaces of the optical discs D2 and D3 deteriorates. When the intermediate term of the condition (6) gets smaller than the lower limit of the condition (6), the first order diffracted light of each of the laser beams having the wavelengths $\lambda 2$ and $\lambda 3$ which have passed through the region R3 converges in the vicinity of the corresponding one of imaging points of the laser beams having the wavelengths $\lambda 2$ and $\lambda 3$ which have passed through the region R1, and thereby deteriorates the spot property on the corresponding one of the recording surfaces of the optical discs D2 and D3.

In order to more appropriately control variation of the spherical aberration due to, for example, the temperature change and to prevent deterioration of the spot property by the undesired diffraction order light of the CD use diffraction order and the DVD use diffraction order, the annular zone structure in the region R3 may be configured to satisfy the condition (7).

$$-0.03 < (\phi_{13}(h3) - \phi_{13}(h2))/(m_{13} \times f1) < -0.01 \quad (7).$$

In order to more appropriately control variation of the spherical aberration due to, for example, the temperature change during use of each of the optical discs D1 and D2, the annular zone structure in the region R2 may be configured such that the annular zone structure further has a second step which is defined by a second optical path difference function different from the above described (first) optical path difference function defining the first step (where each of the BD use diffraction order and the DVD use diffraction order is the first order), and that, regarding the second step, the BD use diffraction order is an odd order (e.g., the seventh order).

When h1 (unit: mm) represents the maximum effective radius of the region R1, the annular zone structure of the region R2 having the second step may be configured to satisfy the condition (8) which defines the number of steps in the region R2.

$$-0.05 < (\phi_{22}(h2) - \phi_{22}(h1))/f1 < -0.03 \quad (8).$$

Let us consider the annular zone structure having the second step which causes the seventh order diffracted light at the wavelength $\lambda 1$. When the intermediate term of the condition (8) gets larger than the upper limit of the condition (8), the fourth order diffracted light of the laser beam having the wavelength $\lambda 3$ which has passed through the region R2 converges in the vicinity of the recording surface of the optical disc D3, and thereby deteriorates the spot property on the recording surface of the optical disc D3. When the intermediate term of the condition (8) gets smaller than the lower limit of the condition (8), the spherical aberration with respect to the temperature change during use of the optical disc D2 becomes an overcorrected condition, although in this case the spherical aberration of the undesired diffreaction order light (the third order diffracted light or the fourth order diffracted light) of the laser beam having the wavelength $\lambda 3$ which has passed through the region R2 becomes large. This is undesirable. By contrast, when the condition (8) is satisfied, the strong undesired diffraction order light of the laser beam having the wavelength $\lambda 3$ which has passed though the region R2 does not converge in the vicinity of the imaging point of the laser beam having the wavelength $\lambda 3$ which has passed through the region R1, and therefore it becomes possible to avoid deterioration of the spot property. Furthermore, when the condition (8) is satisfied, the spherical aberration with respect to the temperature change during use of the optical disc D2 can be suitably corrected.

In place of satisfying the condition (8), when $fD_{22}$ (unit: mm) represents the focal length of the diffraction structure having the second step in the region R2, the diffraction structure having the second step in the region R2 may be configured to satisfy simultaneously the following conditions (9) and (10):

$$-0.03 < (\phi_{22}(h2) - \phi_{22}(h1))/f1 < 0 \quad (9); \text{ and}$$

$$0 \leq f1/fD_{22} < 0.08 \quad (10),$$

where $fD_{22} = -1/(2 \times P_{222} \times m_{22} \times \lambda)$.

Let us consider the annular zone structure having the second step which causes the seventh order diffracted light at the wavelength λ1. When the intermediate term of the condition (9) gets larger than the upper limit of the condition (9), the third order diffracted light of the laser beam having the wavelength λ3 which has passed through the region R2 converges in the vicinity of the recording surface of the optical disc D3, and deteriorates the spot property on the recording surface of the optical disc D3. Furthermore, in this case, the spherical aberration with respect to the temperature change during use of the optical disc D2 becomes an undercorrected condition, which is undesirable. When the intermediate term of the condition (9) gets smaller than the lower limit of the condition (9), the fourth order diffracted light of the laser beam having the wavelength λ3 which has passed through the region R2 converges in the vicinity of the recording surface of the optical disc D3, and thereby deteriorates the spot property on the recording surface of the optical disc D3.

Let us consider the annular zone structure having the second step which causes the seventh order diffracted light at the wavelength λ1. When the intermediate term of the condition (10) gets larger than the upper limit of the condition (10), the third order diffracted light of the laser beam having the wavelength λ3 which has passed through the region R2 converges in the vicinity of the recording surface of the optical disc D3, and thereby deteriorates the spot property on the recording surface of the optical disc D3. When the intermediate term of the condition (10) gets smaller than the lower limit of the condition (10), the fourth order diffracted light of the laser beam having the wavelength λ3 which has passed through the region R2 converges in the vicinity of the recording surface of the optical disc D3, and thereby deteriorates the spot property on the recording surface of the optical disc D3.

By contrast, when the conditions (9) and (10) are satisfied simultaneously, the strong undesired diffraction order light (the third order diffracted light and the fourth order diffracted light) of the laser beam having the wavelength λ3 which has passed through the region R2 does not converge in the vicinity of the recording surface of the optical disc D3. Consequently, it becomes possible to avoid deterioration of the spot property.

The annular zone structure in the regions R1 to R3 can be considered as a phase shift structure. In the following, the objective lens 10 is explained in a different way by considering the annular zone structure as a phase shift structure.

The annular zone structure in the region R1 is defined as a phase shift structure having first and second steps giving different optical path length differences to an incident beam at a boundary between adjacent ones of the refractive surfaces zones (annular zones). Regarding the first step, when $\Delta OPD_{ik}$ (unit: nm) represents an optical path length difference given by the i-th step in the k-th region, and $N_{ik}$ represents the number of steps of the i-th step in the k-th region, the following conditions (11) and (12) are satisfied.

$$INT|(\Delta OPD_{11}/\lambda 1)+0.5|=1 \quad (11)$$

$$0.60\times 10^2 < N_{11}\times f1 < 2.50\times 10^2 \quad (12)$$

The second step is configured to satisfy the following condition (13).

$$INT|(\Delta OPD_{21}/\lambda 1)+0.5|=2 \quad (13)$$

By configuring the phase shift structure in the region R1 to satisfy the condition (12) when the conditions (11) and (13) are satisfied, it becomes possible to suitably correct the chromatic aberration during use of the optical disc D1 while securing an adequate working distance during use of the optical disc D3.

When the intermediate term of the condition (12) gets larger than the upper limit of the condition (12), the chromatic aberration becomes large during use of the optical disc D1 as compensation for securing an adequate working distance during use of the optical disc D3. When the intermediate term of the condition (12) gets smaller than the lower limit of the condition (12), it becomes difficult to secure an adequate working distance during use of the optical disc D3 and the undesired diffraction order light of the laser beam having the wavelength λ3 which has passed through the region R1 converges in the vicinity of the recording surface of the optical disc D3 and thereby deteriorates the spot property, although in this case the amount of chromatic aberration caused when the optical disc D1 is used can be suppressed.

The annular zone structure in the region R2 can be defined as a phase shift structure having first and second steps giving different optical path length differences to an incident laser beam at a boundary between adjacent ones of the refractive surface zones (annular zones). In order to increase the efficiency during use of BD and DVD while decreasing the efficiency during use of CD, the first step of the phase shift structure in the region R2 is configured to satisfy a condition:

$$INT|(\Delta OPD_{12}/\lambda 1)+0.5|=1 \quad (14).$$

The annular zone structure in the region R3 can be defined as a phase shift structure having a step giving one type of optical path length difference to an incident light beam at a boundary between adjacent ones of the refractive surface zones (annular zones). In order to appropriately control variation of the spherical aberration due to, for example, the temperature change, and to avoid deterioration of the spot property due to flare light by decreasing the efficiency during use of each of CD and DVD, the steps in the region R3 are configured to satisfy the following conditions (15) and (16):

$$INT|(\Delta OPD_{13}/\lambda 1)+0.5|=2L+1 \quad (15)$$

$$0.80\times 10^2 < N_{13}\times f1 < 3.50\times 10^2 \quad (16)$$

where L is an integer.

When the intermediate term of the condition (16) gets larger than the upper limit of the condition (16), the spherical aberration caused by change of the environmental condition during use of the optical disc D1 becomes an overcorrected condition, which is undesirable. When the intermediate term of the condition (16) gets smaller than the lower limit of the condition (16), the spherical aberration caused by change of the environmental condition during use of the optical disc D1 becomes an undercorrected condition, and each of the laser beams having the wavelengths λ2 and λ3 which have passed through the region R1 converges in the vicinity of the corresponding one of the recording surfaces of the optical discs D2 and D3. In this case, the shape of the beam spot formed on each of the recording surfaces of the optical discs D2 and D3 is adversely affected, which is undesirable.

In order to more suitably correct the chromatic aberration caused when each of the optical discs D1 to D3 is used, the second step of the phase shift structure in the region R1 may be configured to satisfy the following condition (17).

$$0.04\times 10^2 \leq N_{21}\times f1 < 1.50\times 10^2 \quad (17)$$

When the intermediate term of the condition (17) gets larger than the upper limit of the condition (17), the chromatic aberration caused when each of the optical discs D1 to D3 is used becomes an overcorrected condition, and therefore it becomes impossible to suitably execute the information recording or information reproducing for the optical discs D1 to D3. When the intermediate term of the condition (17) gets smaller than the lower limit of the condition (17), the chromatic aberration caused when each of the optical discs D1 to D3 is used becomes an undercorrected condition, and therefore it becomes impossible to suitably execute the information recording or information reproducing for the optical discs D1 to D3.

In order to more suitably correct the chromatic aberration caused when the optical disc D1 is used while securing an adequate working distance during use of the optical disc D3, the first step of the phase shift structure provided in the region R1 may be configured to satisfy a following condition (18).

$$1.20\times10^2 < N_{11}\times f1 < 2.20\times10^2 \qquad (18)$$

In order to more suitably correct the chromatic aberration caused when each of the optical discs D1 to D3 is used, the second step of the phase shift structure in the region R1 may be configured to satisfy a following condition (19).

$$0.04\times10^2 \leq N_{21}\times f1 < 1.00\times10^2 \qquad (19)$$

In order to more appropriately control variation of the spherical aberration due to, for example, the temperature change and to avoid deterioration of the spot property due to flare light caused when each of CD and DVD is used, the phase shift structure in the region R3 may be configured to satisfy a following condition (20) which defines the number of steps in the region R3.

$$1.50\times10^2 < N_{13}\times f1 < 3.00\times10^2 \qquad (20)$$

In order to suppress change of the efficiency caused by variation of the wavelength to a small level, the phase shift structure in the region R3 may be configured to satisfy a following condition (21) which defines the number of steps in the region R3.

$$INT|(\Delta OPD_{13}/\lambda1)+0.5|=1 \qquad (21)$$

In order to avoid deterioration of the spot property due to flare light by decreasing the efficiency during use of CD, the second step in the region R2 may be configured to satisfy a following condition (22).

$$0.25\times10^2 < N_{22}\times INT|(\Delta OPD_{22}/\lambda1)+0.5|\times f1 < 1.00\times10^2 \qquad (22)$$

Let is consider the phase shift structure satisfying $INT|(\Delta OPD_{22}/\lambda1)+0.5|=7$. When the intermediate term of the condition (22) gets larger than the upper limit of the condition (22), the third order diffracted light of the laser beam having the wavelength $\lambda3$ which has passed through the region R2 converges in the vicinity of the imaging point of the laser beam having the wavelength $\lambda3$ which has passed through the region R1, and thereby deteriorates the spot property on the recording surface of the optical disc D3. When the intermediate term of the condition (22) gets smaller than the lower limit of the condition (22), the fourth order diffracted light of the laser beam having the wavelength $\lambda3$ which has passed through the region R2 converges in the vicinity of the imaging point of the laser beam having the wavelength $\lambda3$ which has passed through the region R1. The fourth order diffracted light appears on the recording surface of the optical disc D3 as undesired flare light, and deteriorates the spot property on the recording surface of the optical disc D3.

In order to more suitably correct the chromatic aberration caused when the optical disc D1 is used while securing an adequate working distance during use of the optical disc D3, the objective lens 10 may be configured to satisfy the following condition:

$$35 \leq vd \leq 80 \qquad (23)$$

where vd represents Abbe number of the objective lens 10 defined at d-line.

In order to obtain further higher diffraction efficiencies for all of the BD use diffraction order, DVD use diffraction order and CD use diffraction order, the objective lens 10 may be configured to satisfy a condition:

$$0.4 < (\lambda1/(n3-1))/(\lambda3/(n1-1)) < 0.6 \qquad (27)$$

where n1 and n3 respectively represent refractive indexes of the objective lens 10 at the wavelengths $\lambda1$ and $\lambda3$.

Hereafter, five concrete examples (first to fifth examples) of the optical information recording/reproducing apparatus 100 on which the above described objective lens 10 is mounted are explained. Each of the optical information recording/reproducing apparatuses according to the first to third examples has a general configuration shown in FIG. 1. Since the difference between optical systems of the first to third examples is minor and is not expressed in the degree of scaling of FIG. 1, FIG. 1 is used for explaining the general configuration of the optical information recording/reproducing apparatus 100 according to each of the first to third examples.

First Example

The objective lens 10 mounted on the optical information recording/reproducing apparatus 100 according to the first example has the general configuration as shown in FIGS. 2A and 2B or in FIGS. 3A to 3C. Specifications of the objective lens 10 according to the first example including the use wavelength, the focal length, NA and the magnification M are shown in Table 1. It should be noted that definitions regarding Tables and drawings in the first example can also be applied to Tables and drawings for the following examples and a comparative example which are explained below. In Table 1 (and in the following similar tables), "First ($1^{st}$) Laser Beam" represents the laser beam having the wavelength $\lambda1$, "Second ($2^{nd}$) Laser Beam" represents the laser beam having the wavelength $\lambda2$, and "Third ($3^{rd}$) Laser Beam" represents the laser beam having the wavelength $\lambda3$.

TABLE 1

|  | $1^{st}$ Laser Beam | $2^{nd}$ Laser Beam | $3^{rd}$ Laser Beam |
| --- | --- | --- | --- |
| Wavelength (nm) | 405 | 660 | 790 |
| Focal Length (mm) | 2.20 | 2.33 | 2.38 |
| NA | 0.85 | 0.60 | 0.47 |
| Magnification M | 0.000 | 0.000 | 0.000 |

As shown by the magnification M in Table 1, in the optical information recording/reproducing apparatus 100, each of the $1^{st}$ to $3^{rd}$ laser beams is incident on the corresponding one of the optical discs D1 to D3 as a collimated beam. Therefore, the off-axis aberration is not caused even when the objective lens 10 is shifted by the tracking operation. Table 2 shows a specific numerical configuration of the optical information recording/reproducing apparatus 100 according to the first example defined when the optical disc D1 is used, Table 3 shows a specific numerical configuration of the optical information recording/reproducing apparatus 100 according to the first example defined when the optical disc D2 is used, and Table 4 shows a specific numerical configuration of the optical information recording/reproducing apparatus 100 according to the first example defined when the optical disc D3 is used.

TABLE 2

| Surface | r | d | n(405 nm) | |
|---|---|---|---|---|
| 1(1$^{st}$ region) | 1.363 | 2.56 | 1.56023 | Objective |
| 1(2$^{nd}$ region) | 1.363 | | | Lens 10 |
| 1(3$^{rd}$ region) | 1.363 | | | |
| 2 | −2.970 | 0.76 | | |
| 3 | ∞ | 0.0875 | 1.62231 | Optical |
| 4 | ∞ | — | | Disc D1 |

TABLE 3

| Surface | r | d | n(660 nm) | |
|---|---|---|---|---|
| 1(1$^{st}$ region) | 1.363 | 2.56 | 1.54044 | Objective |
| 1(2$^{nd}$ region) | 1.363 | | | Lens 10 |
| 1(3$^{rd}$ region) | 1.363 | | | |
| 2 | −2.970 | 0.58 | | |
| 3 | ∞ | 0.60 | 1.57961 | Optical |
| 4 | ∞ | — | | Disc D2 |

TABLE 4

| Surface | r | d | n(790 nm) | |
|---|---|---|---|---|
| 1(1$^{st}$ region) | 1.363 | 2.56 | 1.53653 | Objective |
| 1(2$^{nd}$ region) | 1.363 | | | Lens 10 |
| 1(3$^{rd}$ region) | 1.363 | | | |
| 2 | −2.970 | 0.26 | | |
| 3 | ∞ | 1.20 | 1.57307 | Optical |
| 4 | ∞ | — | | Disc D3 |

In each of Tables 2 to 4, the surface #1 (the first region), the surface #1 (the second region) and the surface #1 (the third region) respectively correspond to the regions R1, R2 and R3 of the first surface 10a of the objective lens 10. Surface #2 represents the second surface 10b of the objective lens 10, surface #3 represents the surface of the protective layer of the optical disc being used, and surface #4 represents the recording surface of the optical disc being used. In Tables 2 to 4, "r" denotes the curvature radius (unit: mm) of each optical surface, and "d" denotes the thickness of an optical component or the distance (unit: mm) from each optical surface to the next optical surface, "n" represents the refractive index at the wavelength surrounded by parentheses in each Table. For an aspherical optical element, "r" represents the curvature radius on the optical axis.

Each of the first surface 10a (surface #1 (first region), surface #1 (second region) and surface #1 (third region)) and the second surface 10b (surface #2) of the objective lens 10 is an aspherical surface, and is optimally designed for information recording and information reproducing for each of the optical discs D1 to D3. The following Table 5 shows the conical coefficients κ and aspherical coefficients $A_4, A_6 \ldots$ of each aspherical surface. In Table 5 (and in the following similar Tables), the notation "E" means the power of 10 with an exponent specified by the number to the right of E (e.g. "E−04" means "×10$^{−4}$").

TABLE 5

| | κ | A4 | A6 |
|---|---|---|---|
| 1(1$^{st}$ region) | −0.7500 | 2.7960E−03 | 5.6830E−03 |
| 1(2$^{nd}$ region) | −0.7500 | −1.4150E−02 | 2.2960E−02 |
| 1(3$^{rd}$ region) | −0.7500 | 9.1180E−03 | −2.5840E−03 |
| 2 | 0.0000 | 2.8526E−01 | −3.7016E−01 |

TABLE 5-continued

| | A8 | A10 | A12 |
|---|---|---|---|
| 1(1$^{st}$ region) | −2.3260E−03 | 7.1300E−04 | −1.8481E−04 |
| 1(2$^{nd}$ region) | −8.1630E−03 | 2.3323E−03 | −4.3291E−04 |
| 1(3$^{rd}$ region) | 1.3970E−03 | 1.7240E−04 | −8.2295E−05 |
| 2 | 5.1089E−01 | −6.1394E−01 | 4.9731E−01 |

| | A14 | A16 | A18 |
|---|---|---|---|
| 1(1$^{st}$ region) | 0.0000E+00 | 0.0000E+00 | 0.0000E+00 |
| 1(2$^{nd}$ region) | 0.0000E+00 | 0.0000E+00 | 0.0000E+00 |
| 1(3$^{rd}$ region) | 0.0000E+00 | 0.0000E+00 | 0.0000E+00 |
| 2 | −2.2893E−01 | 3.7569E−02 | 1.3261E−02 |

| | A20 | A22 | A24 |
|---|---|---|---|
| 1(1$^{st}$ region) | 0.0000E+00 | 0.0000E+00 | 0.0000E+00 |
| 1(2$^{nd}$ region) | 0.0000E+00 | 0.0000E+00 | 0.0000E+00 |
| 1(3$^{rd}$ region) | 0.0000E+00 | 0.0000E+00 | 0.0000E+00 |
| 2 | −7.0895E−03 | 9.4206E−04 | 0.0000E+00 |

The range of each of the regions R1 to R3 of the first surface 10a of the objective lens 10 according to the first example is defined as indicated below.

Region R1: $0.000 \leq h \leq 1.120$
Region R2: $1.120 < h \leq 1.400$
Region R3: $1.400 < h \leq 1.870$ The region R1 is a common area contributing to convergence of each of the laser beams having the user wavelengths λ1, λ2 and λ3. The region R2 contributes to convergence of each the laser beams having the wavelengths λ1 and λ2, but does not contribute to convergence of the laser beam having the wavelength λ3. In other words, the region R2 serves as an aperture stop for the laser beam having the wavelength λ3. The region R3 is a region for securing the numerical aperture for the optical disc D1 which needs the largest numerical aperture of all the optical discs D1 to D3. That is, the region R3 contributes to convergence of the laser beam having the wavelength but does not contribute to convergence of each of the laser beams having the wavelengths λ2 and λ3. In other words, the region R3 serves as an aperture stop for each of the laser beams having the wavelength λ1 and λ2.

Each of the regions R1 to R3 has a unique annular zone structure (i.e., a unique phase shift structure) so that the regions R1 to R3 have the above described optical effects different from each other. In particular, each of the regions R1 and R2 has the annular zone structure defied by two types optical path difference functions. Table 6 shows the coefficient $P_{i2}$ of the optical path difference function which defines the annular zone structure in each region on the first surface 10a. Table 7 shows the BD use diffraction order, DVD use diffraction order and CD use diffraction order. In Tables 6 and 7, "1 (1$^{st}$ Region) (1)", "1 (1$^{st}$ Region) (2)", "1 (2$^{nd}$ Region) (1)", "1 (2$^{nd}$ Region) (2)" and "1 (3$^{rd}$ Region)" respectively correspond to the first step in the region R1, the second step in the region R1, the first step in the region R2, the second step in the region R2 and the step in the region R3.

TABLE 6

| | P2 | P4 | P6 |
|---|---|---|---|
| 1(1$^{st}$ region) (1) | 3.2000E+01 | −4.1940E+00 | 1.6420E−01 |
| 1(1$^{st}$ region) (2) | 0.0000E+00 | −3.4460E+00 | 2.2210E+00 |
| 1(2$^{nd}$ region) (1) | 3.2000E+01 | −4.6760E+00 | 1.2080E+00 |
| 1(2$^{nd}$ region) (2) | 0.0000E+00 | −3.8850E+00 | 3.2180E+00 |
| 1(3$^{rd}$ region) | 3.2000E+01 | −6.8130E+00 | −7.7450E−01 |

TABLE 6-continued

| | P8 | P10 | P12 |
|---|---|---|---|
| 1(1st region) (1) | −3.0680E−01 | 0.0000E+00 | 0.0000E+00 |
| 1(1st region) (2) | −1.1130E+00 | 0.0000E+00 | 0.0000E+00 |
| 1(2nd region) (1) | −4.1680E−01 | 0.0000E+00 | 0.0000E+00 |
| 1(2nd region) (2) | −8.0020E−01 | 0.0000E+00 | 0.0000E+00 |
| 1(3rd region) | −3.6500E−01 | 0.0000E+00 | 0.0000E+00 |

TABLE 7

| | 1st Laser Beam | 2nd Laser Beam | 3rd Laser Beam | Hmax |
|---|---|---|---|---|
| 1(1st region) (1) | 1 | 1 | 1 | 1.120 |
| 1(1st region) (2) | 2 | 1 | 1 | |
| 1(2nd region) (1) | 1 | 1 | 1 | 1.400 |
| 1(2nd region) (2) | 7 | 4 | — | |
| 1(3rd region) | 1 | — | — | 1.870 |

The following Tables 8 to 10 respectively represent the concrete configurations of the annular zone structure formed in the regions R1 to R3. In Tables 8 to 10, the numbers of the annular zones are assigned sequentially from the optical disc side, and each annular zone width is defined by heights "hmin" (minimum height) and "hmax" (maximum height) defined with respect to the optical axis. In Tables 8 to 10, the optical path length difference $\Delta OPD_{11}/\lambda 1$, $\Delta OPD_{21}/\lambda 1$, $\Delta OPD_{12}/\lambda 1$, $\Delta OPD_{22}/\lambda 1$, $\Delta OPD_{32}/\lambda 1$, $\Delta OPD_{13}/\lambda 1$ and $\Delta OPD_{23}/\lambda 1$ are shown.

TABLE 8

| Number | hmin | hmax | $\Delta OPD_{11}/\lambda 1$ | $\Delta OPD_{21}/\lambda 1$ |
|---|---|---|---|---|
| 0 | 0.000 | 0.125 | | |
| 1 | 0.125 | 0.217 | 1.26 | |
| 2 | 0.217 | 0.281 | 1.26 | |
| 3 | 0.281 | 0.333 | 1.26 | |
| 4 | 0.333 | 0.379 | 1.26 | |
| 5 | 0.379 | 0.419 | 1.26 | |
| 6 | 0.419 | 0.457 | 1.26 | |
| 7 | 0.457 | 0.492 | 1.26 | |
| 8 | 0.492 | 0.525 | 1.26 | |
| 9 | 0.525 | 0.556 | 1.26 | |
| 10 | 0.556 | 0.586 | 1.26 | |
| 11 | 0.586 | 0.615 | 1.26 | |
| 12 | 0.615 | 0.643 | 1.26 | |
| 13 | 0.643 | 0.656 | 1.26 | |
| 14 | 0.656 | 0.669 | | −2.00 |
| 15 | 0.669 | 0.696 | 1.26 | |
| 16 | 0.696 | 0.721 | 1.26 | |
| 17 | 0.721 | 0.746 | 1.26 | |
| 18 | 0.746 | 0.770 | 1.26 | |
| 19 | 0.770 | 0.794 | 1.26 | |
| 20 | 0.794 | 0.818 | 1.26 | |
| 21 | 0.818 | 0.841 | 1.26 | |
| 22 | 0.841 | 0.864 | 1.26 | |
| 23 | 0.864 | 0.886 | 1.26 | |
| 24 | 0.886 | 0.891 | 1.26 | |
| 25 | 0.891 | 0.909 | | −2.00 |
| 26 | 0.909 | 0.931 | 1.26 | |
| 27 | 0.931 | 0.953 | 1.26 | |
| 28 | 0.953 | 0.975 | 1.26 | |
| 29 | 0.975 | 0.997 | 1.26 | |
| 30 | 0.997 | 1.017 | 1.26 | |
| 31 | 1.017 | 1.018 | | −2.00 |
| 32 | 1.018 | 1.040 | 1.26 | |
| 33 | 1.040 | 1.062 | 1.26 | |
| 34 | 1.062 | 1.084 | 1.26 | |
| 35 | 1.084 | 1.107 | 1.26 | |
| 36 | 1.107 | 1.120 | 1.26 | |

TABLE 9

| Number | hmin | hmax | $\Delta OPD_{12}/\lambda 1$ | $\Delta OPD_{22}/\lambda 1$ | $\Delta OPD_{32}/\lambda 1$ |
|---|---|---|---|---|---|
| 37 | 1.120 | 1.127 | | | −3.58 |
| 38 | 1.127 | 1.147 | 1.12 | | |
| 39 | 1.147 | 1.167 | 1.12 | | |
| 40 | 1.167 | 1.186 | 1.12 | | |
| 41 | 1.186 | 1.206 | 1.12 | | |
| 42 | 1.206 | 1.226 | 1.12 | | |
| 43 | 1.226 | 1.246 | 1.12 | | |
| 44 | 1.246 | 1.266 | 1.12 | | |
| 45 | 1.266 | 1.287 | 1.12 | | |
| 46 | 1.287 | 1.308 | 1.12 | | |
| 47 | 1.308 | 1.329 | 1.12 | | |
| 48 | 1.329 | 1.350 | 1.12 | | |
| 49 | 1.350 | 1.373 | 1.12 | | |
| 50 | 1.373 | 1.374 | 1.12 | | |
| 51 | 1.374 | 1.396 | | −6.81 | |
| 52 | 1.396 | 1.400 | 1.12 | | |

TABLE 10

| Number | Hmin | hmax | $\Delta OPD_{13}/\lambda 1$ | $\Delta OPD_{23}/\lambda 1$ |
|---|---|---|---|---|
| 53 | 1.400 | 1.419 | | −4.81 |
| 54 | 1.419 | 1.439 | −1.00 | |
| 55 | 1.439 | 1.456 | −1.00 | |
| 56 | 1.456 | 1.472 | −1.00 | |
| 57 | 1.472 | 1.486 | −1.00 | |
| 58 | 1.486 | 1.498 | −1.00 | |
| 59 | 1.498 | 1.511 | −1.00 | |
| 60 | 1.511 | 1.522 | −1.00 | |
| 61 | 1.522 | 1.532 | −1.00 | |
| 62 | 1.532 | 1.542 | −1.00 | |
| 63 | 1.542 | 1.552 | −1.00 | |
| 64 | 1.552 | 1.561 | −1.00 | |
| 65 | 1.561 | 1.570 | −1.00 | |
| 66 | 1.570 | 1.578 | −1.00 | |
| 67 | 1.578 | 1.586 | −1.00 | |
| 68 | 1.586 | 1.594 | −1.00 | |
| 69 | 1.594 | 1.601 | −1.00 | |
| 70 | 1.601 | 1.608 | −1.00 | |
| 71 | 1.608 | 1.615 | −1.00 | |
| 72 | 1.615 | 1.622 | −1.00 | |
| 73 | 1.622 | 1.629 | −1.00 | |
| 74 | 1.629 | 1.635 | −1.00 | |
| 75 | 1.635 | 1.641 | −1.00 | |
| 76 | 1.641 | 1.647 | −1.00 | |
| 77 | 1.647 | 1.653 | −1.00 | |
| 78 | 1.653 | 1.659 | −1.00 | |
| 79 | 1.659 | 1.664 | −1.00 | |
| 80 | 1.664 | 1.670 | −1.00 | |
| 81 | 1.670 | 1.675 | −1.00 | |
| 82 | 1.675 | 1.680 | −1.00 | |
| 83 | 1.680 | 1.685 | −1.00 | |
| 84 | 1.685 | 1.690 | −1.00 | |
| 85 | 1.690 | 1.695 | −1.00 | |
| 86 | 1.695 | 1.700 | −1.00 | |
| 87 | 1.700 | 1.705 | −1.00 | |
| 88 | 1.705 | 1.709 | −1.00 | |
| 89 | 1.709 | 1.714 | −1.00 | |
| 90 | 1.714 | 1.718 | −1.00 | |
| 91 | 1.718 | 1.723 | −1.00 | |
| 92 | 1.723 | 1.727 | −1.00 | |
| 93 | 1.727 | 1.731 | −1.00 | |
| 94 | 1.731 | 1.735 | −1.00 | |
| 95 | 1.735 | 1.739 | −1.00 | |
| 96 | 1.739 | 1.743 | −1.00 | |
| 97 | 1.743 | 1.747 | −1.00 | |
| 98 | 1.747 | 1.751 | −1.00 | |
| 99 | 1.751 | 1.755 | −1.00 | |
| 100 | 1.755 | 1.759 | −1.00 | |
| 101 | 1.759 | 1.763 | −1.00 | |
| 102 | 1.763 | 1.766 | −1.00 | |
| 103 | 1.766 | 1.770 | −1.00 | |
| 104 | 1.770 | 1.774 | −1.00 | |
| 105 | 1.774 | 1.777 | −1.00 | |
| 106 | 1.777 | 1.781 | −1.00 | |

TABLE 10-continued

| Number | Hmin | hmax | $\Delta OPD_{13}/\lambda 1$ | $\Delta OPD_{23}/\lambda 1$ |
|---|---|---|---|---|
| 107 | 1.781 | 1.784 | −1.00 | |
| 108 | 1.784 | 1.787 | −1.00 | |
| 109 | 1.787 | 1.791 | −1.00 | |
| 110 | 1.791 | 1.794 | −1.00 | |
| 111 | 1.794 | 1.797 | −1.00 | |
| 112 | 1.797 | 1.801 | −1.00 | |
| 113 | 1.801 | 1.804 | −1.00 | |
| 114 | 1.804 | 1.807 | −1.00 | |
| 115 | 1.807 | 1.810 | −1.00 | |
| 116 | 1.810 | 1.813 | −1.00 | |
| 117 | 1.813 | 1.816 | −1.00 | |
| 118 | 1.816 | 1.819 | −1.00 | |
| 119 | 1.819 | 1.822 | −1.00 | |
| 120 | 1.822 | 1.825 | −1.00 | |
| 121 | 1.825 | 1.828 | −1.00 | |
| 122 | 1.828 | 1.831 | −1.00 | |
| 123 | 1.831 | 1.834 | −1.00 | |
| 124 | 1.834 | 1.837 | −1.00 | |
| 125 | 1.837 | 1.840 | −1.00 | |
| 126 | 1.840 | 1.842 | −1.00 | |
| 127 | 1.842 | 1.845 | −1.00 | |
| 128 | 1.845 | 1.848 | −1.00 | |
| 129 | 1.848 | 1.851 | −1.00 | |
| 130 | 1.851 | 1.853 | −1.00 | |
| 131 | 1.853 | 1.856 | −1.00 | |
| 132 | 1.856 | 1.859 | −1.00 | |
| 133 | 1.859 | 1.861 | −1.00 | |
| 134 | 1.861 | 1.864 | −1.00 | |
| 135 | 1.864 | 1.866 | −1.00 | |
| 136 | 1.866 | 1.870 | −1.00 | |

Table 54 shows values obtained by applying the conditions (1) to (27) to the optical information recording/reproducing apparatus 100 according to each of the first to fifth example. As shown in Table 54, the optical information recording/reproducing apparatus 100 on which the objective lens 10 according to the first example is mounted satisfies the conditions (1) to (17), (19) to (21) and (23) to (27). Therefore, the optical information recording/reproducing apparatus 100 according to the first example is able to avoid deterioration of the spot property by the undesired diffraction order light while suitably correcting the spherical aberration for each of the optical discs D1 to D3, and is able to secure an adequate working distance when the optical disc D3 is used.

FIG. 4A to 4C respectively illustrate the spherical aberrations on the recording surfaces of the optical discs D1 to D3 with respect to the respective NAs. Specifically, FIG. 4A is a graph illustrating the spherical aberration caused on the recording surface of the optical disc D1 with respect to NA1 (=0.85) of the optical disc D1, FIG. 4B is a graph illustrating the spherical aberration caused on the recording surface of the optical disc D2 with respect to NA2 (=0.65) of the optical disc D2, and FIG. 4C is a graph illustrating the spherical aberration caused on the recording surface of the optical disc D3 with respect to NA3 (=0.47) of the optical disc D3. In each of the graphs of FIGS. 4A to 4C, a curve indicated by a solid line represents the spherical aberration at the design wavelength, and a curve indicated by a dotted line represents the spherical aberration caused when the wavelength shifts by +5 nm from the design wavelength.

As shown in FIGS. 4A to 4C, the optical information recording/reproducing apparatus 100 according to the first example is able to suitably correct the spherical aberration not only in the case of the design wavelength but also in the case where the wavelength variation occurs, for all of the optical discs D1 to D3.

FIGS. 5A to 5C respectively illustrate the spherical aberrations on the recording surfaces of the optical disc D1 to D3 with respect to NA1. Specifically, FIG. 5A is a graph illustrating the spherical aberration caused, with respect to NA1, on the recording surface of the optical disc D1, FIG. 5B is a graph illustrating the spherical aberration caused, with respect to NA1, on the recording surface of the optical disc D2, and FIG. 5C is a graph illustrating the spherical aberration caused, with respect to NA1, on the recording surface of the optical disc D3.

As shown in FIGS. 5B and 5C, each of the laser beams having the wavelengths $\lambda 2$ and $\lambda 3$ which have passed through the region R3 is divided principally into the 0-th order diffracted light and the first order diffracted light having the relatively high diffraction efficiencies, and converges at a portion away from the imaging point of the corresponding one of the laser beams having the wavelengths $\lambda 2$ and $\lambda 3$ which have passed through the region R1. As shown in FIG. 5C, the laser beam having the wavelength $\lambda 3$ which has passed the region R2 is divided into three or more types of diffracted light and converges in a portion away from the imaging point of the laser beam having the wavelength $\lambda 3$ which has passed the region R1. Therefore, the undesired diffraction order light becomes hard to appear as flare light, and thereby it becomes possible to avoid deterioration of the spot property on the recording surface of each optical disc.

FIG. 6A to 6C respectively illustrate the spherical aberrations on the recording surfaces of the optical discs D1 to D3 with respect to the respective NAs in an optical information recording/reproducing apparatus according to a comparative example. FIGS. 7A to 7C respectively illustrate the spherical aberrations on the recording surfaces of the optical disc D1 to D3 with respect to NA1 in the optical information recording/reproducing apparatus according to the comparative example. The optical information recording/reproducing apparatus according to the comparative example has substantially the same configuration as that of the optical information recording/reproducing apparatus according to the first example, excepting that the objective lens in the comparative example does not satisfy the condition (2) or (16).

As can be seen from FIGS. 6A to 6C and 7A to 7C, each of the laser beams having the wavelengths $\lambda 2$ and $\lambda 3$ which have passed the region R3 is divided principally into the 0-th order diffracted light and the first order diffracted light each of which has a relatively high diffraction efficiency, and converges in the vicinity of the corresponding one of the imaging points of the laser beams having the wavelengths $\lambda 2$ and $\lambda 3$ which have passed the region R1. Therefore, it is impossible to avoid deterioration of the spot property on the recording surface of each optical disc. By contrast, in the optical information recording/reproducing apparatus 100 on which the objective lens 10 according to the first example is mounted, each of the laser beams having the wavelengths $\lambda 2$ and $\lambda 3$ which have passed the region R3 is divided principally into the 0-th order diffracted light and the first order diffracted light each of which has a relatively high diffraction efficiency, and converges in a portion away from the imaging point of the corresponding one of the laser beams having the wavelengths $\lambda 2$ and $\lambda 3$ which have passed the region R1. Therefore, the undesired diffraction order light become hard to appear as flare light, and deterioration of the spot property on the recording surface of each optical disc can be avoided. As described above, the objective lens according to the first example is able to achieve the excellent optical property for the information recording and the information reproducing for each of the optical discs D1 to D3.

Second Example

FIGS. 8A, 8B and 8C respectively illustrate situations where the optical discs D1, D2 and D3 are used in the optical information recording/reproducing apparatus 100 according to a second example. In each of FIGS. 8A, 8B and 8C, the objective lens 10 is illustrated as a cross section. Specifications of the objective lens 10 according to the second example including the use wavelength, the focal length, NA and the magnification M are shown in Table 11.

TABLE 11

|  | 1st Laser Beam | 2nd Laser Beam | 3rd Laser Beam |
|---|---|---|---|
| Wavelength (nm) | 405 | 660 | 790 |
| Focal Length (mm) | 2.20 | 2.36 | 2.41 |
| NA | 0.85 | 0.60 | 0.47 |
| Magnification M | 0.000 | 0.000 | 0.000 |

As shown by the magnification M in Table 11, in the optical information recording/reproducing apparatus 100, each of the $1^{st}$ to $3^{rd}$ laser beams is incident on the corresponding one of the optical discs D1 to D3 as a collimated beam. Therefore, the off-axis aberration is not caused even when the objective lens 10 is shifted by the tracking operation. Table 12 shows a specific numerical configuration of the optical information recording/reproducing apparatus 100 according to the second example defined when the optical disc D1 is used, Table 13 shows a specific numerical configuration of the optical information recording/reproducing apparatus 100 according to the second example defined when the optical disc D2 is used, and Table 14 shows a specific numerical configuration of the optical information recording/reproducing apparatus 100 according to the second example defined when the optical disc D3 is used.

TABLE 12

| Surface | r | d | n(405 nm) |  |
|---|---|---|---|---|
| 1(1st region) | 1.363 | 2.60 | 1.56023 | Objective |
| 1(2nd region) | 1.442 |  |  | Lens 10 |
| 1(3rd region) | 1.304 |  |  |  |
| 2 | −2.780 | 0.75 |  |  |
| 3 | ∞ | 0.0875 | 1.62231 | Optical |
| 4 | ∞ | — |  | Disc D1 |

TABLE 13

| Surface | r | d | n(660 nm) |  |
|---|---|---|---|---|
| 1(1st region) | 1.363 | 2.60 | 1.54044 | Objective |
| 1(2nd region) | 1.442 |  |  | Lens 10 |
| 1(3rd region) | 1.304 |  |  |  |
| 2 | −2.780 | 0.62 |  |  |
| 3 | ∞ | 0.60 | 1.57961 | Optical |
| 4 | ∞ | — |  | Disc D2 |

TABLE 14

| Surface | r | d | n(790 nm) |  |
|---|---|---|---|---|
| 1(1st region) | 1.363 | 2.60 | 1.53653 | Objective |
| 1(2nd region) | 1.442 |  |  | Lens 10 |
| 1(3rd region) | 1.304 |  |  |  |
| 2 | −2.780 | 0.31 |  |  |
| 3 | ∞ | 1.20 | 1.57307 | Optical |
| 4 | ∞ | — |  | Disc D3 |

Each of the first surface 10a and the second surface 10b of the objective lens 10 is an aspherical surface. The following Table 15 shows the conical coefficients and aspherical coefficients of each aspherical surface.

TABLE 15

|  | κ | A4 | A6 |
|---|---|---|---|
| 1(1st region) | −0.7500 | 7.0650E−04 | 7.4380E−03 |
| 1(2nd region) | −0.7500 | 1.7390E−02 | 8.1200E−03 |
| 1(3rd region) | −0.7500 | 8.1940E−04 | −2.1650E−03 |
| 2 | 0.0000 | 2.9080E−01 | −3.6580E−01 |

|  | A8 | A10 | A12 |
|---|---|---|---|
| 1(1st region) | −2.9130E−03 | 7.5630E−04 | −1.9550E−04 |
| 1(2nd region) | −4.8000E−03 | 1.6234E−03 | −2.6845E−04 |
| 1(3rd region) | 4.4360E−04 | 2.4323E−04 | −5.7425E−05 |
| 2 | 5.1080E−01 | −6.1480E−01 | 4.9670E−01 |

|  | A14 | A16 | A18 |
|---|---|---|---|
| 1(1st region) | 0.0000E+00 | 0.0000E+00 | 0.0000E+00 |
| 1(2nd region) | 0.0000E+00 | 0.0000E+00 | 0.0000E+00 |
| 1(3rd region) | 0.0000E+00 | 0.0000E+00 | 0.0000E+00 |
| 2 | −2.2880E−01 | 3.7763E−02 | 1.3302E−02 |

|  | A20 | A22 | A24 |
|---|---|---|---|
| 1(1st region) | 0.0000E+00 | 0.0000E+00 | 0.0000E+00 |
| 1(2nd region) | 0.0000E+00 | 0.0000E+00 | 0.0000E+00 |
| 1(3rd region) | 0.0000E+00 | 0.0000E+00 | 0.0000E+00 |
| 2 | −7.1443E−03 | 9.4756E−04 | 0.0000E+00 |

The range of each of the regions R1 to R3 of the first surface 10a of the objective lens 10 according to the second example is defined as indicated below. Each region has the same function as that of the corresponding region in the first example.

Region R1: $0.000 \leq h \leq 1.135$
Region R2: $1.135 < h \leq 1.415$
Region R3, $1.415 < h \leq 1.870$ The first surface 10a of the objective lens 10 has the annular zone structure. Table 6 shows the coefficient $P_{i2}$ of the optical path difference function which defines the annular zone structure in each region on the first surface 10a. Table 17 shows the BD use diffraction order, DVD use diffraction order and CD use diffraction order.

TABLE 16

|  | P2 | P4 | P6 |
|---|---|---|---|
| 1(1st region) (1) | 4.5048E+01 | −4.2450E+00 | 6.1400E−01 |
| 1(1st region) (2) | −3.9828E+00 | −4.3250E+00 | 3.3360E+00 |
| 1(2nd region) (1) | 4.5045E+01 | −2.4330E+00 | 2.5910E−01 |
| 1(2nd region) (2) | −5.1091E+00 | 2.0250E+00 | 2.4530E−01 |
| 1(3rd region) | 6.0042E+01 | −1.4130E+01 | −2.9460E+00 |

|  | P8 | P10 | P12 |
|---|---|---|---|
| 1(1st region) (1) | −3.9340E−01 | 0.0000E+00 | 0.0000E+00 |
| 1(1st region) (2) | −1.4690E+00 | 0.0000E+00 | 0.0000E+00 |
| 1(2nd region) (1) | −1.8580E−01 | 0.0000E+00 | 0.0000E+00 |
| 1(2nd region) (2) | −3.0550E−01 | 0.0000E+00 | 0.0000E+00 |
| 1(3rd region) | 5.9510E−02 | 0.0000E+00 | 0.0000E+00 |

TABLE 17

|  | 1st Laser Beam | 2nd Laser Beam | 3rd Laser Beam | Hmax |
|---|---|---|---|---|
| 1(1st region) (1) | 1 | 1 | 1 | 1.135 |
| 1(1st region) (2) | 2 | 1 | 1 |  |
| 1(2nd region) (1) | 1 | 1 | 1 | 1.415 |
| 1(2nd region) (2) | 7 | 4 | — |  |
| 1(3rd region) | 1 | — | — | 1.870 |

The following Tables 18 to 20 respectively represent the concrete configurations of the annular zone structure formed in the regions R1 to R3.

TABLE 18

| Number | hmin | hmax | $\Delta OPD_{11}/\lambda 1$ | $\Delta OPD_{21}/\lambda 1$ |
|---|---|---|---|---|
| 0 | 0.000 | 0.105 | | |
| 1 | 0.105 | 0.183 | 1.26 | |
| 2 | 0.183 | 0.236 | 1.26 | |
| 3 | 0.236 | 0.280 | 1.26 | |
| 4 | 0.280 | 0.318 | 1.26 | |
| 5 | 0.318 | 0.336 | 1.26 | |
| 6 | 0.336 | 0.351 | | −2.00 |
| 7 | 0.351 | 0.382 | 1.26 | |
| 8 | 0.382 | 0.411 | 1.26 | |
| 9 | 0.411 | 0.438 | 1.26 | |
| 10 | 0.438 | 0.464 | 1.26 | |
| 11 | 0.464 | 0.488 | 1.26 | |
| 12 | 0.488 | 0.511 | 1.26 | |
| 13 | 0.511 | 0.534 | 1.26 | |
| 14 | 0.534 | 0.547 | 1.26 | |
| 15 | 0.547 | 0.555 | | −2.00 |
| 16 | 0.555 | 0.576 | 1.26 | |
| 17 | 0.576 | 0.596 | 1.26 | |
| 18 | 0.596 | 0.616 | 1.26 | |
| 19 | 0.616 | 0.635 | 1.26 | |
| 20 | 0.635 | 0.654 | 1.26 | |
| 21 | 0.654 | 0.672 | 1.26 | |
| 22 | 0.672 | 0.680 | 1.26 | |
| 23 | 0.680 | 0.689 | | −2.00 |
| 24 | 0.689 | 0.707 | 1.26 | |
| 25 | 0.707 | 0.724 | 1.26 | |
| 26 | 0.724 | 0.741 | 1.26 | |
| 27 | 0.741 | 0.757 | 1.26 | |
| 28 | 0.757 | 0.773 | 1.26 | |
| 29 | 0.773 | 0.782 | 1.26 | |
| 30 | 0.782 | 0.789 | | −2.00 |
| 31 | 0.789 | 0.805 | 1.26 | |
| 32 | 0.805 | 0.820 | 1.26 | |
| 33 | 0.820 | 0.836 | 1.26 | |
| 34 | 0.836 | 0.851 | 1.26 | |
| 35 | 0.851 | 0.866 | 1.26 | |
| 36 | 0.866 | 0.868 | 1.26 | |
| 37 | 0.868 | 0.880 | | −2.00 |
| 38 | 0.880 | 0.895 | 1.26 | |
| 39 | 0.895 | 0.909 | 1.26 | |
| 40 | 0.909 | 0.923 | 1.26 | |
| 41 | 0.923 | 0.938 | 1.26 | |
| 42 | 0.938 | 0.941 | 1.26 | |
| 43 | 0.941 | 0.952 | | −2.00 |
| 44 | 0.952 | 0.965 | 1.26 | |
| 45 | 0.965 | 0.979 | 1.26 | |
| 46 | 0.979 | 0.993 | 1.26 | |
| 47 | 0.993 | 1.003 | 1.26 | |
| 48 | 1.003 | 1.006 | | −2.00 |
| 49 | 1.006 | 1.020 | 1.26 | |
| 50 | 1.020 | 1.033 | 1.26 | |
| 51 | 1.033 | 1.047 | 1.26 | |
| 52 | 1.047 | 1.058 | 1.26 | |
| 53 | 1.058 | 1.060 | | −2.00 |
| 54 | 1.060 | 1.073 | 1.26 | |
| 55 | 1.073 | 1.086 | 1.26 | |
| 56 | 1.086 | 1.100 | 1.26 | |
| 57 | 1.100 | 1.105 | 1.26 | |
| 58 | 1.105 | 1.113 | | −2.00 |
| 59 | 1.113 | 1.126 | 1.26 | |
| 60 | 1.126 | 1.135 | 1.26 | |

TABLE 19

| Number | hmin | hmax | $\Delta OPD_{12}/\lambda 1$ | $\Delta OPD_{22}/\lambda 1$ | $\Delta OPD_{32}/\lambda 1$ |
|---|---|---|---|---|---|
| 61 | 1.135 | 1.140 | | | −3.51 |
| 62 | 1.140 | 1.152 | 1.12 | | |
| 63 | 1.152 | 1.163 | 1.12 | | |
| 64 | 1.163 | 1.174 | 1.12 | | |
| 65 | 1.174 | 1.186 | 1.12 | | |
| 66 | 1.186 | 1.197 | 1.12 | | |
| 67 | 1.197 | 1.208 | 1.12 | | |
| 68 | 1.208 | 1.219 | 1.12 | | |
| 69 | 1.219 | 1.230 | 1.12 | | |
| 70 | 1.230 | 1.241 | 1.12 | | |
| 71 | 1.241 | 1.252 | 1.12 | | |
| 72 | 1.252 | 1.263 | 1.12 | | |
| 73 | 1.263 | 1.274 | 1.12 | | |
| 74 | 1.274 | 1.285 | 1.12 | | |
| 75 | 1.285 | 1.296 | 1.12 | | |
| 76 | 1.296 | 1.306 | 1.12 | | |
| 77 | 1.306 | 1.317 | 1.12 | | |
| 78 | 1.317 | 1.328 | 1.12 | | |
| 79 | 1.328 | 1.339 | 1.12 | | |
| 80 | 1.339 | 1.350 | 1.12 | | |
| 81 | 1.350 | 1.354 | 1.12 | | |
| 82 | 1.354 | 1.360 | | −6.81 | |
| 83 | 1.360 | 1.371 | 1.12 | | |
| 84 | 1.371 | 1.382 | 1.12 | | |
| 85 | 1.382 | 1.393 | 1.12 | | |
| 86 | 1.393 | 1.404 | 1.12 | | |
| 87 | 1.404 | 1.415 | 1.12 | | |

TABLE 20

| Number | hmin | hmax | $\Delta OPD_{13}/\lambda 1$ | $\Delta OPD_{23}/\lambda 1$ |
|---|---|---|---|---|
| 88 | 1.415 | 1.419 | | −3.28 |
| 89 | 1.419 | 1.430 | −1.00 | |
| 90 | 1.430 | 1.441 | −1.00 | |
| 91 | 1.441 | 1.451 | −1.00 | |
| 92 | 1.451 | 1.460 | −1.00 | |
| 93 | 1.460 | 1.469 | −1.00 | |
| 94 | 1.469 | 1.477 | −1.00 | |
| 95 | 1.477 | 1.485 | −1.00 | |
| 96 | 1.485 | 1.493 | −1.00 | |
| 97 | 1.493 | 1.500 | −1.00 | |
| 98 | 1.500 | 1.507 | −1.00 | |
| 99 | 1.507 | 1.514 | −1.00 | |
| 100 | 1.514 | 1.521 | −1.00 | |
| 101 | 1.521 | 1.528 | −1.00 | |
| 102 | 1.528 | 1.534 | −1.00 | |
| 103 | 1.534 | 1.540 | −1.00 | |
| 104 | 1.540 | 1.546 | −1.00 | |
| 105 | 1.546 | 1.552 | −1.00 | |
| 106 | 1.552 | 1.558 | −1.00 | |
| 107 | 1.558 | 1.563 | −1.00 | |
| 108 | 1.563 | 1.569 | −1.00 | |
| 109 | 1.569 | 1.574 | −1.00 | |
| 110 | 1.574 | 1.579 | −1.00 | |
| 111 | 1.579 | 1.584 | −1.00 | |
| 112 | 1.584 | 1.589 | −1.00 | |
| 113 | 1.589 | 1.594 | −1.00 | |
| 114 | 1.594 | 1.599 | −1.00 | |
| 115 | 1.599 | 1.603 | −1.00 | |
| 116 | 1.603 | 1.608 | −1.00 | |
| 117 | 1.608 | 1.613 | −1.00 | |
| 118 | 1.613 | 1.617 | −1.00 | |
| 119 | 1.617 | 1.621 | −1.00 | |
| 120 | 1.621 | 1.626 | −1.00 | |
| 121 | 1.626 | 1.630 | −1.00 | |
| 122 | 1.630 | 1.634 | −1.00 | |
| 123 | 1.634 | 1.638 | −1.00 | |
| 124 | 1.638 | 1.642 | −1.00 | |
| 125 | 1.642 | 1.646 | −1.00 | |
| 126 | 1.646 | 1.650 | −1.00 | |
| 127 | 1.650 | 1.654 | −1.00 | |
| 128 | 1.654 | 1.658 | −1.00 | |
| 129 | 1.658 | 1.662 | −1.00 | |
| 130 | 1.662 | 1.665 | −1.00 | |
| 131 | 1.665 | 1.669 | −1.00 | |
| 132 | 1.669 | 1.673 | −1.00 | |
| 133 | 1.673 | 1.676 | −1.00 | |
| 134 | 1.676 | 1.680 | −1.00 | |
| 135 | 1.680 | 1.683 | −1.00 | |
| 136 | 1.683 | 1.687 | −1.00 | |
| 137 | 1.687 | 1.690 | −1.00 | |
| 138 | 1.690 | 1.694 | −1.00 | |
| 139 | 1.694 | 1.697 | −1.00 | |

TABLE 20-continued

| Number | hmin | hmax | $\Delta OPD_{13}/\lambda1$ | $\Delta OPD_{23}/\lambda1$ |
|---|---|---|---|---|
| 140 | 1.697 | 1.700 | −1.00 | |
| 141 | 1.700 | 1.703 | −1.00 | |
| 142 | 1.703 | 1.707 | −1.00 | |
| 143 | 1.707 | 1.710 | −1.00 | |
| 144 | 1.710 | 1.713 | −1.00 | |
| 145 | 1.713 | 1.716 | −1.00 | |
| 146 | 1.716 | 1.719 | −1.00 | |
| 147 | 1.719 | 1.722 | −1.00 | |
| 148 | 1.722 | 1.725 | −1.00 | |
| 149 | 1.725 | 1.728 | −1.00 | |
| 150 | 1.728 | 1.731 | −1.00 | |
| 151 | 1.731 | 1.734 | −1.00 | |
| 152 | 1.734 | 1.737 | −1.00 | |
| 153 | 1.737 | 1.740 | −1.00 | |
| 154 | 1.740 | 1.743 | −1.00 | |
| 155 | 1.743 | 1.746 | −1.00 | |
| 156 | 1.746 | 1.749 | −1.00 | |
| 157 | 1.749 | 1.751 | −1.00 | |
| 158 | 1.751 | 1.754 | −1.00 | |
| 159 | 1.754 | 1.757 | −1.00 | |
| 160 | 1.757 | 1.760 | −1.00 | |
| 161 | 1.760 | 1.762 | −1.00 | |
| 162 | 1.762 | 1.765 | −1.00 | |
| 163 | 1.765 | 1.768 | −1.00 | |
| 164 | 1.768 | 1.770 | −1.00 | |
| 165 | 1.770 | 1.773 | −1.00 | |
| 166 | 1.773 | 1.775 | −1.00 | |
| 167 | 1.775 | 1.778 | −1.00 | |
| 168 | 1.778 | 1.780 | −1.00 | |
| 169 | 1.780 | 1.783 | −1.00 | |
| 170 | 1.783 | 1.785 | −1.00 | |
| 171 | 1.785 | 1.788 | −1.00 | |
| 172 | 1.788 | 1.790 | −1.00 | |
| 173 | 1.790 | 1.793 | −1.00 | |
| 174 | 1.793 | 1.795 | −1.00 | |
| 175 | 1.795 | 1.798 | −1.00 | |
| 176 | 1.798 | 1.800 | −1.00 | |
| 177 | 1.800 | 1.803 | −1.00 | |
| 178 | 1.803 | 1.805 | −1.00 | |
| 179 | 1.805 | 1.807 | −1.00 | |
| 180 | 1.807 | 1.810 | −1.00 | |
| 181 | 1.810 | 1.812 | −1.00 | |
| 182 | 1.812 | 1.814 | −1.00 | |
| 183 | 1.814 | 1.816 | −1.00 | |
| 184 | 1.816 | 1.819 | −1.00 | |
| 185 | 1.819 | 1.821 | −1.00 | |
| 186 | 1.821 | 1.823 | −1.00 | |
| 187 | 1.823 | 1.825 | −1.00 | |
| 188 | 1.825 | 1.828 | −1.00 | |
| 189 | 1.828 | 1.830 | −1.00 | |
| 190 | 1.830 | 1.832 | −1.00 | |
| 191 | 1.832 | 1.834 | −1.00 | |
| 192 | 1.834 | 1.836 | −1.00 | |
| 193 | 1.836 | 1.839 | −1.00 | |
| 194 | 1.839 | 1.841 | −1.00 | |
| 195 | 1.841 | 1.843 | −1.00 | |
| 196 | 1.843 | 1.845 | −1.00 | |
| 197 | 1.845 | 1.847 | −1.00 | |
| 198 | 1.847 | 1.849 | −1.00 | |
| 199 | 1.849 | 1.851 | −1.00 | |
| 200 | 1.851 | 1.853 | −1.00 | |
| 201 | 1.853 | 1.855 | −1.00 | |
| 202 | 1.855 | 1.857 | −1.00 | |
| 203 | 1.857 | 1.859 | −1.00 | |
| 204 | 1.859 | 1.861 | −1.00 | |
| 205 | 1.861 | 1.863 | −1.00 | |
| 206 | 1.863 | 1.865 | −1.00 | |
| 207 | 1.865 | 1.867 | −1.00 | |
| 208 | 1.867 | 1.870 | −1.00 | |

As shown in Table 54, the optical information recording/reproducing apparatus 100 on which the objective lens 10 according to the second example is mounted satisfies the conditions (1) to (4), (6) to (17), (19) to (21) and (23) to (27). Therefore, the optical information recording/reproducing apparatus 100 according to the second example is able to avoid deterioration of the spot property by the undesired diffraction order of light while suitably correcting the spherical aberration for each of the optical discs D1 to D3, and is able to secure an adequate working distance when the optical disc D3 is used.

FIG. 9A to 9C respectively illustrate the spherical aberrations on the recording surfaces of the optical discs D1 to D3 with respect to the respective NAs. Specifically, FIG. 9A is a graph illustrating the spherical aberration caused on the recording surface of the optical disc D1 with respect to NA1 (=0.85) of the optical disc D1, FIG. 9B is a graph illustrating the spherical aberration caused on the recording surface of the optical disc D2 with respect to NA2 (=0.65) of the optical disc D2, and FIG. 9C is a graph illustrating the spherical aberration caused on the recording surface of the optical disc D3 with respect to NA3 (=0.47) of the optical disc D3.

As shown in FIGS. 9A to 9C, the optical information recording/reproducing apparatus 100 according to the second example is able to suitably correct the spherical aberration not only in the case of the design wavelength but also in the case where the wavelength variation occurs, for all of the optical discs D1 to D3.

FIGS. 10A to 10C respectively illustrate the spherical aberrations on the recording surfaces of the optical disc D1 to D3 with respect to NA1. Specifically, FIG. 10A is a graph illustrating the spherical aberration caused, with respect to NA1, on the recording surface of the optical disc D1, FIG. 10B is a graph illustrating the spherical aberration caused, with respect to NA1, on the recording surface of the optical disc D2, and FIG. 10C is a graph illustrating the spherical aberration caused, with respect to NA1, on the recording surface of the optical disc D3.

As shown in FIGS. 10B and 10C, each of the laser beams having the wavelengths $\lambda2$ and $\lambda3$ which have passed through the region R3 is divided principally into the 0-th order diffracted light and the first order diffracted light having the relatively high diffraction efficiencies, and converges at a portion away from the imaging point of the corresponding one of the laser beams having the wavelengths $\lambda2$ and $\lambda3$ which have passed through the region R1. As shown in FIG. 10C, the laser beam having the wavelength $\lambda3$ which has passed the region R2 is divided into three or more types of diffracted light and converges in a portion away from the imaging point of the laser beam having the wavelength $\lambda3$ which has passed the region R1. Therefore, the undesired diffraction order light becomes hard to appear as flare light, and thereby it becomes possible to avoid deterioration of the spot property on the recording surface of each optical disc.

Third Example

FIGS. 11A, 11B and 11C respectively illustrate situations where the optical discs D1, D2 and D3 are used in the optical information recording/reproducing apparatus 100 according to a third example. In each of FIGS. 11A, 11B and 11C, the objective lens 10 is illustrated as a cross section. Specifications of the objective lens 10 according to the third example including the use wavelength, the focal length, NA and the magnification M are shown in Table 21.

TABLE 21

| | $1^{st}$ Laser Beam | $2^{nd}$ Laser Beam | $3^{rd}$ Laser Beam |
|---|---|---|---|
| Wavelength (nm) | 405 | 660 | 790 |
| Focal Length (mm) | 2.60 | 2.78 | 2.83 |

TABLE 21-continued

|  | $1^{st}$ Laser Beam | $2^{nd}$ Laser Beam | $3^{rd}$ Laser Beam |
|---|---|---|---|
| NA | 0.85 | 0.60 | 0.47 |
| Magnification M | 0.000 | 0.000 | 0.000 |

As shown by the magnification M in Table 21, in the optical information recording/reproducing apparatus 100, each of the $1^{st}$ to $3^{rd}$ laser beams is incident on the corresponding one of the optical discs D1 to D3 as a collimated beam. Therefore, the off-axis aberration is not caused even when the objective lens 10 is shifted by the tracking operation. Table 22 shows a specific numerical configuration of the optical information recording/reproducing apparatus 100 according to the third example defined when the optical disc D1 is used, Table 13 shows a specific numerical configuration of the optical information recording/reproducing apparatus 100 according to the third example defined when the optical disc D2 is used, and Table 14 shows a specific numerical configuration of the optical information recording/reproducing apparatus 100 according to the third example defined when the optical disc D3 is used.

TABLE 22

| Surface | r | d | n(405 nm) |  |
|---|---|---|---|---|
| 0 | ∞ | 1.98 |  | Light Source 1A |
| 1 | ∞ | 2.00 | 1.52972 | Diffraction Grating 2A |
| 2 | ∞ | 22.00 |  |  |
| 3 | 140.000 | 1.20 | 1.52469 | Coupling Lens 3A |
| 4 | −15.070 | 1.00 |  |  |
| 5 | ∞ | 5.00 | 1.52972 | Beam Splitter 41 |
| 6 | ∞ | 1.00 |  |  |
| 7 | ∞ | 5.00 | 1.52972 | Beam Splitter 42 |
| 8 | ∞ | 3.00 |  |  |
| 9($1^{st}$ region) | 1.671 | 3.15 | 1.56023 | Objective Lens 10 |
| 9($2^{nd}$ region) | 1.605 |  |  |  |
| 9($3^{rd}$ region) | 1.594 |  |  |  |
| 10 | −3.167 | 0.85 |  |  |
| 11 | ∞ | 0.0875 | 1.62231 | Optical Disc D1 |
| 12 | ∞ | — |  |  |

TABLE 23

| Surface | r | d | n(660 nm) |  |
|---|---|---|---|---|
| 0 | ∞ | 1.97 |  | Light Source 1B |
| 1 | ∞ | 2.00 | 1.51374 | Diffraction Grating 2B |
| 2 | ∞ | 17.00 |  |  |
| 3 | 129.400 | 1.20 | 1.54044 | Coupling Lens 3B |
| 4 | −12.400 | 1.00 |  |  |
| 5 | ∞ | 5.00 | 1.51374 | Beam Splitter 41 |
| 6 | ∞ | 1.00 |  |  |
| 7 | ∞ | 5.00 | 1.51374 | Beam Splitter 42 |
| 8 | ∞ | 3.10 |  |  |
| 9($1^{st}$ region) | 1.671 | 3.15 | 1.54044 | Objective Lens 10 |
| 9($2^{nd}$ region) | 1.605 |  |  |  |
| 9($3^{rd}$ region) | 1.594 |  |  |  |
| 10 | −3.167 | 0.75 |  |  |
| 11 | ∞ | 0.60 | 1.57961 | Optical Disc D2 |
| 12 | ∞ | — |  |  |

TABLE 24

| Surface | r | d | n(790 nm) |  |
|---|---|---|---|---|
| 0 | ∞ | 1.96 |  | Light Source 1C |
| 1 | ∞ | 2.00 | 1.51052 | Diffraction Grating 2C |
| 2 | ∞ | 17.00 |  |  |
| 3 | 124.100 | 1.20 | 1.53653 | Coupling Lens 3C |
| 4 | −12.350 | 1.00 |  |  |
| 5 | ∞ | 5.00 | 1.51052 | Beam Splitter 42 |
| 6 | ∞ | 0.42 |  |  |
| 7($1^{st}$ region) | 1.671 | 3.15 | 1.53653 | Objective Lens 10 |
| 7($2^{nd}$ region) | 1.605 |  |  |  |
| 7($3^{rd}$ region) | 1.594 |  |  |  |
| 8 | −3.167 | 0.43 |  |  |
| 9 | ∞ | 1.20 | 1.57307 | Optical Disc D3 |
| 10 | ∞ | — |  |  |

Each of the second surface (surface #4) of the coupling lens the first surface 10*a* and the second surface 10*b* of the objective lens 10 is an aspherical surface. The following Tables 25 to 27 show the conical coefficients and aspherical coefficients of each aspherical surface. Specifically, Table 25 shows the conical coefficients and aspherical coefficients for BD, Table 26 shows the conical coefficients and aspherical coefficients for DVD, and Table 27 shows the conical coefficients and aspherical coefficients for CD. It should be noted that the conical coefficients and aspherical coefficients of the first and second surfaces 10*a* and 10*b* of the objective lens 10 shown in Table 25 are common to BD (Table 25), DVD (Table 26) and CD (Table 27).

TABLE 25

|  | κ | A4 | A6 |
|---|---|---|---|
| 4 | 0.0000 | 2.6540E−05 | 8.6800E−08 |
| 9($1^{st}$ region) | −0.7500 | 1.3410E−03 | 1.7250E−03 |
| 9($2^{nd}$ region) | −0.7500 | −1.5590E−02 | 7.5990E−03 |
| 9($3^{rd}$ region) | −0.7500 | −9.7930E−03 | 2.7650E−03 |
| 10 | 0.0000 | 1.4940E−01 | −1.3600E−01 |

|  | A8 | A10 | A12 |
|---|---|---|---|
| 4 | 2.4300E−10 | 0.0000E+00 | 0.0000E+00 |
| 9($1^{st}$ region) | −5.9300E−04 | 1.0670E−04 | −1.9309E−05 |
| 9($2^{nd}$ region) | −1.5520E−03 | 2.3830E−04 | −3.6004E−05 |
| 9($3^{rd}$ region) | −7.8540E−04 | 2.1080E−04 | −2.1673E−05 |
| 10 | 1.4840E−01 | −1.3500E−01 | 7.9640E−02 |

|  | A14 | A16 | A18 |
|---|---|---|---|
| 4 | 0.0000E+00 | 0.0000E+00 | 0.0000E+00 |
| 9($1^{st}$ region) | 0.0000E+00 | 0.0000E+00 | 0.0000E+00 |
| 9($2^{nd}$ region) | 0.0000E+00 | 0.0000E+00 | 0.0000E+00 |
| 9($3^{rd}$ region) | 0.0000E+00 | 0.0000E+00 | 0.0000E+00 |
| 10 | −2.6232E−02 | 2.9634E−03 | 8.1022E−04 |

|  | A20 | A22 | A24 |
|---|---|---|---|
| 4 | 0.0000E+00 | 0.0000E+00 | 0.0000E+00 |
| 9($1^{st}$ region) | 0.0000E+00 | 0.0000E+00 | 0.0000E+00 |
| 9($2^{nd}$ region) | 0.0000E+00 | 0.0000E+00 | 0.0000E+00 |
| 9($3^{rd}$ region) | 0.0000E+00 | 0.0000E+00 | 0.0000E+00 |
| 10 | −2.8801E−04 | 2.4912E−05 | 0.0000E+00 |

TABLE 26

|  | κ | A4 | A6 |
|---|---|---|---|
| 4 | 0.0000 | 4.6580E−05 | 2.2680E−07 |

|  | A8 | A10 | A12 |
|---|---|---|---|

TABLE 26-continued

| | | | |
|---|---|---|---|
| 4 | 9.4710E−10 | 0.0000E+00 | 0.0000E+00 |

| | A14 | A16 | A18 |
|---|---|---|---|
| 4 | 0.0000E+00 | 0.0000E+00 | 0.0000E+00 |

| | A20 | A22 | A24 |
|---|---|---|---|
| 4 | 0.0000E+00 | 0.0000E+00 | 0.0000E+00 |

TABLE 27

| | κ | A4 | A6 |
|---|---|---|---|
| 4 | 0.0000 | 4.7400E−05 | 2.3240E−07 |

| | A8 | A10 | A12 |
|---|---|---|---|
| 4 | 1.0500E−09 | 0.0000E+00 | 0.0000E+00 |

| | A14 | A16 | A18 |
|---|---|---|---|
| 4 | 0.0000E+00 | 0.0000E+00 | 0.0000E+00 |

| | A20 | A22 | A24 |
|---|---|---|---|
| 4 | 0.0000E+00 | 0.0000E+00 | 0.0000E+00 |

The range of each of the regions R1 to R3 of the first surface 10a of the objective lens 10 according to the third example is defined as indicated below. Each region has the same function as that of the corresponding region in the first example.

Region R1: $0.000 \leq h \leq 1.330$
Region R2: $1.330 < h \leq 1.670$
Region R3: $1.670 < h \leq 2.210$ The first surface 10a of the objective lens 10 has the annular zone structure. Table 28 shows the coefficients of the optical path difference function which defines the annular zone structure in each region on the first surface 10a. Table 29 shows the BD use diffraction order, DVD use diffraction order and CD use diffraction order.

TABLE 28

| | P2 | P4 | P6 |
|---|---|---|---|
| 1(1st region) (1) | 3.5003E+01 | −1.1050E+00 | −9.9340E−02 |
| 1(1st region) (2) | −9.9985E+00 | −2.3840E+00 | 8.3510E−01 |
| 1(2nd region) (1) | 3.9152E+01 | −1.3230E+00 | −3.4700E−02 |
| 1(2nd region) (2) | −1.0180E+00 | −3.8800E+00 | 1.4180E+00 |
| 1(3rd region) | 3.5000E+01 | −2.0270E+01 | 2.6550E+00 |

| | P8 | P10 | P12 |
|---|---|---|---|
| 1(1st region) (1) | −9.5010E−02 | 0.0000E+00 | 0.0000E+00 |
| 1(1st region) (2) | −2.6900E−01 | 0.0000E+00 | 0.0000E+00 |
| 1(2nd region) (1) | −5.1810E−02 | 0.0000E+00 | 0.0000E+00 |
| 1(2nd region) (2) | −2.1890E−01 | 0.0000E+00 | 0.0000E+00 |
| 1(3rd region) | −2.5030E−01 | 0.0000E+00 | 0.0000E+00 |

TABLE 29

| | 1st Laser Beam | 2nd Laser Beam | 3rd Laser Beam | Hmax |
|---|---|---|---|---|
| 1(1st region) (1) | 1 | 1 | 1 | 1.330 |
| 1(1st region) (2) | 2 | 1 | 1 | |
| 1(2nd region) (1) | 1 | 1 | 1 | 1.670 |
| 1(2nd region) (2) | 7 | 4 | — | |
| 1(3rd region) | 1 | — | — | 2.210 |

The following Tables 30 to 32 respectively represent the concrete configurations of the annular zone structure formed in the regions R1 to R3.

TABLE 30

| Surface | hmin | hmax | $\Delta OPD_{11}/\lambda 1$ | $\Delta OPD_{21}/\lambda$ | $\Delta OPD_{31}/\lambda$ |
|---|---|---|---|---|---|
| 0 | 0.000 | 0.120 | | | |
| 1 | 0.120 | 0.207 | 1.26 | | |
| 2 | 0.207 | 0.222 | 1.26 | | |
| 3 | 0.222 | 0.268 | | −2.00 | |
| 4 | 0.268 | 0.317 | 1.26 | | |
| 5 | 0.317 | 0.359 | 1.26 | | |
| 6 | 0.359 | 0.381 | 1.26 | | |
| 7 | 0.381 | 0.397 | | −2.00 | |
| 8 | 0.397 | 0.432 | 1.26 | | |
| 9 | 0.432 | 0.465 | 1.26 | | |
| 10 | 0.465 | 0.487 | 1.26 | | |
| 11 | 0.487 | 0.495 | | −2.00 | |
| 12 | 0.495 | 0.523 | 1.26 | | |
| 13 | 0.523 | 0.550 | 1.26 | | |
| 14 | 0.550 | 0.572 | 1.26 | | |
| 15 | 0.572 | 0.576 | | −2.00 | |
| 16 | 0.576 | 0.601 | 1.26 | | |
| 17 | 0.601 | 0.625 | 1.26 | | |
| 18 | 0.625 | 0.644 | 1.26 | | |
| 19 | 0.644 | 0.648 | | −2.00 | |
| 20 | 0.648 | 0.670 | 1.26 | | |
| 21 | 0.670 | 0.692 | 1.26 | | |
| 22 | 0.692 | 0.707 | 1.26 | | |
| 23 | 0.707 | 0.713 | | −2.00 | |
| 24 | 0.713 | 0.734 | 1.26 | | |
| 25 | 0.734 | 0.754 | 1.26 | | |
| 26 | 0.754 | 0.763 | 1.26 | | |
| 27 | 0.763 | 0.773 | | −2.00 | |
| 28 | 0.773 | 0.792 | 1.26 | | |
| 29 | 0.792 | 0.811 | 1.26 | | |
| 30 | 0.811 | 0.815 | 1.26 | | |
| 31 | 0.815 | 0.829 | | −2.00 | |
| 32 | 0.829 | 0.847 | 1.26 | | |
| 33 | 0.847 | 0.863 | 1.26 | | |
| 34 | 0.863 | 0.865 | | −2.00 | |
| 35 | 0.865 | 0.882 | 1.26 | | |
| 36 | 0.882 | 0.899 | 1.26 | | |
| 37 | 0.899 | 0.907 | 1.26 | | |
| 38 | 0.907 | 0.916 | | −2.00 | |
| 39 | 0.916 | 0.933 | 1.26 | | |
| 40 | 0.933 | 0.949 | 1.26 | | |
| 41 | 0.949 | 0.965 | | | −0.74 |
| 42 | 0.965 | 0.981 | 1.26 | | |
| 43 | 0.981 | 0.988 | 1.26 | | |
| 44 | 0.988 | 0.997 | | −2.00 | |
| 45 | 0.997 | 1.012 | 1.26 | | |
| 46 | 1.012 | 1.025 | 1.26 | | |
| 47 | 1.025 | 1.028 | | −2.00 | |
| 48 | 1.028 | 1.043 | 1.26 | | |
| 49 | 1.043 | 1.058 | 1.26 | | |
| 50 | 1.058 | 1.060 | 1.26 | | |
| 51 | 1.060 | 1.073 | | −2.00 | |
| 52 | 1.073 | 1.087 | 1.26 | | |
| 53 | 1.087 | 1.094 | 1.26 | | |
| 54 | 1.094 | 1.102 | | −2.00 | |
| 55 | 1.102 | 1.117 | 1.26 | | |
| 56 | 1.117 | 1.126 | 1.26 | | |
| 57 | 1.126 | 1.131 | | −2.00 | |
| 58 | 1.131 | 1.145 | 1.26 | | |
| 59 | 1.145 | 1.156 | 1.26 | | |
| 60 | 1.156 | 1.159 | | −2.00 | |
| 61 | 1.159 | 1.173 | 1.26 | | |
| 62 | 1.173 | 1.186 | 1.26 | | |
| 63 | 1.186 | 1.187 | | −2.00 | |
| 64 | 1.187 | 1.201 | 1.26 | | |
| 65 | 1.201 | 1.214 | 1.26 | | |
| 66 | 1.214 | 1.215 | | −2.00 | |
| 67 | 1.215 | 1.229 | 1.26 | | |
| 68 | 1.229 | 1.241 | 1.26 | | |
| 69 | 1.241 | 1.243 | | −2.00 | |
| 70 | 1.243 | 1.256 | 1.26 | | |
| 71 | 1.256 | 1.266 | 1.26 | | |
| 72 | 1.266 | 1.270 | | −2.00 | |

TABLE 30-continued

| Surface | hmin | hmax | ΔOPD$_{11}$/λ1 | ΔOPD$_{21}$/λ | ΔOPD$_{31}$/λ |
|---|---|---|---|---|---|
| 73 | 1.270 | 1.283 | 1.26 | | |
| 74 | 1.283 | 1.291 | 1.26 | | |
| 75 | 1.291 | 1.297 | | | −2.00 |
| 76 | 1.297 | 1.310 | 1.26 | | |
| 77 | 1.310 | 1.315 | 1.26 | | |
| 78 | 1.315 | 1.330 | | | −2.00 |

TABLE 31

| Number | hmin | hmax | ΔOPD$_{12}$/λ1 | ΔOPD$_{22}$/λ | ΔOPD$_{32}$/λ |
|---|---|---|---|---|---|
| 79 | 1.330 | 1.342 | −3.90 | | |
| 80 | 1.342 | 1.354 | 1.12 | | |
| 81 | 1.354 | 1.365 | | | −5.68 |
| 82 | 1.365 | 1.376 | 1.12 | | |
| 83 | 1.376 | 1.387 | 1.12 | | |
| 84 | 1.387 | 1.399 | 1.12 | | |
| 85 | 1.399 | 1.410 | 1.12 | | |
| 86 | 1.410 | 1.421 | | | −5.68 |
| 87 | 1.421 | 1.432 | 1.12 | | |
| 88 | 1.432 | 1.443 | 1.12 | | |
| 89 | 1.443 | 1.454 | 1.12 | | |
| 90 | 1.454 | 1.463 | 1.12 | | |
| 91 | 1.463 | 1.465 | | −6.81 | |
| 92 | 1.465 | 1.476 | 1.12 | | |
| 93 | 1.476 | 1.487 | 1.12 | | |
| 94 | 1.487 | 1.498 | 1.12 | | |
| 95 | 1.498 | 1.509 | 1.12 | | |
| 96 | 1.509 | 1.512 | 1.12 | | |
| 97 | 1.512 | 1.520 | | −6.81 | |
| 98 | 1.520 | 1.531 | 1.12 | | |
| 99 | 1.531 | 1.542 | 1.12 | | |
| 100 | 1.542 | 1.553 | 1.12 | | |
| 101 | 1.553 | 1.558 | 1.12 | | |
| 102 | 1.558 | 1.564 | | −6.81 | |
| 103 | 1.564 | 1.575 | 1.12 | | |
| 104 | 1.575 | 1.586 | 1.12 | | |
| 105 | 1.586 | 1.597 | 1.12 | | |
| 106 | 1.597 | 1.600 | 1.12 | | |
| 107 | 1.600 | 1.608 | | −6.81 | |
| 108 | 1.608 | 1.619 | 1.12 | | |
| 109 | 1.619 | 1.631 | 1.12 | | |
| 110 | 1.631 | 1.639 | 1.12 | | |
| 111 | 1.639 | 1.642 | | −6.81 | |
| 112 | 1.642 | 1.653 | 1.12 | | |
| 113 | 1.653 | 1.664 | 1.12 | | |
| 114 | 1.664 | 1.670 | 1.12 | | |

TABLE 32

| Number | hmin | hmax | ΔOPD$_{13}$/λ1 | ΔOPD$_{23}$/λ |
|---|---|---|---|---|
| 115 | 1.670 | 1.661 | | −4.10 |
| 116 | 1.661 | 1.669 | −1.00 | |
| 117 | 1.669 | 1.677 | −1.00 | |
| 118 | 1.677 | 1.685 | −1.00 | |
| 119 | 1.685 | 1.692 | −1.00 | |
| 120 | 1.692 | 1.700 | −1.00 | |
| 121 | 1.700 | 1.707 | −1.00 | |
| 122 | 1.707 | 1.714 | −1.00 | |
| 123 | 1.714 | 1.721 | −1.00 | |
| 124 | 1.721 | 1.728 | −1.00 | |
| 125 | 1.728 | 1.735 | −1.00 | |
| 126 | 1.735 | 1.742 | −1.00 | |
| 127 | 1.742 | 1.749 | −1.00 | |
| 128 | 1.749 | 1.755 | −1.00 | |
| 129 | 1.755 | 1.762 | −1.00 | |
| 130 | 1.762 | 1.768 | −1.00 | |
| 131 | 1.768 | 1.775 | −1.00 | |
| 132 | 1.775 | 1.781 | −1.00 | |
| 133 | 1.781 | 1.787 | −1.00 | |
| 134 | 1.787 | 1.793 | −1.00 | |
| 135 | 1.793 | 1.799 | −1.00 | |
| 136 | 1.799 | 1.805 | −1.00 | |
| 137 | 1.805 | 1.811 | −1.00 | |
| 138 | 1.811 | 1.817 | −1.00 | |
| 139 | 1.817 | 1.822 | −1.00 | |
| 140 | 1.822 | 1.828 | −1.00 | |
| 141 | 1.828 | 1.833 | −1.00 | |
| 142 | 1.833 | 1.839 | −1.00 | |
| 143 | 1.839 | 1.844 | −1.00 | |
| 144 | 1.844 | 1.850 | −1.00 | |
| 145 | 1.850 | 1.855 | −1.00 | |
| 146 | 1.855 | 1.860 | −1.00 | |
| 147 | 1.860 | 1.866 | −1.00 | |
| 148 | 1.866 | 1.871 | −1.00 | |
| 149 | 1.871 | 1.876 | −1.00 | |
| 150 | 1.876 | 1.881 | −1.00 | |
| 151 | 1.881 | 1.886 | −1.00 | |
| 152 | 1.886 | 1.891 | −1.00 | |
| 153 | 1.891 | 1.896 | −1.00 | |
| 154 | 1.896 | 1.900 | −1.00 | |
| 155 | 1.900 | 1.905 | −1.00 | |
| 156 | 1.905 | 1.910 | −1.00 | |
| 157 | 1.910 | 1.915 | −1.00 | |
| 158 | 1.915 | 1.919 | −1.00 | |
| 159 | 1.919 | 1.924 | −1.00 | |
| 160 | 1.924 | 1.928 | −1.00 | |
| 161 | 1.928 | 1.933 | −1.00 | |
| 162 | 1.933 | 1.937 | −1.00 | |
| 163 | 1.937 | 1.942 | −1.00 | |
| 164 | 1.942 | 1.946 | −1.00 | |
| 165 | 1.946 | 1.951 | −1.00 | |
| 166 | 1.951 | 1.955 | −1.00 | |
| 167 | 1.955 | 1.959 | −1.00 | |
| 168 | 1.959 | 1.963 | −1.00 | |
| 169 | 1.963 | 1.968 | −1.00 | |
| 170 | 1.968 | 1.972 | −1.00 | |
| 171 | 1.972 | 1.976 | −1.00 | |
| 172 | 1.976 | 1.980 | −1.00 | |
| 173 | 1.980 | 1.984 | −1.00 | |
| 174 | 1.984 | 1.988 | −1.00 | |
| 175 | 1.988 | 1.992 | −1.00 | |
| 176 | 1.992 | 1.996 | −1.00 | |
| 177 | 1.996 | 2.000 | −1.00 | |
| 178 | 2.000 | 2.004 | −1.00 | |
| 179 | 2.004 | 2.008 | −1.00 | |
| 180 | 2.008 | 2.012 | −1.00 | |
| 181 | 2.012 | 2.016 | −1.00 | |
| 182 | 2.016 | 2.019 | −1.00 | |
| 183 | 2.019 | 2.023 | −1.00 | |
| 184 | 2.023 | 2.027 | −1.00 | |
| 185 | 2.027 | 2.030 | −1.00 | |
| 186 | 2.030 | 2.034 | −1.00 | |
| 187 | 2.034 | 2.038 | −1.00 | |
| 188 | 2.038 | 2.041 | −1.00 | |
| 189 | 2.041 | 2.045 | −1.00 | |
| 190 | 2.045 | 2.049 | −1.00 | |
| 191 | 2.049 | 2.052 | −1.00 | |
| 192 | 2.052 | 2.056 | −1.00 | |
| 193 | 2.056 | 2.059 | −1.00 | |
| 194 | 2.059 | 2.062 | −1.00 | |
| 195 | 2.062 | 2.066 | −1.00 | |
| 196 | 2.066 | 2.069 | −1.00 | |
| 197 | 2.069 | 2.073 | −1.00 | |
| 198 | 2.073 | 2.076 | −1.00 | |
| 199 | 2.076 | 2.079 | −1.00 | |
| 200 | 2.079 | 2.083 | −1.00 | |
| 201 | 2.083 | 2.086 | −1.00 | |
| 202 | 2.086 | 2.089 | −1.00 | |
| 203 | 2.089 | 2.093 | −1.00 | |
| 204 | 2.093 | 2.096 | −1.00 | |
| 205 | 2.096 | 2.099 | −1.00 | |
| 206 | 2.099 | 2.102 | −1.00 | |
| 207 | 2.102 | 2.105 | −1.00 | |
| 208 | 2.105 | 2.108 | −1.00 | |
| 209 | 2.108 | 2.112 | −1.00 | |
| 210 | 2.112 | 2.115 | −1.00 | |
| 211 | 2.115 | 2.118 | −1.00 | |
| 212 | 2.118 | 2.121 | −1.00 | |
| 213 | 2.121 | 2.124 | −1.00 | |

TABLE 32-continued

| Number | hmin | hmax | $\Delta OPD_{13}/\lambda 1$ | $\Delta OPD_{23}/\lambda 1$ |
|---|---|---|---|---|
| 214 | 2.124 | 2.127 | −1.00 | |
| 215 | 2.127 | 2.130 | −1.00 | |
| 216 | 2.130 | 2.133 | −1.00 | |
| 217 | 2.133 | 2.136 | −1.00 | |
| 218 | 2.136 | 2.139 | −1.00 | |
| 219 | 2.139 | 2.142 | −1.00 | |
| 220 | 2.142 | 2.145 | −1.00 | |
| 221 | 2.145 | 2.147 | −1.00 | |
| 222 | 2.147 | 2.150 | −1.00 | |
| 223 | 2.150 | 2.153 | −1.00 | |
| 224 | 2.153 | 2.156 | −1.00 | |
| 225 | 2.156 | 2.159 | −1.00 | |
| 226 | 2.159 | 2.162 | −1.00 | |
| 227 | 2.162 | 2.164 | −1.00 | |
| 228 | 2.164 | 2.167 | −1.00 | |
| 229 | 2.167 | 2.170 | −1.00 | |
| 230 | 2.170 | 2.173 | −1.00 | |
| 231 | 2.173 | 2.175 | −1.00 | |
| 232 | 2.175 | 2.178 | −1.00 | |
| 233 | 2.178 | 2.181 | −1.00 | |
| 234 | 2.181 | 2.184 | −1.00 | |
| 235 | 2.184 | 2.186 | −1.00 | |
| 236 | 2.186 | 2.189 | −1.00 | |
| 237 | 2.189 | 2.191 | −1.00 | |
| 238 | 2.191 | 2.194 | −1.00 | |
| 239 | 2.194 | 2.197 | −1.00 | |
| 240 | 2.197 | 2.199 | −1.00 | |
| 241 | 2.199 | 2.202 | −1.00 | |
| 242 | 2.202 | 2.204 | −1.00 | |
| 243 | 2.204 | 2.207 | −1.00 | |
| 244 | 2.207 | 2.210 | −1.00 | |

As shown in Table 54, the optical information recording/reproducing apparatus 100 on which the objective lens 10 according to the third example is mounted satisfies the conditions (1) to (4), (6) to (19), and (21) to (27). Therefore, the optical information recording/reproducing apparatus 100 according to the third example is able to avoid deterioration of the spot property by the undesired diffraction order of light while suitably correcting the spherical aberration for each of the optical discs D1 to D3, and is able to secure an adequate working distance when the optical disc D3 is used.

FIG. 12A to 12C respectively illustrate the spherical aberrations on the recording surfaces of the optical discs D1 to D3 with respect to the respective NAs. Specifically, FIG. 12A is a graph illustrating the spherical aberration caused on the recording surface of the optical disc D1 with respect to NA1 (=0.85) of the optical disc D1, FIG. 12B is a graph illustrating the spherical aberration caused on the recording surface of the optical disc D2 with respect to NA2 (=0.65) of the optical disc D2, and FIG. 12C is a graph illustrating the spherical aberration caused on the recording surface of the optical disc D3 with respect to NA3 (=0.47) of the optical disc D3.

As shown in FIGS. 12A to 12C, the optical information recording/reproducing apparatus 100 according to the third example is able to suitably correct the spherical aberration not only in the case of the design wavelength but also in the case where the wavelength variation occurs, for all of the optical discs D1 to D3.

FIGS. 13A to 13C respectively illustrate the spherical aberrations on the recording surfaces of the optical disc D1 to D3 with respect to NA1. Specifically, FIG. 13A is a graph illustrating the spherical aberration caused, with respect to NA1, on the recording surface of the optical disc D1, FIG. 13B is a graph illustrating the spherical aberration caused, with respect to NA1, on the recording surface of the optical disc D2, and FIG. 13C is a graph illustrating the spherical aberration caused, with respect to NA1, on the recording surface of the optical disc D3.

As shown in FIGS. 13B and 13C, each of the laser beams having the wavelengths $\lambda 2$ and $\lambda 3$ which have passed through the region R3 is divided principally into the 0-th order diffracted light and the first order diffracted light having the relatively high diffraction efficiencies, and converges at a portion away from the imaging point of the corresponding one of the laser beams having the wavelengths $\lambda 2$ and $\lambda 3$ which have passed through the region R1. As shown in FIG. 13C, the laser beam having the wavelength $\lambda 3$ which has passed the region R2 is divided into three or more types of diffracted light and converges in a portion away from the imaging point of the laser beam having the wavelength $\lambda 3$ which has passed the region R1. Therefore, the undesired diffraction order light becomes hard to appear as flare light, and thereby it becomes possible to avoid deterioration of the spot property on the recording surface of each optical disc.

Fourth Example

FIG. 14 is a block diagram illustrating a general configuration of an optical information recording/reproducing apparatus 200 according to a fourth example. As shown in FIG. 14, the optical information recording/reproducing apparatus 200 includes a light source 1D which emits a laser beam having the wavelength $\lambda 1$, a light source 1E which emits laser beams having the wavelengths $\lambda 2$ and $\lambda 3$, diffraction gratings 2D and 2E, coupling lenses 3D and 3E, a beam splitter 43, and the objective lens 10. In FIG. 14, a chain line represents a reference axis AX of the optical information recording/reproducing apparatus 200. The laser beams having the wavelengths $\lambda 1$, $\lambda 2$ and $\lambda 3$ are represented by a solid line, a dashed line and a dotted line, respectively.

FIG. 15A illustrates a developed optical path for the laser beam having the wavelength $\lambda 1$ in the optical information recording/reproducing apparatus 200, FIG. 15B illustrates a developed optical path for the laser beam having the wavelength $\lambda 2$ in the optical information recording/reproducing apparatus 200, and FIG. 15C illustrates a developed optical path for the laser beam having the wavelength $\lambda 3$ in the optical information recording/reproducing apparatus 200. As shown in FIG. 15A, the laser beam having the wavelength $\lambda 1$ is emitted from the light source 1D, and is converged in the vicinity of the recording surface of the optical disc D1 after passing through the diffraction grating 2D, the coupling lens 3D, the beam splitter 43 and the objective lens 10. As shown in FIGS. 15B and 15C, each of the laser beams having the wavelengths $\lambda 2$ and $\lambda 3$ is converged in the vicinity of the recording surface of the corresponding one of the optical discs D2 and D3 after passing through the diffraction grating 2E, the coupling lens 3E, the beam splitter 43 and the objective lens 10. Each of the laser beams which has formed the beam spot on the recording surface of the corresponding one of the optical discs D1 to D3 returns along the same optical path along which the laser beam proceeds toward the optical disc, and is detected by a photoreceptor via a half mirror (not shown). As described above, the optical information recording/reproducing apparatus 200 according to the fourth example is configured to be compact in size by sharing the optical path for the laser beams having the wavelengths $\lambda 2$ and $\lambda 3$.

In the optical information recording/reproducing apparatus 200, required numerical apertures NA are different between the optical discs D1 to D3. Therefore, the optical information recording/reproducing apparatus 200 may be configured such that an aperture stop (not shown) is arranged to restrict the beam diameter of each of the laser beams having the wavelengths $\lambda 1$, $\lambda 2$ and $\lambda 3$.

Specifications of the objective lens 10 according to the fourth example including use wavelength, the focal length, NA and the magnification M are shown in Table 33.

TABLE 33

|  | $1^{st}$ Laser Beam | $2^{nd}$ Laser Beam | $3^{rd}$ Laser Beam |
|---|---|---|---|
| Wavelength (nm) | 405 | 660 | 790 |
| Focal Length (mm) | 2.20 | 2.34 | 2.40 |
| NA | 0.85 | 0.60 | 0.47 |
| Magnification M | 0.000 | 0.000 | −0.001 |

As shown by the magnification M in Table 33, in the optical information recording/reproducing apparatus 200, each of the $1^{st}$ to $3^{rd}$ laser beams is incident on the corresponding one of the optical discs D1 to D3 as a collimated beam or as a low degree of diverging beam. Therefore, the off-axis aberration can be suppressed to a small level even when the objective lens 10 is shifted by the tracking operation. Table 34 shows a specific numerical configuration of the optical information recording/reproducing apparatus 100 according to the fourth example defined when the optical disc D1 is used, Table 35 shows a specific numerical configuration of the optical information recording/reproducing apparatus 100 according to the fourth example defined when the optical disc D2 is used, and Table 14 shows a specific numerical configuration of the optical information recording/reproducing apparatus 100 according to the fourth example defined when the optical disc D3 is used.

TABLE 34

| Surface No. | r | d | n(405 nm) | |
|---|---|---|---|---|
| 0 | ∞ | 1.98 | | Light Source 1D |
| 1 | ∞ | 2.00 | 1.52972 | Diffraction Grating 2D |
| 2 | ∞ | 18.00 | | |
| 3 | 113.760 | 1.20 | 1.52469 | Coupling Lens 3D |
| 4 | −12.800 | 1.00 | | |
| 5 | ∞ | 4.00 | 1.52972 | Beam Splitter 43 |
| 6 | ∞ | 3.00 | | |
| 7($1^{st}$ region) | 1.363 | 2.60 | 1.56023 | Objective Lens 10 |
| 7($2^{nd}$ region) | 1.363 | | | |
| 7($3^{rd}$ region) | 1.324 | | | |
| 8 | −2.724 | 0.76 | | |
| 9 | ∞ | 0.0875 | 1.62231 | Optical Disc D1 |
| 10 | ∞ | — | | |

TABLE 35

| Surface No. | r | d | n(660 nm) | |
|---|---|---|---|---|
| 0 | ∞ | 1.97 | | Light Source 1E |
| 1 | ∞ | 2.00 | 1.51374 | Diffraction Grating 2E |
| 2 | ∞ | 13.50 | | |
| 3 | 100.160 | 1.20 | 1.54044 | Coupling Lens 3E |
| 4 | −10.400 | 1.00 | | |
| 5 | ∞ | 4.00 | 1.51374 | Beam Splitter 43 |
| 6 | ∞ | 0.16 | | |
| 7($1^{st}$ region) | 1.363 | 2.60 | 1.54044 | Objective Lens 10 |
| 7($2^{nd}$ region) | 1.363 | | | |
| 7($3^{rd}$ region) | 1.324 | | | |
| 8 | −2.724 | 0.60 | | |
| 9 | ∞ | 0.60 | 1.57961 | Optical Disc D2 |
| 10 | ∞ | — | | |

TABLE 36

| Surface No. | r | d | n(790 nm) | |
|---|---|---|---|---|
| 0 | ∞ | 1.97 | | Light Source 1E |
| 1 | ∞ | 2.00 | 1.51052 | Diffraction Grating 2E |
| 2 | ∞ | 13.50 | | |
| 3 | 100.160 | 1.20 | 1.53653 | Coupling Lens 3E |
| 4 | −10.400 | 1.00 | | |
| 5 | ∞ | 4.00 | 1.51052 | Beam Splitter 43 |
| 6 | ∞ | 0.46 | | |
| 7($1^{st}$ region) | 1.363 | 2.60 | 1.53653 | Objective Lens 10 |
| 7($2^{nd}$ region) | 1.363 | | | |
| 7($3^{rd}$ region) | 1.324 | | | |
| 8 | −2.724 | 0.30 | | |
| 9 | ∞ | 1.20 | 1.57307 | Optical Disc D3 |
| 10 | ∞ | — | | |

Each of the second surface (surface #4) of the coupling lens, the first surface 10a and the second surface 10b of the objective lens 10 is an aspherical surface. The following Tables 37 and 38 show the conical coefficients and aspherical coefficients of each aspherical surface. Specifically, Table 37 shows the conical coefficients and aspherical coefficients for BD, and Table 38 shows the conical coefficients and aspherical coefficients for DVD/CD. It should be noted that the conical coefficients and aspherical coefficients of the first and second surfaces 10a and 10b of the objective lens 10 shown in Table 25 are common to BD (Table 37), DVD and CD (Table 38).

TABLE 37

| | κ | A4 | A6 |
|---|---|---|---|
| 4 | 0.0000 | 4.3560E−05 | 1.9750E−07 |
| 7($1^{st}$ region) | −0.7500 | 2.1110E−03 | 3.3710E−03 |
| 7($2^{nd}$ region) | −0.7500 | 1.8170E−03 | 3.1370E−03 |
| 7($3^{rd}$ region) | −0.7500 | −1.4480E−02 | 3.6410E−03 |
| 8 | 0.0000 | 2.5830E−01 | −3.1380E−01 |

| | A8 | A10 | A12 |
|---|---|---|---|
| 4 | 7.7370E−10 | 0.0000E+00 | 0.0000E+00 |
| 7($1^{st}$ region) | −1.1880E−03 | 4.6840E−04 | −8.9160E−05 |
| 7($2^{nd}$ region) | −2.2470E−03 | 7.4110E−04 | −1.4654E−04 |
| 7($3^{rd}$ region) | 1.0500E−03 | −1.7360E−04 | −2.9580E−05 |
| 8 | 4.7530E−01 | −6.0750E−01 | 5.0080E−01 |

| | A14 | A16 | A18 |
|---|---|---|---|
| 4 | 0.0000E+00 | 0.0000E+00 | 0.0000E+00 |
| 7($1^{st}$ region) | 0.0000E+00 | 0.0000E+00 | 0.0000E+00 |
| 7($2^{nd}$ region) | 0.0000E+00 | 0.0000E+00 | 0.0000E+00 |
| 7($3^{rd}$ region) | 0.0000E+00 | 0.0000E+00 | 0.0000E+00 |
| 8 | −2.2980E−01 | 3.6660E−02 | 1.3500E−02 |

| | A20 | A22 | A24 |
|---|---|---|---|
| 4 | 0.0000E+00 | 0.0000E+00 | 0.0000E+00 |
| 7($1^{st}$ region) | 0.0000E+00 | 0.0000E+00 | 0.0000E+00 |
| 7($2^{nd}$ region) | 0.0000E+00 | 0.0000E+00 | 0.0000E+00 |
| 7($3^{rd}$ region) | 0.0000E+00 | 0.0000E+00 | 0.0000E+00 |
| 8 | −6.9273E−03 | 8.8413E−04 | 0.0000E+00 |

TABLE 38

| | κ | A4 | A6 |
|---|---|---|---|
| 4 | 0.0000 | 7.9810E−05 | 5.5360E−07 |

| | A8 | A10 | A12 |
|---|---|---|---|
| 4 | 3.4000E−09 | 0.0000E+00 | 0.0000E+00 |

TABLE 38-continued

|   | A14 | A16 | A18 |
|---|---|---|---|
| 4 | 0.0000E+00 | 0.0000E+00 | 0.0000E+00 |
|   | A20 | A22 | A24 |
| 4 | 0.0000E+00 | 0.0000E+00 | 0.0000E+00 |

The range of each of the regions R1 to R3 of the first surface 10a of the objective lens 10 according to the fourth example is defined by height h (i.e., an effective radius) as indicated below. Each region has the same function as that of the corresponding region in the first example.

Region R1: $0.000 \leq h \leq 1.130$
Region R2: $1.130 < h \leq 1.405$
Region R3, $1.405 < h \leq 1.870$ The first surface 10a of the objective lens 10 has the annular zone structure. Table 39 shows the coefficients of the optical path difference function which defines the annular zone structure in each region on the first surface 10a. Table 40 shows the BD use diffraction order, DVD use diffraction order and CD use diffraction order.

TABLE 39

|   | P2 | P4 | P6 |
|---|---|---|---|
| 1(1st region) (1) | 4.0000E+01 | −3.2440E+00 | −4.2590E−01 |
| 1(1st region) (2) | 0.0000E+00 | −3.2930E+00 | 1.4250E+00 |
| 1(2nd region) (1) | 4.0000E+01 | −1.5670E+00 | −1.0950E+00 |
| 1(2nd region) (2) | 0.0000E+00 | −1.6440E+00 | 4.0900E−01 |
| 1(3rd region) | 5.4947E+01 | −3.6450E+01 | 1.1150E+01 |
|   | P8 | P10 | P12 |
| 1(1st region) (1) | −1.2750E−01 | 0.0000E+00 | 0.0000E+00 |
| 1(1st region) (2) | −5.7620E−01 | 0.0000E+00 | 0.0000E+00 |
| 1(2nd region) (1) | 1.0830E−01 | 0.0000E+00 | 0.0000E+00 |
| 1(2nd region) (2) | −3.3650E−01 | 0.0000E+00 | 0.0000E+00 |
| 1(3rd region) | −2.0630E+00 | 0.0000E+00 | 0.0000E+00 |

TABLE 40

|   | 1st Laser Beam | 2nd Laser Beam | 3rd Laser Beam | Hmax |
|---|---|---|---|---|
| 1(1st region) (1) | 1 | 1 | 1 | 1.130 |
| 1(1st region) (2) | 2 | 1 | 1 |   |
| 1(2nd region) (1) | 1 | 1 | 1 | 1.405 |
| 1(2nd region) (2) | 5 | 3 | — |   |
| 1(3rd region) | 1 | — | — | 1.870 |

The following Tables 41 to 43 respectively represent the concrete configurations of the annular zone structure formed in the regions R1 to R3.

TABLE 41

| Number | hmin | hmax | $\Delta OPD_{11}/\lambda 1$ | $\Delta OPD_{21}/\lambda 1$ |
|---|---|---|---|---|
| 0 | 0.000 | 0.112 |   |   |
| 1 | 0.112 | 0.194 | 1.26 |   |
| 2 | 0.194 | 0.251 | 1.26 |   |
| 3 | 0.251 | 0.297 | 1.26 |   |
| 4 | 0.297 | 0.337 | 1.26 |   |
| 5 | 0.337 | 0.373 | 1.26 |   |
| 6 | 0.373 | 0.406 | 1.26 |   |
| 7 | 0.406 | 0.436 | 1.26 |   |
| 8 | 0.436 | 0.465 | 1.26 |   |
| 9 | 0.465 | 0.492 | 1.26 |   |
| 10 | 0.492 | 0.518 | 1.26 |   |
| 11 | 0.518 | 0.543 | 1.26 |   |
| 12 | 0.543 | 0.567 | 1.26 |   |
| 13 | 0.567 | 0.590 | 1.26 |   |
| 14 | 0.590 | 0.612 | 1.26 |   |
| 15 | 0.612 | 0.634 | 1.26 |   |
| 16 | 0.634 | 0.650 | 1.26 |   |
| 17 | 0.650 | 0.654 |   | −2.00 |
| 18 | 0.654 | 0.675 | 1.26 |   |
| 19 | 0.675 | 0.695 | 1.26 |   |
| 20 | 0.695 | 0.714 | 1.26 |   |
| 21 | 0.714 | 0.733 | 1.26 |   |
| 22 | 0.733 | 0.752 | 1.26 |   |
| 23 | 0.752 | 0.771 | 1.26 |   |
| 24 | 0.771 | 0.789 | 1.26 |   |
| 25 | 0.789 | 0.806 | 1.26 |   |
| 26 | 0.806 | 0.824 | 1.26 |   |
| 27 | 0.824 | 0.841 | 1.26 |   |
| 28 | 0.841 | 0.858 | 1.26 |   |
| 29 | 0.858 | 0.875 | 1.26 |   |
| 30 | 0.875 | 0.877 | 1.26 |   |
| 31 | 0.877 | 0.892 |   | −2.00 |
| 32 | 0.892 | 0.908 | 1.26 |   |
| 33 | 0.908 | 0.925 | 1.26 |   |
| 34 | 0.925 | 0.941 | 1.26 |   |
| 35 | 0.941 | 0.957 | 1.26 |   |
| 36 | 0.957 | 0.973 | 1.26 |   |
| 37 | 0.973 | 0.989 | 1.26 |   |
| 38 | 0.989 | 1.005 | 1.26 |   |
| 39 | 1.005 | 1.006 | 1.26 |   |
| 40 | 1.006 | 1.020 |   | −2.00 |
| 41 | 1.020 | 1.036 | 1.26 |   |
| 42 | 1.036 | 1.052 | 1.26 |   |
| 43 | 1.052 | 1.067 | 1.26 |   |
| 44 | 1.067 | 1.083 | 1.26 |   |
| 45 | 1.083 | 1.097 | 1.26 |   |
| 46 | 1.097 | 1.098 |   | −2.00 |
| 47 | 1.098 | 1.114 | 1.26 |   |
| 48 | 1.114 | 1.130 | 1.26 |   |

TABLE 42

| Number | hmin | hmax | $\Delta OPD_{12}/\lambda 1$ | $\Delta OPD_{22}/\lambda 1$ | $\Delta OPD_{32}/\lambda 1$ |
|---|---|---|---|---|---|
| 49 | 1.130 | 1.144 |   |   | −3.78 |
| 50 | 1.144 | 1.158 | 1.12 |   |   |
| 51 | 1.158 | 1.172 | 1.12 |   |   |
| 52 | 1.172 | 1.185 | 1.12 |   |   |
| 53 | 1.185 | 1.191 | 1.12 |   |   |
| 54 | 1.191 | 1.199 |   | −4.86 |   |
| 55 | 1.199 | 1.213 | 1.12 |   |   |
| 56 | 1.213 | 1.227 | 1.12 |   |   |
| 57 | 1.227 | 1.241 | 1.12 |   |   |
| 58 | 1.241 | 1.252 | 1.12 |   |   |
| 59 | 1.252 | 1.255 |   | −4.86 |   |
| 60 | 1.255 | 1.269 | 1.12 |   |   |
| 61 | 1.269 | 1.283 | 1.12 |   |   |
| 62 | 1.283 | 1.297 | 1.12 |   |   |
| 63 | 1.297 | 1.302 | 1.12 |   |   |
| 64 | 1.302 | 1.311 |   | −4.86 |   |
| 65 | 1.311 | 1.325 | 1.12 |   |   |
| 66 | 1.325 | 1.339 | 1.12 |   |   |
| 67 | 1.339 | 1.343 | 1.12 |   |   |
| 68 | 1.343 | 1.353 |   | −4.86 |   |
| 69 | 1.353 | 1.368 | 1.12 |   |   |
| 70 | 1.368 | 1.378 | 1.12 |   |   |
| 71 | 1.378 | 1.382 |   | −4.86 |   |
| 72 | 1.382 | 1.397 | 1.12 |   |   |
| 73 | 1.397 | 1.405 | 1.12 |   |   |

TABLE 43

| Number | hmin | hmax | $\Delta OPD_{13}/\lambda 1$ | $\Delta OPD_{23}/\lambda 1$ |
|---|---|---|---|---|
| 74 | 1.405 | 1.411 |  | −3.35 |
| 75 | 1.411 | 1.426 | −1.00 |  |
| 76 | 1.426 | 1.440 | −1.00 |  |
| 77 | 1.440 | 1.453 | −1.00 |  |
| 78 | 1.453 | 1.465 | −1.00 |  |
| 79 | 1.465 | 1.476 | −1.00 |  |
| 80 | 1.476 | 1.487 | −1.00 |  |
| 81 | 1.487 | 1.497 | −1.00 |  |
| 82 | 1.497 | 1.507 | −1.00 |  |
| 83 | 1.507 | 1.516 | −1.00 |  |
| 84 | 1.516 | 1.525 | −1.00 |  |
| 85 | 1.525 | 1.534 | −1.00 |  |
| 86 | 1.534 | 1.542 | −1.00 |  |
| 87 | 1.542 | 1.550 | −1.00 |  |
| 88 | 1.550 | 1.558 | −1.00 |  |
| 89 | 1.558 | 1.565 | −1.00 |  |
| 90 | 1.565 | 1.572 | −1.00 |  |
| 91 | 1.572 | 1.579 | −1.00 |  |
| 92 | 1.579 | 1.586 | −1.00 |  |
| 93 | 1.586 | 1.592 | −1.00 |  |
| 94 | 1.592 | 1.598 | −1.00 |  |
| 95 | 1.598 | 1.605 | −1.00 |  |
| 96 | 1.605 | 1.610 | −1.00 |  |
| 97 | 1.610 | 1.616 | −1.00 |  |
| 98 | 1.616 | 1.622 | −1.00 |  |
| 99 | 1.622 | 1.627 | −1.00 |  |
| 100 | 1.627 | 1.633 | −1.00 |  |
| 101 | 1.633 | 1.638 | −1.00 |  |
| 102 | 1.638 | 1.643 | −1.00 |  |
| 103 | 1.643 | 1.648 | −1.00 |  |
| 104 | 1.648 | 1.653 | −1.00 |  |
| 105 | 1.653 | 1.658 | −1.00 |  |
| 106 | 1.658 | 1.662 | −1.00 |  |
| 107 | 1.662 | 1.667 | −1.00 |  |
| 108 | 1.667 | 1.671 | −1.00 |  |
| 109 | 1.671 | 1.676 | −1.00 |  |
| 110 | 1.676 | 1.680 | −1.00 |  |
| 111 | 1.680 | 1.684 | −1.00 |  |
| 112 | 1.684 | 1.688 | −1.00 |  |
| 113 | 1.688 | 1.692 | −1.00 |  |
| 114 | 1.692 | 1.696 | −1.00 |  |
| 115 | 1.696 | 1.700 | −1.00 |  |
| 116 | 1.700 | 1.704 | −1.00 |  |
| 117 | 1.704 | 1.708 | −1.00 |  |
| 118 | 1.708 | 1.712 | −1.00 |  |
| 119 | 1.712 | 1.715 | −1.00 |  |
| 120 | 1.715 | 1.719 | −1.00 |  |
| 121 | 1.719 | 1.723 | −1.00 |  |
| 122 | 1.723 | 1.726 | −1.00 |  |
| 123 | 1.726 | 1.729 | −1.00 |  |
| 124 | 1.729 | 1.733 | −1.00 |  |
| 125 | 1.733 | 1.736 | −1.00 |  |
| 126 | 1.736 | 1.739 | −1.00 |  |
| 127 | 1.739 | 1.743 | −1.00 |  |
| 128 | 1.743 | 1.746 | −1.00 |  |
| 129 | 1.746 | 1.749 | −1.00 |  |
| 130 | 1.749 | 1.752 | −1.00 |  |
| 131 | 1.752 | 1.755 | −1.00 |  |
| 132 | 1.755 | 1.758 | −1.00 |  |
| 133 | 1.758 | 1.761 | −1.00 |  |
| 134 | 1.761 | 1.764 | −1.00 |  |
| 135 | 1.764 | 1.767 | −1.00 |  |
| 136 | 1.767 | 1.770 | −1.00 |  |
| 137 | 1.770 | 1.773 | −1.00 |  |
| 138 | 1.773 | 1.776 | −1.00 |  |
| 139 | 1.776 | 1.778 | −1.00 |  |
| 140 | 1.778 | 1.781 | −1.00 |  |
| 141 | 1.781 | 1.784 | −1.00 |  |
| 142 | 1.784 | 1.787 | −1.00 |  |
| 143 | 1.787 | 1.789 | −1.00 |  |
| 144 | 1.789 | 1.792 | −1.00 |  |
| 145 | 1.792 | 1.794 | −1.00 |  |
| 146 | 1.794 | 1.797 | −1.00 |  |
| 147 | 1.797 | 1.799 | −1.00 |  |
| 148 | 1.799 | 1.802 | −1.00 |  |
| 149 | 1.802 | 1.804 | −1.00 |  |
| 150 | 1.804 | 1.807 | −1.00 |  |
| 151 | 1.807 | 1.809 | −1.00 |  |
| 152 | 1.809 | 1.812 | −1.00 |  |
| 153 | 1.812 | 1.814 | −1.00 |  |
| 154 | 1.814 | 1.816 | −1.00 |  |
| 155 | 1.816 | 1.819 | −1.00 |  |
| 156 | 1.819 | 1.821 | −1.00 |  |
| 157 | 1.821 | 1.823 | −1.00 |  |
| 158 | 1.823 | 1.826 | −1.00 |  |
| 159 | 1.826 | 1.828 | −1.00 |  |
| 160 | 1.828 | 1.830 | −1.00 |  |
| 161 | 1.830 | 1.832 | −1.00 |  |
| 162 | 1.832 | 1.834 | −1.00 |  |
| 163 | 1.834 | 1.837 | −1.00 |  |
| 164 | 1.837 | 1.839 | −1.00 |  |
| 165 | 1.839 | 1.841 | −1.00 |  |
| 166 | 1.841 | 1.843 | −1.00 |  |
| 167 | 1.843 | 1.845 | −1.00 |  |
| 168 | 1.845 | 1.847 | −1.00 |  |
| 169 | 1.847 | 1.849 | −1.00 |  |
| 170 | 1.849 | 1.851 | −1.00 |  |
| 171 | 1.851 | 1.853 | −1.00 |  |
| 172 | 1.853 | 1.855 | −1.00 |  |
| 173 | 1.855 | 1.857 | −1.00 |  |
| 174 | 1.857 | 1.859 | −1.00 |  |
| 175 | 1.859 | 1.861 | −1.00 |  |
| 176 | 1.861 | 1.863 | −1.00 |  |
| 177 | 1.863 | 1.865 | −1.00 |  |
| 178 | 1.865 | 1.867 | −1.00 |  |
| 179 | 1.867 | 1.869 | −1.00 |  |
| 180 | 1.869 | 1.870 | −1.00 |  |

As shown in Table 54, the optical information recording/reproducing apparatus 200 on which the objective lens 10 according to the fourth example is mounted satisfies the conditions (1) to (17) and (19) to (27). Therefore, the optical information recording/reproducing apparatus 200 according to the fourth example is able to avoid deterioration of the spot property by the undesired diffraction order of light while suitably correcting the spherical aberration for each of the optical discs D1 to D3, and is able to secure an adequate working distance when the optical disc D3 is used.

FIG. 16A to 16C respectively illustrate the spherical aberrations on the recording surfaces of the optical discs D1 to D3 with respect to the respective NAs. Specifically, FIG. 16A is a graph illustrating the spherical aberration caused on the recording surface of the optical disc D1 with respect to NA1 (=0.85) of the optical disc D1, FIG. 16B is a graph illustrating the spherical aberration caused on the recording surface of the optical disc D2 with respect to NA2 (=0.65) of the optical disc D2, and FIG. 16C is a graph illustrating the spherical aberration caused on the recording surface of the optical disc D3 with respect to NA3 (=0.47) of the optical disc D3.

As shown in FIGS. 16A to 16C, the optical information recording/reproducing apparatus 200 according to the fourth example is able to suitably correct the spherical aberration not only in the case of the design wavelength but also in the case where the wavelength variation occurs, for all of the optical discs D1 to D3.

FIGS. 17A to 17C respectively illustrate the spherical aberrations on the recording surfaces of the optical disc D1 to D3 with respect to NA1. Specifically, FIG. 17A is a graph illustrating the spherical aberration caused, with respect to NA1, on the recording surface of the optical disc D1, FIG. 17B is a graph illustrating the spherical aberration caused, with respect to NA1, on the recording surface of the optical disc D2, and FIG. 17C is a graph illustrating the spherical aberration caused, with respect to NA1, on the recording surface of the optical disc D3.

As shown in FIGS. 17B and 17C, each of the laser beams having the wavelengths λ2 and λ3 which have passed through the region R3 is divided principally into the 0-th order diffracted light and the first order diffracted light having the relatively high diffraction efficiencies, and converges at a portion away from the imaging point of the corresponding one of the laser beams having the wavelengths λ2 and λ3 which have passed through the region R1. As shown in FIG. 17C, the laser beam having the wavelength λ3 which has passed the region R2 is divided into three or more types of diffracted light and converges in a portion away from the imaging point of the laser beam having the wavelength λ3 which has passed the region R1. Therefore, the undesired diffraction order light becomes hard to appear as flare light, and thereby it becomes possible to avoid deterioration of the spot property on the recording surface of each optical disc.

Fifth Example

FIG. 18 is a block diagram illustrating a general configuration of an optical information recording/reproducing apparatus 300 according to a fifth example. As shown in FIG. 18, the optical information recording/reproducing apparatus 300 includes a light source 1F which emits each of laser beams having the wavelengths λ1, λ2 and λ3, a diffraction grating 2F, a coupling lens 3F and the objective lens 10. In FIG. 18, a chain line represents a reference axis AX of the optical information recording/reproducing apparatus 300. The laser beams having the wavelengths λ1, λ2 and λ3 are represented by a solid line, a dashed line and a dotted line, respectively.

FIG. 19A illustrates a developed optical path for the laser beam having the wavelength λ1 in the optical information recording/reproducing apparatus 300, FIG. 19B illustrates a developed optical path for the laser beam having the wavelength λ2 in the optical information recording/reproducing apparatus 300, and FIG. 19C illustrates a developed optical path for the laser beam having the wavelength λ3 in the optical information recording/reproducing apparatus 300. As shown in FIGS. 19A, 19B and 19C, each of the laser beams emitted by the light source 1F converges in the vicinity of the recording surface of the corresponding one of the optical discs D1 to D3 after passing through the diffraction grating 2F, the coupling lens 3F and the objective lens 10. Each of the laser beams which has formed the beam spot on the recording surface of the corresponding one of the optical discs D1 to D3 returns along the same optical path along which the laser beam proceeds toward the optical disc, and is detected by a photoreceptor via a half mirror (not shown). As described above, the optical information recording/reproducing apparatus 300 according to the fifth example is configured to be compact in size by sharing the optical path of all the laser beams having the wavelengths λ1, λ2 and λ3.

In the optical information recording/reproducing apparatus 300, required numerical apertures NA are different between the optical discs D1 to D3. Therefore, the optical information recording/reproducing apparatus 300 may be configured such that an aperture stop (not shown) is arranged to restrict the beam diameter of each of the laser beams having the wavelengths λ1, λ2 and λ3.

Specifications of the objective lens 10 according to the fifth example including use wavelength, the focal length, NA and the magnification M are shown in Table 44.

TABLE 44

|  | $1^{st}$ Laser Beam | $2^{nd}$ Laser Beam | $3^{rd}$ Laser Beam |
| --- | --- | --- | --- |
| Wavelength (nm) | 405 | 660 | 790 |
| Focal Length (mm) | 2.20 | 2.48 | 2.54 |

TABLE 44-continued

|  | $1^{st}$ Laser Beam | $2^{nd}$ Laser Beam | $3^{rd}$ Laser Beam |
| --- | --- | --- | --- |
| NA | 0.85 | 0.60 | 0.47 |
| Magnification M | 0.000 | −0.004 | −0.005 |

As shown by the magnification M in Table 44, in the optical information recording/reproducing apparatus 200, each of the $1^{st}$ to $3^{rd}$ laser beams is incident on the corresponding one of the optical discs D1 to D3 as a collimated beam or as a low degree of diverging beam. Therefore, the off-axis aberration can be suppressed to a small level even when the objective lens 10 is shifted by the tracking operation. Table 45 shows a specific numerical configuration of the optical information recording/reproducing apparatus 300 according to the fifth example defined when the optical disc D1 is used, Table 46 shows a specific numerical configuration of the optical information recording/reproducing apparatus 300 according to the fifth example defined when the optical disc D2 is used, and Table 47 shows a specific numerical configuration of the optical information recording/reproducing apparatus 300 according to the fifth example defined when the optical disc D3 is used.

TABLE 45

| Surface No. | r | d | n(405 nm) |  |
| --- | --- | --- | --- | --- |
| 0 | ∞ | 2.08 |  | Light Source 1F |
| 1 | ∞ | 2.00 | 1.52972 | Diffraction Grating 2F |
| 2 | ∞ | 17.90 |  |  |
| 3 | 113.760 | 1.20 | 1.52469 | Coupling Lens 3F |
| 4 | −12.800 | 10.00 |  |  |
| 5($1^{st}$ region) | 1.494 | 2.50 | 1.62309 | Objective Lens 10 |
| 5($2^{nd}$ region) | 1.340 |  |  |  |
| 5($3^{rd}$ region) | 1.425 |  |  |  |
| 6 | −5.937 | 0.73 |  |  |
| 7 | ∞ | 0.0875 | 1.62231 | Optical Disc D1 |
| 8 | ∞ | — |  |  |

TABLE 46

| Surface No. | r | d | n(660 nm) |  |
| --- | --- | --- | --- | --- |
| 0 | ∞ | 2.08 |  | Light Source 1F |
| 1 | ∞ | 2.00 | 1.51374 | Diffraction Grating 2F |
| 2 | ∞ | 17.90 |  |  |
| 3 | 113.760 | 1.20 | 1.50635 | Coupling Lens 3F |
| 4 | −12.800 | 10.03 |  |  |
| 5($1^{st}$ region) | 1.494 | 2.50 | 1.58760 | Objective Lens 10 |
| 5($2^{nd}$ region) | 1.340 |  |  |  |
| 5($3^{rd}$ region) | 1.425 |  |  |  |
| 6 | −5.937 | 0.70 |  |  |
| 7 | ∞ | 0.60 | 1.57961 | Optical Disc D2 |
| 8 | ∞ | — |  |  |

TABLE 47

| Surface No. | r | d | n(790 nm) |  |
| --- | --- | --- | --- | --- |
| 0 | ∞ | 2.08 |  | Light Source 1F |
| 1 | ∞ | 2.00 | 1.51052 | Diffraction Grating 2F |
| 2 | ∞ | 17.90 |  |  |
| 3 | 113.760 | 1.20 | 1.50313 | Coupling Lens 3F |
| 4 | −12.800 | 10.35 |  |  |

TABLE 47-continued

| Surface No. | r | d | n(790 nm) | |
|---|---|---|---|---|
| 7(1$^{st}$ region) | 1.494 | 2.50 | 1.58169 | Objective |
| 7(2$^{nd}$ region) | 1.340 | | | Lens 10 |
| 7(3$^{rd}$ region) | 1.425 | | | |
| 8 | −5.937 | 0.38 | | |
| 9 | ∞ | 1.20 | 1.57307 | Optical |
| 10 | ∞ | — | | Disc D3 |

Each of the second surface (surface #4) of the coupling lens the first surface 10a and the second surface 10b of the objective lens 10 is an aspherical surface. The following Table 48 shows the conical coefficients and aspherical coefficients of each aspherical surface.

TABLE 48

| | κ | A4 | A6 |
|---|---|---|---|
| 4 | 0.0000 | 4.3560E−05 | 1.9760E−07 |
| 5(1$^{st}$ region) | −0.7500 | 6.7460E−03 | 1.8460E−03 |
| 5(2$^{nd}$ region) | −0.7500 | −4.0720E−02 | 1.5030E−02 |
| 5(3$^{rd}$ region) | −0.7500 | −1.5180E−02 | 5.5900E−03 |
| 6 | 0.0000 | 1.9860E−01 | −3.0590E−01 |

| | A8 | A10 | A12 |
|---|---|---|---|
| 4 | 7.6780E−10 | 0.0000E+00 | 0.0000E+00 |
| 5(1$^{st}$ region) | −2.4320E−04 | 2.3400E−04 | −2.6020E−05 |
| 5(2$^{nd}$ region) | −2.4040E−03 | 6.1580E−04 | −8.3834E−05 |
| 5(3$^{rd}$ region) | −1.1410E−04 | 1.4198E−04 | −1.4331E−05 |
| 6 | 4.8300E−01 | −6.0782E−01 | 4.9910E−01 |

| | A14 | A16 | A18 |
|---|---|---|---|
| 4 | 0.0000E+00 | 0.0000E+00 | 0.0000E+00 |
| 5(1st region) | 0.0000E+00 | 0.0000E+00 | 0.0000E+00 |
| 5(2$^{nd}$ region) | 0.0000E+00 | 0.0000E+00 | 0.0000E+00 |
| 5(3$^{rd}$ region) | 0.0000E+00 | 0.0000E+00 | 0.0000E+00 |
| 6 | −2.3050E−01 | 3.6580E−02 | 1.3920E−02 |

| | A20 | A22 | A24 |
|---|---|---|---|
| 4 | 0.0000E+00 | 0.0000E+00 | 0.0000E+00 |
| 5(1st region) | 0.0000E+00 | 0.0000E+00 | 0.0000E+00 |
| 5(2$^{nd}$ region) | 0.0000E+00 | 0.0000E+00 | 0.0000E+00 |
| 5(3$^{rd}$ region) | 0.0000E+00 | 0.0000E+00 | 0.0000E+00 |
| 6 | −6.8203E−03 | 7.8849E−04 | 0.0000E+00 |

The range of each of the regions R1 to R3 of the first surface 10a of the objective lens 10 according to the fifth example is defined by height h (i.e., an effective radius) as indicated below. Each region has the same function as that of the corresponding region in the first example.

Region R1: 0.000≦h≦1.200
Region R2: 1.200<h≦1.495
Region R3, 1.495<h≦1.870

The first surface 10a of the objective lens 10 has the annular zone structure. Table 49 shows the coefficients of the optical path difference function which defines the annular zone structure in each region on the first surface 10a. Table 50 shows the BD use diffraction order, DVD use diffraction order and CD use diffraction order.

TABLE 49

| | P2 | P4 | P6 |
|---|---|---|---|
| 1(1$^{st}$ region) (1) | 4.9905E+01 | −2.9200E+00 | 6.4970E−01 |
| 1(1$^{st}$ region) (2) | −2.4918E+01 | −2.3600E+00 | −3.7200E−01 |
| 1(2$^{nd}$ region) (1) | 5.9230E+01 | 3.3340E+00 | −1.8310E+00 |
| 1(2$^{nd}$ region) (2) | 0.0000E+00 | −1.6500E+01 | 5.1210E+00 |

TABLE 49-continued

| 1(3$^{rd}$ region) | 2.5000E+01 | −4.2090E+01 | 9.5320E+00 |
|---|---|---|---|
| | P8 | P10 | P12 |
| 1(1$^{st}$ region) (1) | −1.7040E−01 | 0.0000E+00 | 0.0000E+00 |
| 1(1$^{st}$ region) (2) | −3.7000E−03 | 0.0000E+00 | 0.0000E+00 |
| 1(2$^{nd}$ region) (1) | 3.0280E−01 | 0.0000E+00 | 0.0000E+00 |
| 1(2$^{nd}$ region) (2) | −6.1480E−01 | 0.0000E+00 | 0.0000E+00 |
| 1(3$^{rd}$ region) | −8.8070E−01 | 0.0000E+00 | 0.0000E+00 |

TABLE 50

| | 1$^{st}$ Laser Beam | 2$^{nd}$ Laser Beam | 3$^{rd}$ Laser Beam | hmax |
|---|---|---|---|---|
| 1(1$^{st}$ region) (1) | 1 | 1 | 1 | 1.200 |
| 1(1$^{st}$ region) (2) | 2 | 1 | 1 | |
| 1(2$^{nd}$ region) (1) | 1 | 1 | 1 | 1.495 |
| 1(2$^{nd}$ region) (2) | 5 | 3 | — | |
| 1(3$^{rd}$ region) | 1 | — | — | 1.870 |

The following Tables 51 to 53 respectively represent the concrete configurations of the annular zone structure formed in the regions R1 to R3.

TABLE 51

| Number | hmin | hmax | ΔOPD$_{11}$/λ1 | ΔOPD$_{21}$/λ1 | ΔOPD$_{31}$/λ1 |
|---|---|---|---|---|---|
| 0 | 0.000 | 0.100 | | | |
| 1 | 0.100 | 0.142 | 1.28 | | |
| 2 | 0.142 | 0.174 | | −2.00 | |
| 3 | 0.174 | 0.224 | 1.28 | | |
| 4 | 0.224 | 0.245 | 1.28 | | |
| 5 | 0.245 | 0.265 | | −2.00 | |
| 6 | 0.265 | 0.301 | 1.28 | | |
| 7 | 0.301 | 0.315 | 1.28 | | |
| 8 | 0.315 | 0.333 | | −2.00 | |
| 9 | 0.333 | 0.362 | 1.28 | | |
| 10 | 0.362 | 0.372 | 1.28 | | |
| 11 | 0.372 | 0.389 | | −2.00 | |
| 12 | 0.389 | 0.415 | 1.28 | | |
| 13 | 0.415 | 0.421 | 1.28 | | |
| 14 | 0.421 | 0.439 | | −2.00 | |
| 15 | 0.439 | 0.461 | 1.28 | | |
| 16 | 0.461 | 0.465 | 1.28 | | |
| 17 | 0.465 | 0.483 | | −2.00 | |
| 18 | 0.483 | 0.504 | 1.28 | | |
| 19 | 0.504 | 0.524 | | | −0.72 |
| 20 | 0.524 | 0.541 | 1.28 | | |
| 21 | 0.541 | 0.543 | | −2.00 | |
| 22 | 0.543 | 0.562 | 1.28 | | |
| 23 | 0.562 | 0.575 | 1.28 | | |
| 24 | 0.575 | 0.580 | | −2.00 | |
| 25 | 0.580 | 0.598 | 1.28 | | |
| 26 | 0.598 | 0.606 | 1.28 | | |
| 27 | 0.606 | 0.615 | | −2.00 | |
| 28 | 0.615 | 0.632 | 1.28 | | |
| 29 | 0.632 | 0.636 | 1.28 | | |
| 30 | 0.636 | 0.648 | | −2.00 | |
| 31 | 0.648 | 0.665 | 1.28 | | |
| 32 | 0.665 | 0.680 | | | −0.72 |
| 33 | 0.680 | 0.692 | 1.28 | | |
| 34 | 0.692 | 0.695 | | −2.00 | |
| 35 | 0.695 | 0.710 | 1.28 | | |
| 36 | 0.710 | 0.717 | 1.28 | | |
| 37 | 0.717 | 0.725 | | −2.00 | |
| 38 | 0.725 | 0.739 | 1.28 | | |
| 39 | 0.739 | 0.742 | 1.28 | | |
| 40 | 0.742 | 0.754 | | −2.00 | |
| 41 | 0.754 | 0.766 | 1.28 | | |
| 42 | 0.766 | 0.768 | | −2.00 | |
| 43 | 0.768 | 0.781 | 1.28 | | |
| 44 | 0.781 | 0.789 | 1.28 | | |
| 45 | 0.789 | 0.795 | | −2.00 | |

TABLE 51-continued

| Number | hmin | hmax | ΔOPD$_{11}$/λ1 | ΔOPD$_{21}$/λ1 | ΔOPD$_{31}$/λ1 |
|---|---|---|---|---|---|
| 46 | 0.795 | 0.808 | 1.28 | | |
| 47 | 0.808 | 0.811 | 1.28 | | |
| 48 | 0.811 | 0.821 | | −2.00 | |
| 49 | 0.821 | 0.832 | 1.28 | | |
| 50 | 0.832 | 0.834 | | −2.00 | |
| 51 | 0.834 | 0.847 | 1.28 | | |
| 52 | 0.847 | 0.853 | 1.28 | | |
| 53 | 0.853 | 0.860 | | −2.00 | |
| 54 | 0.860 | 0.872 | 1.28 | | |
| 55 | 0.872 | 0.884 | | | −0.72 |
| 56 | 0.884 | 0.892 | 1.28 | | |
| 57 | 0.892 | 0.897 | | −2.00 | |
| 58 | 0.897 | 0.909 | 1.28 | | |
| 59 | 0.909 | 0.911 | 1.28 | | |
| 60 | 0.911 | 0.921 | | −2.00 | |
| 61 | 0.921 | 0.929 | 1.28 | | |
| 62 | 0.929 | 0.932 | | −2.00 | |
| 63 | 0.932 | 0.944 | 1.28 | | |
| 64 | 0.944 | 0.947 | 1.28 | | |
| 65 | 0.947 | 0.955 | | −2.00 | |
| 66 | 0.955 | 0.964 | 1.28 | | |
| 67 | 0.964 | 0.967 | | −2.00 | |
| 68 | 0.967 | 0.978 | 1.28 | | |
| 69 | 0.978 | 0.981 | 1.28 | | |
| 70 | 0.981 | 0.989 | | −2.00 | |
| 71 | 0.989 | 0.997 | 1.28 | | |
| 72 | 0.997 | 1.000 | | −2.00 | |
| 73 | 1.000 | 1.011 | 1.28 | | |
| 74 | 1.011 | 1.014 | 1.28 | | |
| 75 | 1.014 | 1.022 | | −2.00 | |
| 76 | 1.022 | 1.029 | 1.28 | | |
| 77 | 1.029 | 1.033 | | −2.00 | |
| 78 | 1.033 | 1.044 | 1.28 | | |
| 79 | 1.044 | 1.045 | 1.28 | | |
| 80 | 1.045 | 1.054 | | −2.00 | |
| 81 | 1.054 | 1.060 | 1.28 | | |
| 82 | 1.060 | 1.065 | | −2.00 | |
| 83 | 1.065 | 1.075 | 1.28 | | |
| 84 | 1.075 | 1.086 | | | −0.72 |
| 85 | 1.086 | 1.089 | 1.28 | | |
| 86 | 1.089 | 1.096 | | | −0.72 |
| 87 | 1.096 | 1.103 | 1.28 | | |
| 88 | 1.103 | 1.106 | | −2.00 | |
| 89 | 1.106 | 1.117 | 1.28 | | |
| 90 | 1.117 | 1.126 | | | −0.72 |
| 91 | 1.126 | 1.131 | 1.28 | | |
| 92 | 1.131 | 1.136 | 1.28 | −2.00 | |
| 93 | 1.136 | 1.144 | | | |
| 94 | 1.144 | 1.146 | 1.28 | −2.00 | |
| 95 | 1.146 | 1.157 | | | |
| 96 | 1.157 | 1.166 | 1.28 | | −0.72 |
| 97 | 1.166 | 1.170 | | | |
| 98 | 1.170 | 1.176 | 1.28 | −2.00 | |
| 99 | 1.176 | 1.183 | | | |
| 100 | 1.183 | 1.185 | 1.28 | −2.00 | |
| 101 | 1.185 | 1.195 | 1.28 | | |
| 102 | 1.195 | 1.200 | | | |

TABLE 52

| Number | hmin | hmax | ΔOPD$_{12}$/λ1 | ΔOPD$_{22}$/λ1 | ΔOPD$_{32}$/λ1 | ΔOPD$_{42}$/λ1 |
|---|---|---|---|---|---|---|
| 103 | 1.200 | 1.203 | | | | −3.01 |
| 104 | 1.203 | 1.210 | 1.13 | | | |
| 105 | 1.210 | 1.217 | | | −3.72 | |
| 106 | 1.217 | 1.223 | 1.13 | | | |
| 107 | 1.223 | 1.217 | 1.13 | | | |
| 108 | 1.217 | 1.230 | 1.13 | | | |
| 109 | 1.230 | 1.234 | 1.13 | | | |
| 110 | 1.234 | 1.237 | | −4.85 | | |
| 111 | 1.237 | 1.243 | 1.13 | | | |
| 112 | 1.243 | 1.250 | 1.13 | | | |
| 113 | 1.250 | 1.257 | 1.13 | | | |
| 114 | 1.257 | 1.263 | 1.13 | | | |
| 115 | 1.263 | 1.268 | | | −3.72 | |
| 116 | 1.268 | 1.276 | 1.13 | | | |
| 117 | 1.276 | 1.282 | 1.13 | | | |
| 118 | 1.282 | 1.285 | | | | |
| 119 | 1.285 | 1.289 | | −4.85 | | |
| 120 | 1.289 | 1.295 | 1.13 | | | |
| 121 | 1.295 | 1.301 | 1.13 | | | |
| 122 | 1.301 | 1.308 | | | −3.72 | |
| 123 | 1.308 | 1.314 | 1.13 | | | |
| 124 | 1.314 | 1.317 | 1.13 | | | |
| 125 | 1.317 | 1.320 | | −4.85 | | |
| 126 | 1.320 | 1.327 | 1.13 | | | |
| 127 | 1.327 | 1.333 | 1.13 | | | |
| 128 | 1.333 | 1.339 | | | −3.72 | |
| 129 | 1.339 | 1.345 | 1.13 | | | |
| 130 | 1.345 | 1.349 | 1.13 | | | |
| 131 | 1.349 | 1.351 | | −4.85 | | |
| 132 | 1.351 | 1.357 | 1.13 | | | |
| 133 | 1.357 | 1.364 | 1.13 | | | |
| 134 | 1.364 | 1.370 | | | −3.72 | |
| 135 | 1.370 | 1.376 | 1.13 | | | |
| 136 | 1.376 | 1.379 | 1.13 | | | |
| 137 | 1.379 | 1.382 | | −4.85 | | |
| 138 | 1.382 | 1.388 | 1.13 | | | |
| 139 | 1.388 | 1.394 | 1.13 | | | |
| 140 | 1.394 | 1.400 | | | −3.72 | |
| 141 | 1.400 | 1.405 | 1.13 | | | |
| 142 | 1.405 | 1.409 | 1.13 | | | |
| 143 | 1.409 | 1.417 | | −4.85 | | |
| 144 | 1.417 | 1.423 | 1.13 | | | |
| 145 | 1.423 | 1.429 | | | −3.72 | |
| 146 | 1.429 | 1.435 | 1.13 | | | |
| 147 | 1.435 | 1.438 | 1.13 | | | |
| 148 | 1.438 | 1.440 | | −4.85 | | |
| 149 | 1.440 | 1.446 | 1.13 | | | |
| 150 | 1.446 | 1.452 | 1.13 | | | |
| 151 | 1.452 | 1.458 | | | −3.72 | |
| 152 | 1.458 | 1.463 | 1.13 | | | |
| 153 | 1.463 | 1.466 | 1.13 | | | |
| 154 | 1.466 | 1.469 | | −4.85 | | |
| 155 | 1.469 | 1.475 | 1.13 | | | |
| 156 | 1.475 | 1.480 | 1.13 | | | |
| 157 | 1.480 | 1.486 | | | −3.72 | |
| 158 | 1.486 | 1.491 | 1.13 | | | |
| 159 | 1.491 | 1.495 | 1.13 | | | |

TABLE 53

| Number | hmin | hmax | ΔOPD$_{13}$/λ1 | ΔOPD$_{23}$/λ1 |
|---|---|---|---|---|
| 160 | 1.495 | 1.498 | | −3.13 |
| 161 | 1.498 | 1.504 | −1.00 | |
| 162 | 1.504 | 1.509 | −1.00 | |
| 163 | 1.509 | 1.515 | −1.00 | |
| 164 | 1.515 | 1.520 | −1.00 | |
| 165 | 1.520 | 1.526 | −1.00 | |
| 166 | 1.526 | 1.531 | −1.00 | |
| 167 | 1.531 | 1.536 | −1.00 | |
| 168 | 1.536 | 1.542 | −1.00 | |
| 169 | 1.542 | 1.547 | −1.00 | |
| 170 | 1.547 | 1.552 | −1.00 | |
| 171 | 1.552 | 1.558 | −1.00 | |
| 172 | 1.558 | 1.563 | −1.00 | |
| 173 | 1.563 | 1.568 | −1.00 | |
| 174 | 1.568 | 1.573 | −1.00 | |
| 175 | 1.573 | 1.578 | −1.00 | |
| 176 | 1.578 | 1.584 | −1.00 | |
| 177 | 1.584 | 1.589 | −1.00 | |
| 178 | 1.589 | 1.594 | −1.00 | |
| 179 | 1.594 | 1.599 | −1.00 | |
| 180 | 1.599 | 1.604 | −1.00 | |
| 181 | 1.604 | 1.609 | −1.00 | |
| 182 | 1.609 | 1.614 | −1.00 | |
| 183 | 1.614 | 1.619 | −1.00 | |

TABLE 53-continued

| Number | hmin | hmax | ΔOPD$_{13}$/λ1 | ΔOPD$_{23}$/λ1 |
|---|---|---|---|---|
| 184 | 1.619 | 1.624 | −1.00 | |
| 185 | 1.624 | 1.629 | −1.00 | |
| 186 | 1.629 | 1.633 | −1.00 | |
| 187 | 1.633 | 1.638 | −1.00 | |
| 188 | 1.638 | 1.643 | −1.00 | |
| 189 | 1.643 | 1.648 | −1.00 | |
| 190 | 1.648 | 1.653 | −1.00 | |
| 191 | 1.653 | 1.657 | −1.00 | |
| 192 | 1.657 | 1.662 | −1.00 | |
| 193 | 1.662 | 1.667 | −1.00 | |
| 194 | 1.667 | 1.672 | −1.00 | |
| 195 | 1.672 | 1.676 | −1.00 | |
| 196 | 1.676 | 1.681 | −1.00 | |
| 197 | 1.681 | 1.686 | −1.00 | |
| 198 | 1.686 | 1.690 | −1.00 | |
| 199 | 1.690 | 1.695 | −1.00 | |
| 200 | 1.695 | 1.699 | −1.00 | |
| 201 | 1.699 | 1.704 | −1.00 | |
| 202 | 1.704 | 1.708 | −1.00 | |
| 203 | 1.708 | 1.713 | −1.00 | |
| 204 | 1.713 | 1.717 | −1.00 | |
| 205 | 1.717 | 1.722 | −1.00 | |
| 206 | 1.722 | 1.726 | −1.00 | |
| 207 | 1.726 | 1.731 | −1.00 | |
| 208 | 1.731 | 1.735 | −1.00 | |
| 209 | 1.735 | 1.740 | −1.00 | |
| 210 | 1.740 | 1.744 | −1.00 | |
| 211 | 1.744 | 1.748 | −1.00 | |
| 212 | 1.748 | 1.753 | −1.00 | |
| 213 | 1.753 | 1.757 | −1.00 | |
| 214 | 1.757 | 1.761 | −1.00 | |
| 215 | 1.761 | 1.766 | −1.00 | |
| 216 | 1.766 | 1.770 | −1.00 | |
| 217 | 1.770 | 1.774 | −1.00 | |
| 218 | 1.774 | 1.778 | −1.00 | |
| 219 | 1.778 | 1.783 | −1.00 | |
| 220 | 1.783 | 1.787 | −1.00 | |
| 221 | 1.787 | 1.791 | −1.00 | |
| 222 | 1.791 | 1.795 | −1.00 | |
| 223 | 1.795 | 1.799 | −1.00 | |
| 224 | 1.799 | 1.803 | −1.00 | |
| 225 | 1.803 | 1.807 | −1.00 | |
| 226 | 1.807 | 1.812 | −1.00 | |
| 227 | 1.812 | 1.816 | −1.00 | |
| 228 | 1.816 | 1.820 | −1.00 | |
| 229 | 1.820 | 1.824 | −1.00 | |
| 230 | 1.824 | 1.828 | −1.00 | |
| 231 | 1.828 | 1.832 | −1.00 | |
| 232 | 1.832 | 1.836 | −1.00 | |
| 233 | 1.836 | 1.840 | −1.00 | |
| 234 | 1.840 | 1.843 | −1.00 | |
| 235 | 1.843 | 1.847 | −1.00 | |
| 236 | 1.847 | 1.851 | −1.00 | |
| 237 | 1.851 | 1.855 | −1.00 | |
| 238 | 1.855 | 1.859 | −1.00 | |
| 239 | 1.859 | 1.863 | −1.00 | |
| 240 | 1.863 | 1.867 | −1.00 | |
| 241 | 1.867 | 1.870 | −1.00 | |

As shown in Table 54, the optical information recording/reproducing apparatus 300 on which the objective lens 10 according to the fifth example is mounted satisfies the conditions (1) to (4) and (6) to (27). Therefore, the optical information recording/reproducing apparatus 300 according to the fifth example is able to avoid deterioration of the spot property by the undesired diffraction order of light while suitably correcting the spherical aberration for each of the optical discs D1 to D3, and is able to secure an adequate working distance when the optical disc D3 is used.

FIG. 20A to 20C respectively illustrate the spherical aberrations on the recording surfaces of the optical discs D1 to D3 with respect to the respective NAs. Specifically, FIG. 20A is a graph illustrating the spherical aberration caused on the recording surface of the optical disc D1 with respect to NA1 (=0.85) of the optical disc D1, FIG. 20B is a graph illustrating the spherical aberration caused on the recording surface of the optical disc D2 with respect to NA2 (=0.65) of the optical disc D2, and FIG. 20C is a graph illustrating the spherical aberration caused on the recording surface of the optical disc D3 with respect to NA3 (=0.47) of the optical disc D3.

As shown in FIGS. 20A to 20C, the optical information recording/reproducing apparatus 300 according to the fifth example is able to suitably correct the spherical aberration not only in the case of the design wavelength but also in the case where the wavelength variation occurs, for all of the optical discs D1 to D3.

FIGS. 21A to 21C respectively illustrate the spherical aberrations on the recording surfaces of the optical disc D1 to D3 with respect to NA1. Specifically, FIG. 21A is a graph illustrating the spherical aberration caused, with respect to NA1, on the recording surface of the optical disc D1, FIG. 21B is a graph illustrating the spherical aberration caused, with respect to NA1, on the recording surface of the optical disc D2, and FIG. 21C is a graph illustrating the spherical aberration caused, with respect to NA1, on the recording surface of the optical disc D3.

As shown in FIGS. 21B and 21C, each of the laser beams having the wavelengths λ2 and λ3 which have passed through the region R3 is divided principally into the 0-th order diffracted light and the first order diffracted light having the relatively high diffraction efficiencies, and converges at a portion away from the imaging point of the corresponding one of the laser beams having the wavelengths λ2 and λ3 which have passed through the region R1. As shown in FIG. 17C, the laser beam having the wavelength λ3 which has passed the region R2 is divided into three or more types of diffracted light and converges in a portion away from the imaging point of the laser beam having the wavelength λ3 which has passed the region R1. Therefore, the undesired diffraction order light becomes hard to appear as flare light, and thereby it becomes possible to avoid deterioration of the spot property on the recording surface of each optical disc.

TABLE 54

| Condition | 1$^{st}$ Example | 2$^{nd}$ Example | 3$^{rd}$ Example | 4$^{th}$ Example | 5$^{th}$ Example |
|---|---|---|---|---|---|
| 1 | −0.057 | −0.080 | −0.074 | −0.071 | −0.089 |
| 2 | −0.016 | −0.022 | −0.020 | −0.020 | −0.015 |
| 3 | 0.000 | 0.014 | 0.042 | 0.000 | 0.089 |
| 4 | −0.057 | −0.080 | −0.074 | −0.071 | −0.089 |
| 5 | 0.000 | 0.014 | 0.042 | 0.000 | 0.089 |
| 6 | −0.057 | −0.107 | −0.074 | −0.098 | −0.045 |
| 7 | −0.016 | −0.022 | −0.020 | −0.020 | −0.015 |
| 8 | −0.001 | −0.002 | −0.008 | −0.005 | −0.018 |
| 9 | −0.001 | −0.002 | −0.008 | −0.005 | −0.018 |
| 10 | 0.000 | 0.064 | 0.015 | 0.000 | 0.000 |
| 11 | 1.000 | 1.000 | 1.000 | 1.000 | 1.000 |
| 12 | 72.600 | 112.200 | 145.600 | 96.800 | 149.600 |
| 13 | 2.000 | 2.000 | 2.000 | 2.000 | 2.000 |
| 14 | 1.000 | 1.000 | 1.000 | 1.000 | 1.000 |
| 15 | 1.000 | 1.000 | 1.000 | 1.000 | 1.000 |
| 16 | 182.600 | 264.000 | 335.400 | 233.200 | 178.200 |
| 17 | 6.600 | 19.800 | 57.200 | 8.800 | 74.800 |
| 18 | 72.600 | 112.200 | 145.600 | 96.800 | 149.600 |
| 19 | 6.600 | 19.800 | 57.200 | 8.800 | 74.800 |
| 20 | 182.600 | 264.000 | 335.400 | 233.200 | 178.200 |
| 21 | 1.000 | 1.000 | 1.000 | 1.000 | 1.000 |
| 22 | 15.400 | 15.400 | 91.000 | 55.000 | 88.000 |
| 23 | 55.710 | 55.710 | 55.710 | 55.710 | 35.450 |
| 24 | 0.000 | 0.000 | 0.000 | 0.000 | 0.000 |
| 25 | 0.000 | 0.000 | 0.000 | 0.000 | −0.010 |
| 26 | 0.000 | 0.000 | 0.000 | −0.002 | −0.013 |
| 27 | 0.535 | 0.535 | 0.535 | 0.535 | 0.549 |

Although the present invention has been described in considerable detail with reference to certain preferred embodiments thereof, other embodiments are possible.

For example, the objective optical system of the optical information recording/reproducing apparatus 100 may be configured to have a predetermined optical element between the objective lens 10 and the beam splitter 42. In this case, the annular zone structure according to the embodiment may be configured on at least one surface of the optical element, or the annular zone structure may be provided separately on the surfaces of the objective lens 10 and the optical element.

This application claims priority of Japanese Patent Application No. P2009-265072, filed on Nov. 20, 2009. The entire subject matter of the application is incorporated herein by reference.

What is claimed is:

1. An objective optical system for an optical information recording/reproducing apparatus for recording information to and/or reproducing information from three types of optical discs including first, second and third optical discs differing in recording density by selectively using three types of substantially collimated light beams including first, second and third light beams respectively having first, second and third wavelengths, when $\lambda 1$ (unit: nm) represents the first wavelength, $\lambda 2$ (unit: nm) represents the second wavelength and $\lambda 3$ (unit: nm) represents the third wavelength, the first, second and third wavelengths satisfying a condition:

$$\lambda 1 < \lambda 2 < \lambda 3,$$

when t1 (unit: mm) represents a protective layer thickness of the first optical disc for which information recording or information reproducing is performed by using the first light beam, t2 (unit mm) represents a protective layer thickness of the second optical disc for which information recording or information reproducing is performed by using the second light beam, and t3 (unit mm) represents a protective layer thickness of the third optical disc for which information recording or information reproducing is performed by using the third light beam, t1, t2 and t3 satisfying conditions:

$$t1 < t2 < t3; \text{ and}$$

$$t3 - t1 \geq 1.0$$

when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition:

$$NA1 > NA2 > NA3,$$

wherein:

at least one of optical surfaces of the objective optical system comprises a diffraction surface having a diffraction structure defined by an optical path difference function:

$$\phi_{ik}(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where h (unit: mm) represents a height from an optical axis, $P_{ik2}$, $P_{ik4}$, $P_{ik6}$ ... (i, k: natural numbers) represent optical path difference coefficients of $2^{nd}$ order, $4^{th}$ order, $6^{th}$ order, ... of an i-th optical path difference function in a k-th region, $m_{ik}$ represents a diffraction order at which diffraction efficiency is maximized for an incident light beam in regard to the i-th optical path difference function of the k-th region, and $\lambda$ (unit: nm) represents a use wavelength of the incident light beam;

the diffraction surface includes a first region contributing to converging the first, second and third light beams onto recording surfaces of the first, second and third optical discs, respectively;

the first region comprises a diffraction structure defined by a first optical path difference function and a diffraction structure defined by a second optical path difference function;

the diffraction structure defined by the first optical path difference function in the first region is configured such that diffraction orders at which diffraction efficiencies are maximized respectively for the first, second and third light beams are 1st-orders;

when f1 (unit: mm) represents a focal length of the objective optical system with respect to the first light beam, and $fD_{11}$ represents a focal length (unit: mm) of the diffraction structure defined by the first optical path difference function in the first region, the first region satisfies a condition:

$$-0.15 < f1/fD_{11} < -0.03 \tag{1},$$

where $fD_{11} = -1/(2 \times P_{112} \times m_{11} \times \lambda)$;

the diffraction structure defined by the second optical path difference function in the first region is configured such that diffraction orders at which diffraction efficiencies are maximized respectively for the first, second and third light beams are 2nd-order, 1st-order and 1st-order, respectively;

the diffraction surface includes a second region located outside the first region, the second region contributing to converging the first and second light beams onto the recording surfaces of the first and second optical discs, respectively, and not contributing to converging of the third light beam;

the second region having a diffraction structure defined by at least one type of optical path difference function;

the diffraction structure in the second region is configured such that diffraction orders at which diffraction efficiencies are maximized respectively for the first and second light beams are 1st-orders;

the diffraction surface includes a third region located outside the second region, the third region contributing to converging the first light beam onto the recording surface of the first optical disc, and not contributing to converging each of the second and third light beams;

the third region has a diffraction structure defined by at least one type of optical path difference function;

the diffraction structure in the third region is configured such that a diffraction order at which a diffraction efficiency is maximized for the first light beam is an odd-order; and when h2 (unit: mm) represents a maximum effective radius of the second region and h3 (unit: mm) represents a maximum effective radius of the third region, the diffraction surface satisfies a condition:

$$-0.05 < (\phi_{13}(h3) - \phi_{13}(h2))/(m_{13} \times f1) < -0.005 \tag{2}.$$

2. The objective optical system according to claim 1, wherein when $fD_{21}$ (unit: mm) represents the focal length of the diffraction structure defined by the second optical path difference function in the first region, the diffraction surface satisfies a condition:

$$0 \leq f1/fD_{21} < 0.15 \qquad (3)$$

where $fD_{21} = -1/(2 \times P_{212} \times m_{21} \times \lambda)$.

3. The objective optical system according to claim 1, wherein the diffraction surface satisfies a condition:

$$-0.10 < f1/fD_{11} < -0.05 \qquad (4).$$

4. The objective optical system according to claim 1, wherein the diffraction surface satisfies a condition:

$$0 \leq f1/fD_{21} < 0.01 \qquad (5).$$

5. The objective optical system according to claim 1, wherein when $fD_{13}$ (unit: mm) represents a focal length of the diffraction structure defined by a first optical path difference function in the third region, the diffraction surface satisfies a condition:

$$-0.150 < f1/fD_{13} < -0.015 \qquad (6)$$

where $fD_{21} = -1/(2 \times P_{132} \times m_{13} \times \lambda)$.

6. The objective optical system according to claim 1, wherein the diffraction surface satisfies a condition:

$$-0.03 < (\phi_{13}(h3) - \phi_{13}(h2))/(m_{13} \times f1) < -0.01 \qquad (7).$$

7. The objective optical system according to claim 1, wherein the diffraction surface is configured such that in the third region, a diffraction order at which a diffraction efficiency is maximized for the first light beam is a 1st-order.

8. The objective optical system according to claim 1, wherein the diffraction surface is configured such that in the second region the diffraction surface has a diffraction structure defined by a first optical path difference function for the second region and a diffraction structure defined by a second optical path difference function for the second region,
when $h1$ (unit: mm) represents a maximum effective radius of the first region, the diffraction surface satisfies a condition:

$$-0.05 < (\phi_{22}(h2) - \phi_{22}(h1))/f1 < -0.03 \qquad (8).$$

9. The objective optical system according to claim 1, wherein the diffraction surface is configured such that in the second region the diffraction surface has a diffraction structure defined by a first optical path difference function for the second region and a diffraction structure defined by a second optical path difference function for the second region,
when $h1$ (unit: mm) represents a maximum effective radius of the first region and $fD_{22}$ (unit: mm) represents a focal length of the diffraction structure defined by the second optical path difference function in the second region, the diffraction surface satisfies conditions:

$$-0.03 < (\phi_{22}(h2) - \phi_{22}(h1))/f1 < 0 \qquad (9); \text{ and}$$

$$0 \leq f1/fD_{22} < 0.08 \qquad (10),$$

where $fD_{22} = -1/(2 \times P_{222} \times m_{22} \times \lambda)$.

10. The objective optical system according to claim 1, comprising:
an objective lens; and
an optical element having at least one surface formed as the diffraction surface.

11. The objective optical system according to claim 1, comprising an objective lens having at least one surface formed as the diffraction surface.

12. The objective optical system according to claim 1, wherein:
the objective optical system comprises an objective lens;
when $\nu d$ represents Abbe number of the objective lens at d-line, $\nu d$ satisfies a condition:

$$35 \leq \nu d \leq 80 \qquad (23).$$

13. An objective optical system for an optical information recording/reproducing apparatus for recording information to and/or reproducing information from three types of optical discs including first, second and third optical discs differing in recording density by selectively using three types of substantially collimated light beams including first, second and third light beams respectively having first, second and third wavelengths,
when $\lambda 1$ (unit: nm) represents the first wavelength, $\lambda 2$ (unit: nm) represents the second wavelength and $\lambda 3$ (unit: nm) represents the third wavelength, the first, second and third wavelengths satisfying a condition:

$$\lambda 1 < \lambda 2 < \lambda 3,$$

when $t1$ (unit: mm) represents a protective layer thickness of the first optical disc for which information recording or information reproducing is performed by using the first light beam, $t2$ (unit: mm) represents a protective layer thickness of the second optical disc for which information recording or information reproducing is performed by using the second light beam, and $t3$ (unit: mm) represents a protective layer thickness of the third optical disc for which information recording or information reproducing is performed by using the third light beam, $t1$, $t2$ and $t3$ satisfying conditions:

$$t1 < t2 < t3; \text{ and}$$

$$t3 - t1 \geq 1.0$$

when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition:

$$NA1 > NA2 > NA3,$$

wherein:
at least one optical surface of optical surfaces of the objective optical system includes a phase shift surface having a phase shift structure formed of a plurality of concentrically divided refractive surface zones;
the phase shift surface includes a first region which contributes to converging the first, second and third light beams onto recording surfaces of the first, second and third optical discs, respectively;
the first region includes a phase shift structure having a first step giving an optical path length difference to an incident light beam at a boundary between adjacent ones of the plurality of refractive surface zones, and a phase shift structure having a second step giving an optical path length difference to an incident light beam at a boundary between adjacent ones of the plurality of refractive surfaces zones, the optical path length differences given by the first and second steps being different from each other;
when $\Delta OPD_{ik}$ (unit: nm) represents an optical path length difference given by an i-th step in a k-th region, and $N_{ik}$ represents a number of steps of the i-th step in the k-th region, and f1 (unit: mm) represents a focal length of the objective optical system with respect to the first light beam, the first step in the first region satisfies conditions:

$$INT|(\Delta OPD_{11}/\lambda 1)+0.5|=1 \quad (11); \text{ and}$$

$$0.60\times 10^2 < N_{11}\times f1 < 2.50\times 10^2 \quad (12),$$

and the second step in the first region satisfies a condition:

$$INT|(\Delta OPD_{21}/\lambda 1)+0.5|=2 \quad (13),$$

the phase shift surface includes a second region outside the first region, the second region being configured to contribute to converging the first and second light beams onto the recording surfaces of the first and second optical discs, respectively, and not to contribute to converging the third light beam, the second region includes a phase shift structure having a step giving at least one type of optical path length difference to an incident light beam at a boundary between adjacent ones of the plurality of refractive surface zones;

the second region satisfies a condition:

$$INT|(\Delta OPD_{12}/\lambda 1)+0.5|=1 \quad (14)$$

the phase shift surface includes a third region outside the second region, the third region being configured to contribute to converging the first light beam onto the recording surface of the first optical disc, and not to contribute to converging each of the second and third light beams;

the third region includes a phase shift structure having a step giving at least one type of optical path length difference to an incident beam at a boundary between adjacent ones of the refractive surface zones; and the third region satisfies conditions:

$$INT|(\Delta OPD_{13}/\lambda 1)+0.5|=2L+1 \quad (15); \text{ and}$$

$$0.80\times 10^2 < N_{13}\times f1 < 3.50\times 10^2 \quad (16)$$

where L is an integer.

14. The objective optical system according to claim 13, wherein the phase shift surface satisfies a condition:

$$0.04\times 10^2 \leq N_{21}\times f1 < 1.50\times 10^2 \quad (17).$$

15. The objective optical system according to claim 13, wherein the phase shift surface satisfies a condition:

$$1.20\times 10^2 < N_{11}\times f1 < 2.20\times 10^2 \quad (18).$$

16. The objective optical system according to claim 13, wherein the phase shift surface satisfies a condition:

$$0.04\times 10^2 \leq N_{21}\times f1 < 1.00\times 10^2 \quad (19).$$

17. The objective optical system according to claim 13, wherein the phase shift surface satisfies a condition:

$$1.50\times 10^2 < N_{13}\times f1 < 3.00\times 10^2 \quad (20).$$

18. The objective optical system according to claim 13, wherein the phase shift surface satisfies a condition:

$$INT|(\Delta OPD_{13}/\lambda 1)+0.5|=1 \quad (21).$$

19. The objective optical system according to claim 13, wherein:

the phase shift surface in the second region includes a phase shift structure having a first step giving an optical path length difference to an incident light beam at a boundary between adjacent ones of the plurality of refractive surface zones and a phase shift structure having a second step giving an optical path length difference to an incident beam at a boundary between adjacent ones of the plurality of refractive surface zones, the optical path length differences given by the first and second steps being different from each other; and the phase shift surface in the second region satisfies a condition:

$$0.25\times 10^2 < N_{22}\times INT|(\Delta OPD_{22}/\lambda 1)+0.5|\times f1 < 1.00\times 10^2 \quad (22).$$

20. The objective optical system according to claim 13, comprising:

an objective lens; and an optical element configured such that the phase shift surface is formed on at least one of surfaces of the optical element.

21. The objective optical system according to claim 13, comprising an objective lens configured such that the phase shift structure is formed on at least one of surfaces of the objective lens.

22. The objective optical system according to claim 13, wherein:

the objective optical system comprises an objective lens;

when νd represents Abbe number of the objective lens at d-line, νd satisfies a condition:

$$35 \leq \nu d \leq 80 \quad (23).$$

23. An optical information recording/reproducing apparatus for recording information to and/or reproducing information from three types of optical discs including first, second and third optical discs differing in recording density, comprising:

light sources which emit a first light beam having a first wavelength, a second light beam having a second wavelength and a third light beam having a third wavelength, respectively;

coupling lenses that respectively convert the first, second and third light beams emitted by the light sources into substantially collimated beams, respectively; and an objective optical system, when λ1 (unit: nm) represents the first wavelength, λ2 (unit: nm) represents the second wavelength and λ3 (unit: nm) represents the third wavelength, the first, second and third wavelengths satisfying a condition:

$$\lambda 1 < \lambda 2 < \lambda 3,$$

when t1 (unit: mm) represents a protective layer thickness of the first optical disc for which information recording or information reproducing is performed by using the first light beam, t2 (unit: mm) represents a protective layer thickness of the second optical disc for which information recording or information reproducing is performed by using the second light beam, and t3 (unit: mm) represents a protective layer thickness of the third optical disc for which information recording or information reproducing is performed by using the third light beam, t1, t2 and t3 satisfying conditions:

$$0.05 < t1 < 0.12;$$

$$t2 \approx 0.6; \text{ and}$$

$$t3 \approx 1.2,$$

when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition:

NA1>NA2>NA3, wherein:
at least one of optical surfaces of the objective optical system comprises a diffraction surface having a diffraction structure defined by an optical path difference function:

$$\phi ik(h) = (P_{ik2} \times h^2 + P_{ik4} \times h^4 + P_{ik6} \times h^6 + P_{ik8} \times h^8 + P_{ik10} \times h^{10} + P_{ik12} \times h^{12}) m_{ik} \lambda$$

where h (unit: mm) represents a height from an optical axis, $P_{ik2}, P_{ik4}, P_{ik6} \ldots$ (i, k: natural numbers) represent optical path difference coefficients of $2^{nd}$ order, $4^{th}$ order, $6^{th}$ order, . . . of an i-th optical path difference function in a k-th region, $m_{ik}$ represents a diffraction order at which diffraction efficiency is maximized for an incident light beam in regard to the i-th optical path difference function of the k-th region, and λ (unit: nm) represents a use wavelength of the incident light beam;
the diffraction surface includes a first region contributing to converging the first, second and third light beams onto recording surfaces of the first, second and third optical discs, respectively;
the first region comprises a diffraction structure defined by a first optical path difference function and a diffraction structure defined by a second optical path difference function;
the diffraction structure defined by the first optical path difference function in the first region is configured such that diffraction orders at which diffraction efficiencies are maximized respectively for the first, second and third light beams are 1st-orders;
when f1 (unit: mm) represents a focal length of the objective optical system with respect to the first light beam, and $fD_{11}$ represents a focal length (unit: mm) of the diffraction structure defined by the first optical path difference function in the first region, the first region satisfies a condition:

$$-0.15 < f1/fD_{11} < -0.03 \quad (1),$$

where $fD_{11} = -1/(2 \times P_{112} \times m_{11} \times \lambda)$;
the diffraction structure defined by the second optical path difference function in the first region is configured such that diffraction orders at which diffraction efficiencies are maximized respectively for the first, second and third light beams are 2nd-order, 1st-order and 1st-order, respectively;
the diffraction surface includes a second region located outside the first region, the second region contributing to converging the first and second light beams onto the recording surfaces of the first and second optical discs, respectively, and not contributing to converging of the third light beam;
the second region having a diffraction structure defined by at least one type of optical path difference function;
the diffraction structure in the second region is configured such that diffraction orders at which diffraction efficiencies are maximized respectively for the first and second light beams are 1st-orders;
the diffraction surface includes a third region located outside the second region, the third region contributing to converging the first light beam onto the recording surface of the first optical disc, and not contributing to converging each of the second and third light beams;
the third region has a diffraction structure defined by at least one type of optical path difference function;
the diffraction structure in the third region is configured such that a diffraction order at which a diffraction efficiency is maximized for the first light beam is an odd-order; and
when h2 (unit: mm) represents a maximum effective radius of the second region and h3 (unit: mm) represents a maximum effective radius of the third region, the diffraction surface satisfies a condition:

$$-0.05 < (\phi_{13}(h3) - \phi_{13}(h2))/(m_{13} \times f1) < -0.005 \quad (2),$$

wherein:
when f1 (unit: mm) and M1 respectively represent a focal length and magnification of the objective optical system with respect to the first light beam, f2 (unit: mm) and M2 respectively represent a focal length and magnification of the objective optical system with respect to the second light beam, and f3 (unit: mm) and M3 respectively represent a focal length and magnification of the objective optical system with respect to the third light beam, the objective optical system satisfies conditions:

$$-0.02 < f1 \times M1 < 0.02 \quad (24);$$

$$-0.02 < f2 \times M2 < 0.02 \quad (25); \text{ and}$$

$$-0.02 < f3 \times M3 < 0.02 \quad (26);$$

the objective optical system includes an objective lens; and
when n1 represents a refractive index of the objective lens with respect the first light beam and n3 represents a refractive index of the objective lens with respect the third light beam, the objective lens satisfies a condition:

$$0.4 < (\lambda 1/(n3-1))/(\lambda 3/(n1-1)) < 0.6 \quad (27).$$

24. An optical information recording/reproducing apparatus for recording information to and/or reproducing information from three types of optical discs including first, second and third optical discs differing in recording density, comprising:
light sources which emit a first light beam having a first wavelength, a second light beam having a second wavelength and a third light beam having a third wavelength, respectively;
coupling lenses that respectively convert the first, second and third light beams emitted by the light sources into substantially collimated beams, respectively; and
an objective optical system,
when λ1 (unit: nm) represents the first wavelength, λ2 (unit: nm) represents the second wavelength and λ3 (unit: nm) represents the third wavelength, the first, second and third wavelengths satisfying a condition:

λ1<λ2<λ3, when t1 (unit: mm) represents a protective layer thickness of the first optical disc for which information recording or information reproducing is performed by using the first light beam, t2 (unit: mm) represents a protective layer thickness of the second optical disc for which information recording or information reproducing is performed by using the second light beam, and t3 (unit: mm) represents a protective layer thickness of the third optical disc for which information recording or information reproducing is performed by using the third light beam, t1, t2 and t3 satisfying conditions:

$0.05 < t1 < 0.12;$ $t2 \approx 0.6;$ and (5)

$t3 \approx 1.2,$ when NA1 represents a numerical aperture required for the information recording or information reproducing for the first optical disc, NA2 represents a numerical aperture required for the information recording or information reproducing for the second optical disc, and NA3 represents a numerical aperture required for the information recording or information reproducing for the third optical disc, NA1, NA2 and NA3 satisfying a condition:

$NA1 > NA2 > NA3,$ wherein:

at least one optical surface of optical surfaces of the objective optical system includes a phase shift surface having a phase shift structure formed of a plurality of concentrically divided refractive surface zones;

the phase shift surface includes a first region which contributes to converging the first, second and third light beams onto recording surfaces of the first, second and third optical discs, respectively;

the first region includes a phase shift structure having a first step giving an optical path length difference to an incident light beam at a boundary between adjacent ones of the plurality of refractive surface zones, and a phase shift structure having a second step giving an optical path length difference to an incident light beam at a boundary between adjacent ones of the plurality of refractive surfaces zones, the optical path length differences given by the first and second steps being different from each other;

when $\Delta OPD_{ik}$ (unit: nm) represents an optical path length difference given by an i-th step in a k-th region, and $N_{ik}$ represents a number of steps of the i-th step in the k-th region, and f1 (unit: mm) represents a focal length of the objective optical system with respect to the first light beam, the first step in the first region satisfies conditions:

$INT|(\Delta OPD_{11}/\lambda 1)+0.5|=1$ (11); and $0.60 \times 10^2 < N_{11} \times f1 < 2.50 \times 10^2$ (12), and the second step in the first region satisfies a condition:

$INT|(\Delta OPD_{21}/\lambda 1)+0.5|=2$ (13), the phase shift surface includes a second region outside the first region, the second region being configured to contribute to converging the first and second light beams onto the recording surfaces of the first and second optical discs, respectively, and not to contribute to converging the third light beam, the second region includes a phase shift structure having a step giving at least one type of optical path length difference to an incident light beam at a boundary between adjacent ones of the plurality of refractive surface zones;

the second region satisfies a condition:

$INT|(\Delta OPD_{12}/\lambda 1)+0.5|=1$ (14)

the phase shift surface includes a third region outside the second region, the third region being configured to contribute to converging the first light beam onto the recording surface of the first optical disc, and not to contribute to converging each of the second and third light beams;

the third region includes a phase shift structure having a step giving at least one type of optical path length difference to an incident beam at a boundary between adjacent ones of the refractive surface zones; and the third region satisfies conditions:

$INT|(\Delta OPD_{13}/\lambda 1)+0.5|=2L+1$ (15); and $0.80 \times 10^2 < N_{13} \times f1 < 3.50 \times 10^2$ (16)

where L is an integer, wherein:

when f1 (unit: mm) and M1 respectively represent a focal length and magnification of the objective optical system with respect to the first light beam, f2 (unit: mm) and M2 respectively represent a focal length and magnification of the objective optical system with respect to the second light beam, and f3 (unit: mm) and M3 respectively represent a focal length and magnification of the objective optical system with respect to the third light beam, the objective optical system satisfies conditions:

$-0.02 < f1 \times M1 < 0.02$ (24);

$-0.02 < f2 \times M2 < 0.02$ (25); and $-0.02 < f3 \times M3 < 0.02$ (26);

the objective optical system includes an objective lens; and when n1 represents a refractive index of the objective lens with respect the first light beam and n3 represents a refractive index of the objective lens with respect the third light beam, the objective lens satisfies a condition:

$0.4 < (\lambda 1/(n3-1))/(\lambda 3/(n1-1)) < 0.6$ (27).

* * * * *